United States Patent
Grunwald et al.

(10) Patent No.: US 11,677,687 B2
(45) Date of Patent: *Jun. 13, 2023

(54) SWITCHING BETWEEN FAULT RESPONSE MODELS IN A STORAGE SYSTEM

(71) Applicant: PURE STORAGE, INC., Mountain View, CA (US)

(72) Inventors: David Grunwald, San Francisco, CA (US); Ronald Karr, Palo Alto, CA (US); Thomas Gill, Bury St Edmunds (GB); Zoheb Shivani, Santa Clara, CA (US); John Colgrove, Los Altos, CA (US); Connor Brooks, Mountain View, CA (US); Claudiu Schmidt, Aldingen (DE)

(73) Assignee: PURE STORAGE, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/235,397

(22) Filed: Apr. 20, 2021

(65) Prior Publication Data
US 2021/0243139 A1 Aug. 5, 2021

Related U.S. Application Data

(63) Continuation of application No. 16/050,382, filed on Jul. 31, 2018, now Pat. No. 10,992,598.
(Continued)

(51) Int. Cl.
*G06F 11/00* (2006.01)
*H04L 49/253* (2022.01)
(Continued)

(52) U.S. Cl.
CPC ............ *H04L 49/253* (2013.01); *G06F 3/065* (2013.01); *G06F 3/067* (2013.01); *G06F 3/0614* (2013.01);
(Continued)

(58) Field of Classification Search
CPC ............ G06F 11/2069; G06F 11/2074; G06F 11/2082
See application file for complete search history.

(56) References Cited

U.S. PATENT DOCUMENTS 5,706,210 A 1/1998 Kumano et al.
5,740,348 A 4/1998 Cunliffe et al.
(Continued)

FOREIGN PATENT DOCUMENTS

EP 0725324 A2 8/1996
WO 2012087648 A2 6/2012
(Continued)

OTHER PUBLICATIONS

Anonymous, "Fault tolerance and storage efficiency in Storage Spaces Direct," URL:https://docs.microsoft.com/en-us/windows-server/storage/storage-spaces/storage-spaces-fault-tolerance, dated Oct. 11, 2017, 11 pages.
(Continued)

*Primary Examiner* — Elmira Mehrmanesh

(57) ABSTRACT

A storage system switching between mediation models within a storage system, where the switching between mediation models includes: determining, among one or more of the plurality of storage systems, a change in availability of a mediator service, wherein one or more of the plurality of storage systems are configured to request mediation from the mediator service in response to a fault; and communicating, among the plurality of storage systems and responsive to determining the change in availability of the mediator service, a fault response model to be used as an alternate to the mediator service among one or more of the plurality of storage systems.

20 Claims, 20 Drawing Sheets

Related U.S. Application Data

(60) Provisional application No. 62/695,433, filed on Jul. 9, 2018, provisional application No. 62/674,570, filed on May 21, 2018.

(51) Int. Cl.

| | | |
|---|---|---|
| *H04L 67/1097* | (2022.01) | |
| *G06F 3/06* | (2006.01) | |
| *G06F 16/907* | (2019.01) | |
| *G06F 16/27* | (2019.01) | |
| *G06F 11/20* | (2006.01) | |
| *H04L 12/70* | (2013.01) | |

(52) U.S. Cl.
CPC .......... *G06F 3/0617* (2013.01); *G06F 3/0635* (2013.01); *G06F 3/0647* (2013.01); *G06F 3/0653* (2013.01); *G06F 11/2069* (2013.01); *G06F 11/2082* (2013.01); *G06F 16/275* (2019.01); *G06F 16/907* (2019.01); *H04L 67/1097* (2013.01); *G06F 2201/805* (2013.01); *G06F 2201/82* (2013.01); *G06F 2201/84* (2013.01); *H04L 2012/5625* (2013.01)

(56) References Cited

U.S. PATENT DOCUMENTS

| | | |
|---|---|---|
| 5,799,200 A | 8/1998 | Brant et al. |
| 5,933,598 A | 8/1999 | Scales et al. |
| 6,012,032 A | 1/2000 | Donovan et al. |
| 6,085,333 A | 7/2000 | DeKoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,359 B1 | 9/2006 | Burton et al. |
| 7,107,389 B2 | 9/2006 | Inagaki et al. |
| 7,111,084 B2 | 9/2006 | Tan et al. |
| 7,146,521 B1 | 12/2006 | Nguyen |
| 7,281,030 B1 | 10/2007 | Davis |
| 7,334,124 B2 | 2/2008 | Pham et al. |
| 7,437,530 B1 | 10/2008 | Rajan |
| 7,484,056 B2 | 1/2009 | Madnani et al. |
| 7,484,057 B1 | 1/2009 | Madnani et al. |
| 7,484,059 B1 | 1/2009 | Ofer et al. |
| 7,493,424 B1 | 2/2009 | Bali et al. |
| 7,669,029 B1 | 2/2010 | Mishra et al. |
| 7,689,609 B2 | 3/2010 | Lango et al. |
| 7,711,820 B2 | 5/2010 | Sharma et al. |
| 7,743,191 B1 | 6/2010 | Liao |
| 7,899,780 B1 | 3/2011 | Shmuylovich et al. |
| 7,953,890 B1 | 5/2011 | Katkar et al. |
| 8,001,413 B2 | 8/2011 | Wetmore et al. |
| 8,042,163 B1 | 10/2011 | Karr et al. |
| 8,060,775 B1 | 11/2011 | Sharma et al. |
| 8,086,585 B1 | 12/2011 | Brashers et al. |
| 8,190,816 B2 | 5/2012 | Balasubramanian et al. |
| 8,200,887 B2 | 6/2012 | Bennett |
| 8,271,700 B1 | 9/2012 | Annem et al. |
| 8,332,505 B2 | 12/2012 | Hagerott et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,533,408 B1 | 9/2013 | Madnani et al. |
| 8,566,546 B1 | 10/2013 | Marshak et al. |
| 8,578,442 B1 | 11/2013 | Banerjee |
| 8,589,504 B1 | 11/2013 | Ofer et al. |
| 8,595,397 B2 | 11/2013 | DeKoning et al. |
| 8,613,066 B1 | 12/2013 | Brezinski et al. |
| 8,620,970 B2 | 12/2013 | English et al. |
| 8,751,463 B1 | 6/2014 | Chamness |
| 8,751,878 B1 | 6/2014 | Don et al. |
| 8,762,642 B2 | 6/2014 | Bates et al. |
| 8,769,622 B2 | 7/2014 | Chang et al. |
| 8,788,750 B2 | 7/2014 | Jacobson et al. |
| 8,800,009 B1 | 8/2014 | Beda et al. |
| 8,812,860 B1 | 8/2014 | Bray |
| 8,832,216 B2 | 9/2014 | Bugge |
| 8,850,546 B1 | 9/2014 | Field et al. |
| 8,868,870 B1 | 10/2014 | Vemuri |
| 8,898,346 B1 | 11/2014 | Simmons |
| 8,898,507 B1 | 11/2014 | Crable et al. |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,052,834 B2 | 6/2015 | DeKoning et al. |
| 9,081,713 B1 | 7/2015 | Bennett |
| 9,124,569 B2 | 9/2015 | Hussain et al. |
| 9,134,922 B2 | 9/2015 | Rajagopal et al. |
| 9,189,334 B2 | 11/2015 | Bennett |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,311,182 B2 | 4/2016 | Bennett |
| 9,367,410 B2 | 6/2016 | Tang et al. |
| 9,444,822 B1 | 9/2016 | Borowiec et al. |
| 9,460,183 B2 | 10/2016 | Dalton |
| 9,507,532 B1 | 11/2016 | Colgrove et al. |
| 9,632,870 B2 | 4/2017 | Bennett |
| 9,667,723 B2 | 5/2017 | Pandya |
| 9,858,011 B2 | 1/2018 | Bortnikov et al. |
| 9,892,071 B2 | 2/2018 | Dreier et al. |
| 9,910,800 B1 | 3/2018 | Dreier et al. |
| 9,916,214 B2 | 3/2018 | Fries et al. |
| 9,984,140 B1 | 5/2018 | Sukumaran et al. |
| 9,986,028 B2 | 5/2018 | Cayton et al. |
| 10,558,537 B1 | 2/2020 | Colgrove et al. |
| 10,992,598 B2 * | 4/2021 | Grunwald ............ G06F 16/275 |
| 11,128,578 B2 * | 9/2021 | Grunwald ............ G06F 16/275 |
| 2001/0020282 A1 | 9/2001 | Murotani et al. |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison et al. |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |

(56) References Cited

U.S. PATENT DOCUMENTS

| | | |
|---|---|---|
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0089781 A1 | 4/2012 | Ranade et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0188794 A1 | 7/2014 | Dalton |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0310556 A1 | 10/2014 | Agetsuma et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0254003 A1 | 9/2015 | Lee et al. |
| 2015/0254142 A1 | 9/2015 | Wagmann |
| 2015/0261434 A1 | 9/2015 | Kagan et al. |
| 2015/0363124 A1 | 12/2015 | Rath et al. |
| 2015/0378888 A1 | 12/2015 | Zhang et al. |
| 2016/0085462 A1 | 3/2016 | Buzzard et al. |
| 2016/0098323 A1 | 4/2016 | Mutha et al. |
| 2016/0217049 A1 | 7/2016 | Bali et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2017/0116097 A1 | 4/2017 | Keremane et al. |
| 2017/0242771 A1 | 8/2017 | Khemani et al. |
| 2018/0081562 A1 | 3/2018 | Vasudevan |
| 2019/0356609 A1 | 11/2019 | Grunwald et al. |
| 2021/0409349 A1 | 12/2021 | Grunwald et al. |

FOREIGN PATENT DOCUMENTS

| | | |
|---|---|---|
| WO | 2013071087 A1 | 5/2013 |
| WO | 2014110137 A1 | 7/2014 |
| WO | 2016015008 A1 | 1/2016 |
| WO | 2016100790 A1 | 6/2016 |
| WO | 2016190938 A1 | 12/2016 |
| WO | 2016195759 A1 | 12/2016 |
| WO | 2016195958 A1 | 12/2016 |
| WO | 2016195961 A1 | 12/2016 |
| WO | 2019226573 A1 | 11/2019 |

OTHER PUBLICATIONS

Bellamy-Mcintyre et al., "OpenID and the Enterprise: A Model-based Analysis of Single Sign-On Authentication", 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

Etsi, "Network Function Virtualisation (NFV); Resiliency Requirements", ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Faith, "dietzip file format", GitHub.com (online), accessed Jul. 28, 2015, 1 page, URL: github.com/fidlej/idzip.

Frommgen et al., "Switching ZooKeeper's Consensus Protocol at Runtime," 2017 IEEE International Conference on Autonomic Computing (ICAC), IEEE Computer Society, DOI: 10.1109/ICAC.2017.54, dated Jul. 17, 2017, 2 pages.

Google Search of "storage array define" performed by the Examiner on Nov. 4, 2015 for U.S. Appl. No. 14/725,278, Results limited to entries dated before 2012, 1 page.

Hota et al., "Capability-based Cryptographic Data Access Control in Cloud Computing", International Journal of Advanced Networking and Applications, col. 1, Issue 1, Aug. 2011, 10 pages, Eswar Publications, India.

Hu et al., "Container Marking: Combining Data Placement, Garbage Collection and Wear Levelling for Flash", 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Apr. 29, 2016, 12 pages.

International Search Report and Written Opinion, PCT/US2016/015008, dated May 4, 2016, 12 pages.

International Search Report and Written Opinion, PCT/US2016/016333, dated Jun. 8, 2016, 12 pages.

International Search Report and Written Opinion, PCT/US2016/020410, dated Jul. 8, 2016, 12 pages.

International Search Report and Written Opinion, PCT/US2016/032052, dated Aug. 30, 2016, 17 pages.

International Search Report and Written Opinion, PCT/US2016/032084, dated Jul. 18, 2016, 12 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

(56) References Cited

OTHER PUBLICATIONS

International Search Report and Written Opinion, PCT/US2016/044876, dated Oct. 21, 2016, 12 pages.
International Search Report and Written Opinion, PCT/US2016/044877, dated Sep. 29, 2016, 13 pages.
International Search Report and Written Opinion, PCT/US2019/033205, dated Sep. 9, 2019, 11 pages.
Kong, "Using PCI Express as the Primary System Interconnect in Multiroot Compute, Storage, Communications and Embedded Systems", White Paper, IDT.com (online), Aug. 28, 2008, 12 pages, URL: www.idt.com/document/whp/idt-pcie-multi-root-white-paper.
Li et al., "Access Control for the Services Oriented Architecture", Proceedings of the 2007 ACM Workshop on Secure Web Services (SWS '07), Nov. 2007, pp. 9-17, ACM New York, NY.
Microsoft, "Hybrid for SharePoint Server 2013—Security Reference Architecture", Microsoft (online), Oct. 2014, 53 pages, URL: hybrid.office.com/img/Security_Reference_Architecture.pdf.
Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrid_Identity_Datasheetpdf.
Microsoft, "Hybrid Identity", Microsoft (online), Apr. 2014, 36 pages, URL: www.aka.ms/HybridIdentityWp.
Muntimadugu et al., "Red Hat Gluster Storage 3.2 Administration Guide", sections 5.8 and 11.4, dated Aug. 2017, retrieved on Aug. 29, 2018, 465 pages, URL: https://access.rehat.com/documentation/en-us/red_hat_gluster_storage/3.2/pdf/administration_guide/Red_Hat_Gluster_Storage-3.2-Administration_Guide-en-US.pdf.
Pcmag, "Storage Array Definition", Published May 10, 2013, http://web.archive.org/web/20130510121646/http://www.pcmag.com/encyclopedia/term/52091/storage-array, 2 pages.
Storer et al., "Secure Data Deduplication", Proceedings of the 4th ACM International Workshop on Storage Security and Survivability (StorageSS'08), Oct. 2008, 10 pages, ACM New York, NY. USA, DOI: 10.1145/1456469.1456471.
Sweere, "Creating Storage Class Persistent Memory with NVDIMM", Published in Aug. 2013, Flash Memory Summit 2013, http://ww.flashmemorysummit.com/English/Collaterals/Proceedings/2013/20130814_T2_Sweere.pdf, 22 pages.
Techopedia, "What is a disk array", techopedia.com (online), Jan. 13, 2012, 1 page, URL: web.archive.org/web/20120113053358/http://www.techopedia.com/definition/1009/disk-array.
Touchette, "Stretched Cluster: ActiveCluster Makes It Simple for All—Pure Storage", dated Dec. 27, 2017, printed Aug. 27, 2019, 11 pages, URL: https://blogpurestorage.com/activecluster-simple-stretch-clustering.
Webopedia, "What is a disk array", webopedia.com (online), May 26, 2011, 2 pages, URL: web/archive.org/web/20110526081214/http://www.webopedia.com/TERM/D/disk_array.html.
Wikipedia, "Convergent Encryption", Wikipedia.org (online), accessed Sep. 8, 2015, 2 pages, URL: en.wikipedia.org/wiki/Convergent_encryption.
International Search Report and Written Opinion, PCT/US2019/033181, dated Sep. 9, 2019, 11 pages.
International Search Report and Written Opinion, PCT/US2019/033224, dated Sep. 9, 2019, 11 pages.
Muntimadugu et al., "Red Hat Gluster Storage 3.2 Administration Guide", URL: https://access.redhat.com/documentation/en-us/red_hat_gluster_storage/3.2/pdf/administration_guide/Red_Hat_Gluster_Storage-3.2-Administration_Guide-en-US.pdf, sections 5.8 and 11.4, dated Aug. 2017, retrieved on Aug. 29, 2018, 5 pages.

\* cited by examiner

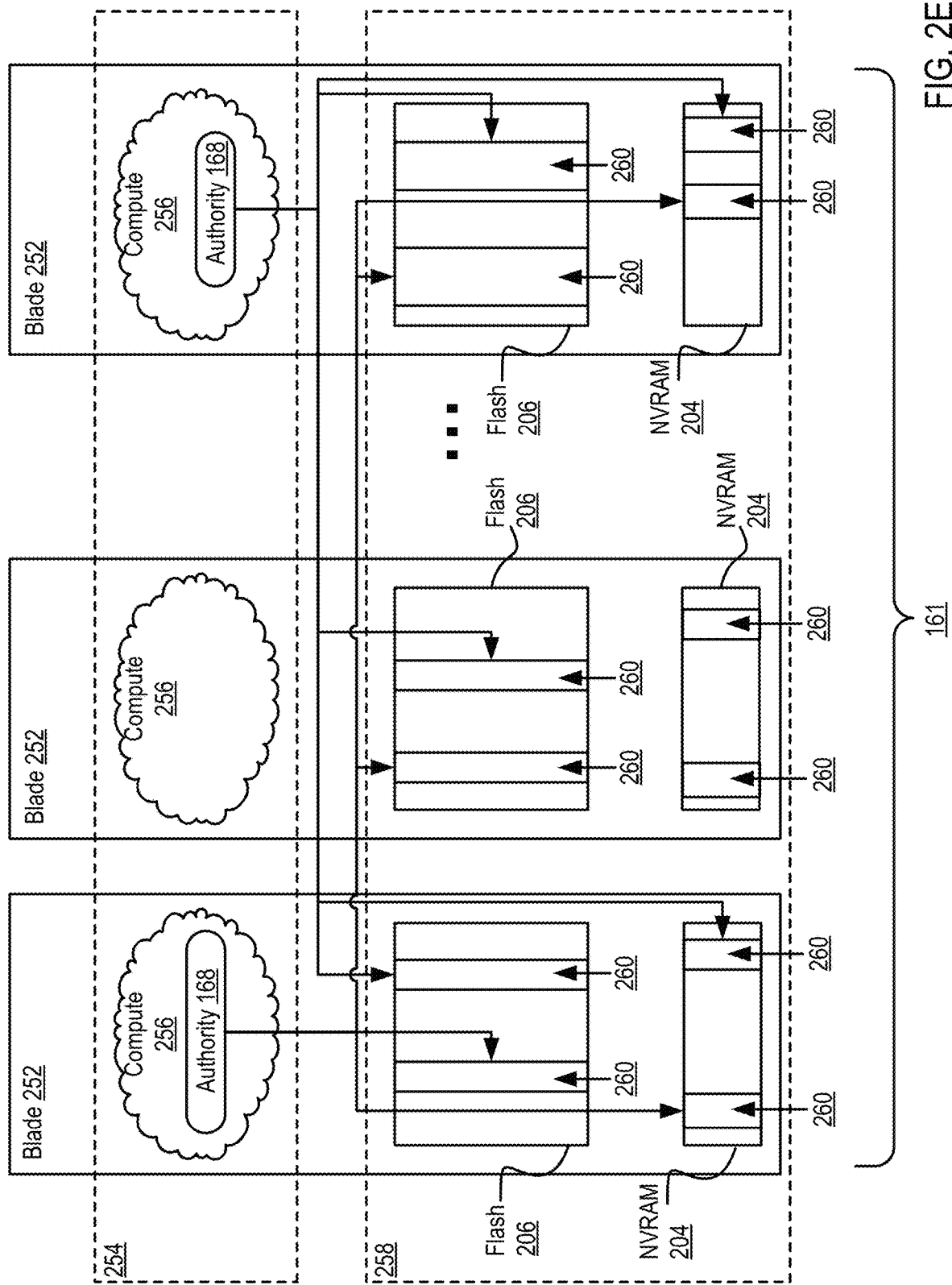

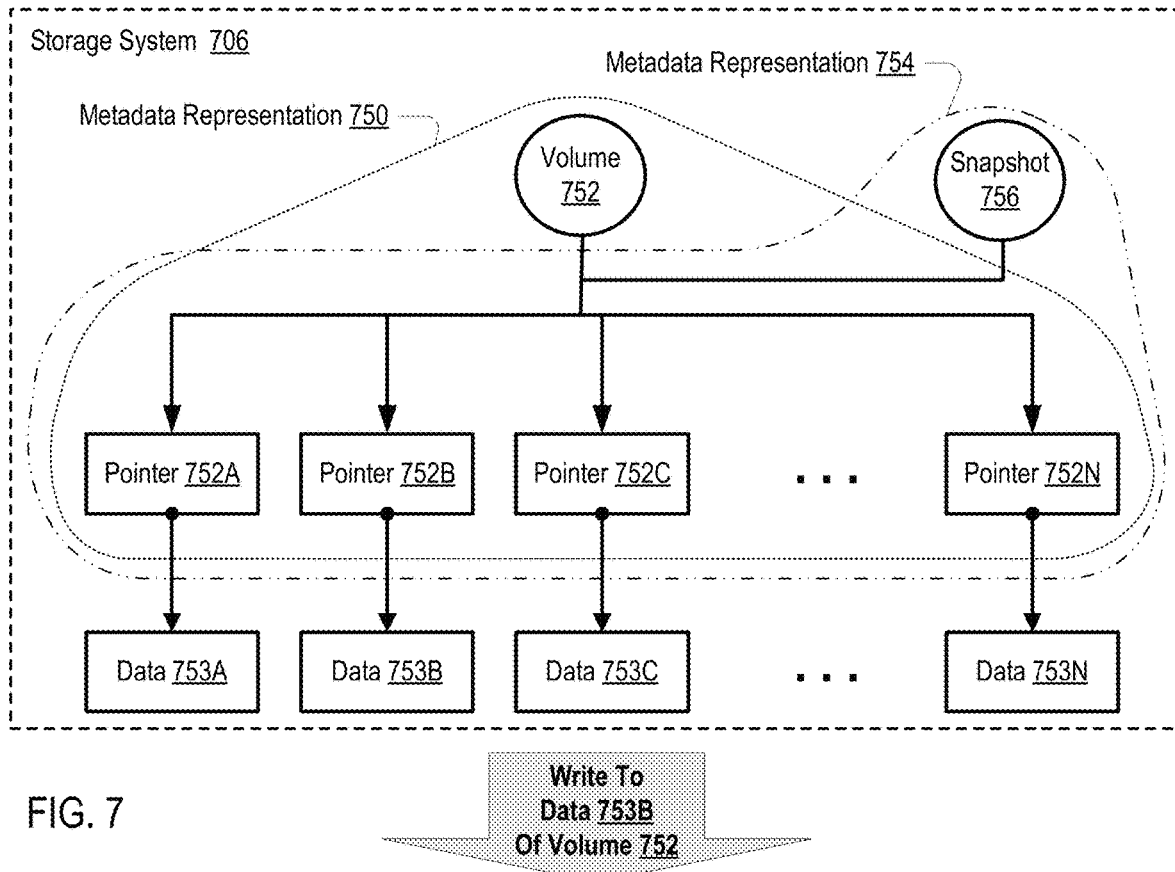
FIG. 7
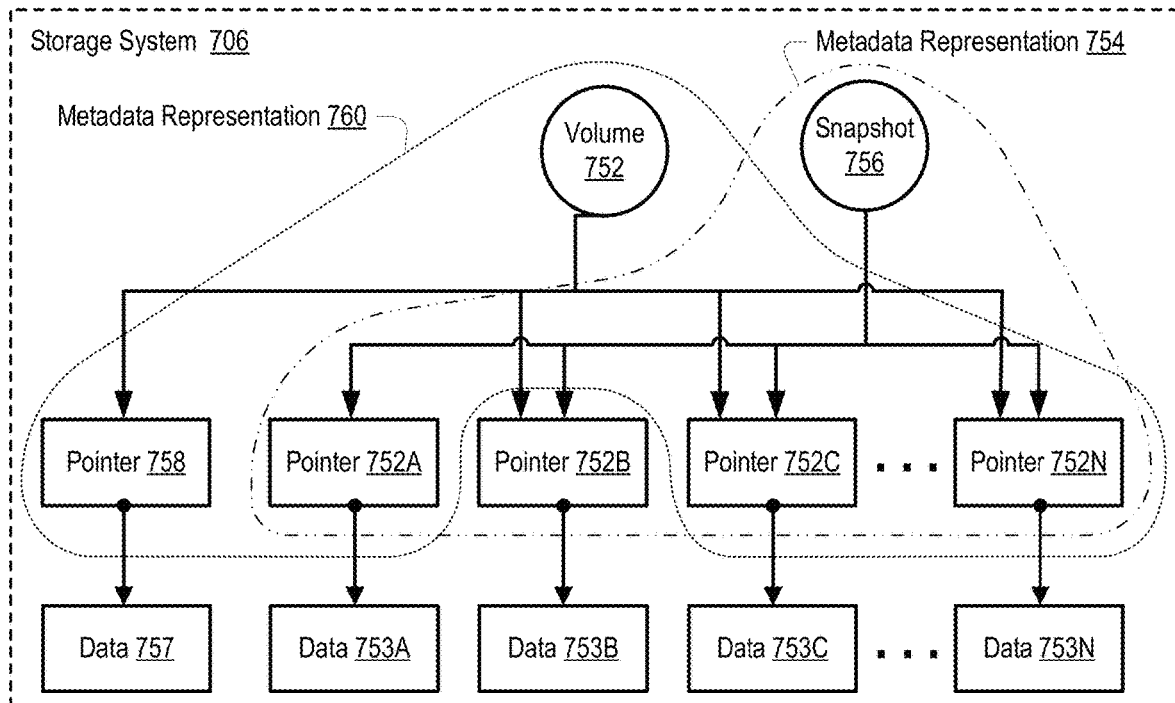

SWITCHING BETWEEN FAULT RESPONSE MODELS IN A STORAGE SYSTEM

CROSS-REFERENCE TO RELATED APPLICATIONS

This application is a continuation application of and claims priority from U.S. Pat. No. 10,992,598, issued Apr. 27, 2021, which is a non-provisional application for patent entitled to a filing date and claiming the benefit of earlier-filed: U.S. Provisional Patent Application Ser. No. 62/674,570, filed May 21, 2018, and U.S. Provisional Patent Application Ser. No. 62/695,433, filed Jul. 9, 2018.

BRIEF DESCRIPTION OF DRAWINGS

FIG. 2E is a blade hardware block diagram, showing a control plane, compute and storage planes, and authorities interacting with underlying physical resources, in accordance with some embodiments.

FIG. 7 sets forth diagrams of metadata representations that may be implemented as a structured collection of metadata objects that may represent a logical volume of storage data, or a portion of a logical volume, in accordance with some embodiments of the present disclosure.

DESCRIPTION OF EMBODIMENTS

Figure 1A:
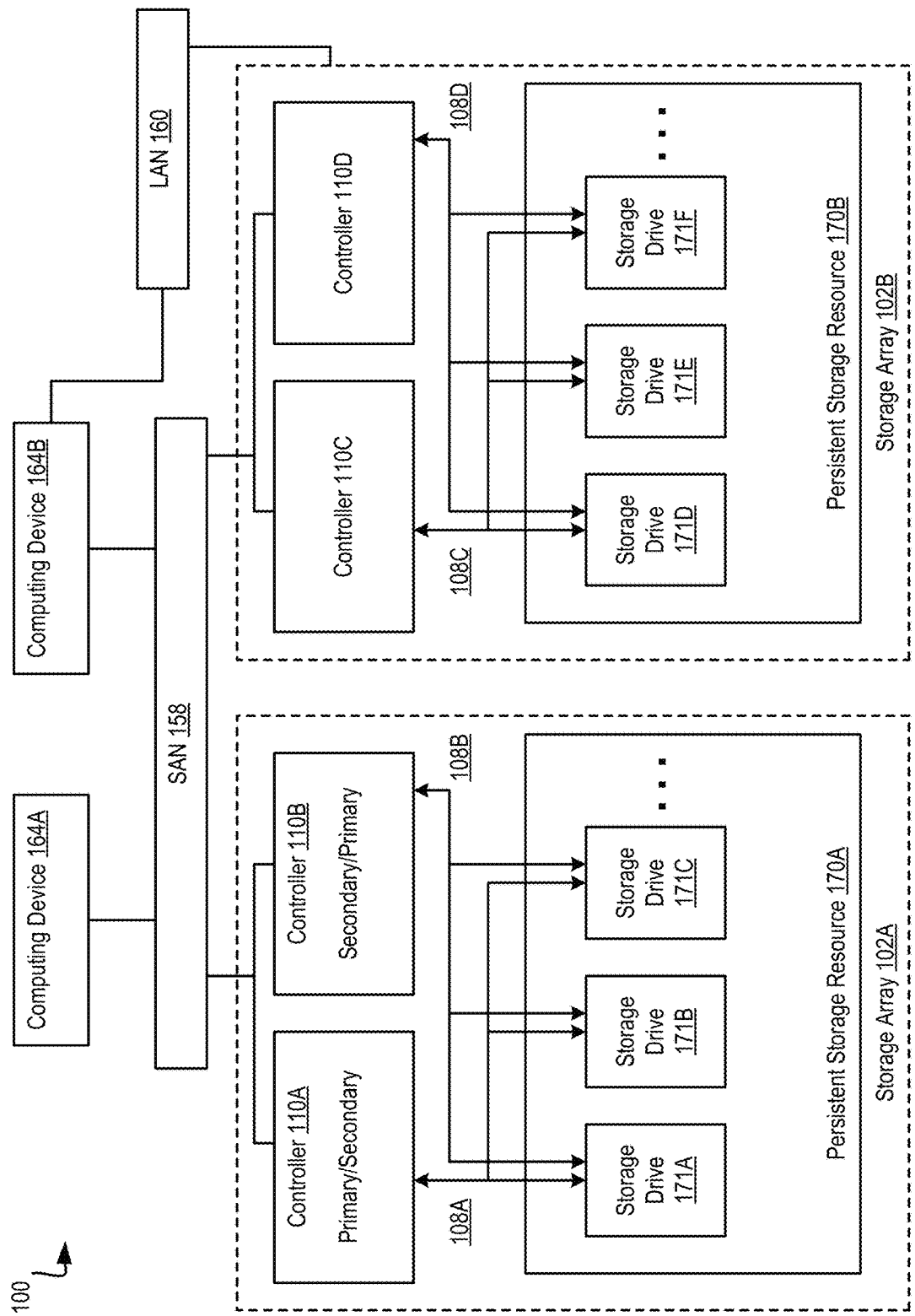
FIG. 1A illustrates a first example system for data storage in accordance with some implementations.

Example methods, apparatus, and products for switching between fault response models within a storage system synchronously replicating data in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol (SIT), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110 (also referred to as "controller" herein). A storage array controller 110 may be embodied as a module of automated computing machinery comprising computer hardware, computer software, or a combination of computer hardware and software. In some implementations, the storage array controllers 110 may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110 may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110 may include, for example, a data communications adapter configured to support communications via the SAN 158 or LAN 160. In some implementations, storage array controller 110 may be independently coupled to the LAN 160. In implementations, storage array controller 110 may include an I/O controller or the like that couples the storage array controller 110 for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110 may be configured to utilize the NVRAM devices as a quickly accessible buffer for data destined to be written to the storage drives 171A-F. Latency for write requests using NVRAM devices as a buffer may be improved relative to a system in which a storage array controller 110 writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include may include mechanical or spinning hard disk, such as hard-disk drives ('HDD').

In some implementations, the storage array controllers 110 may be configured for offloading device management responsibilities from storage drive 171A-F in storage array 102A-B. For example, storage array controllers 110 may manage control information that may describe the state of one or more memory blocks in the storage drives 171A-F. The control information may indicate, for example, that a particular memory block has failed and should no longer be written to, that a particular memory block contains boot code for a storage array controller 110, the number of program-erase ('PIE') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110. The selected memory blocks may be tagged with an identifier indicating that the selected memory block contains control information. The identifier may be utilized by the storage array controllers 110 in conjunction with storage drives 171A-F to quickly identify the memory blocks that contain control information. For example, the storage controllers 110 may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110 may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110 querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110 that includes the location of control information for the storage drive 171A-F. Responsive to receiving the response message, storage array controllers 110 may issue a request to read data stored at the address associated with the location of control information for the storage drives 171A-F.

In other implementations, the storage array controllers 110 may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110. For example, storage array 102A may include storage array controllers 110A and storage array controllers 110B. At a given instance, a single storage array controller 110 (e.g., storage array controller 110A) of a storage system 100 may be designated with primary status (also referred to as "primary controller" herein), and other storage array controllers 110 (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110 may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110 are communicatively coupled, via a midplane (not shown), to one or more storage drives 171A-F and to one or more NVRAM devices (not shown) that are included as part of a storage array 102A-B. The storage array controllers 110 may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
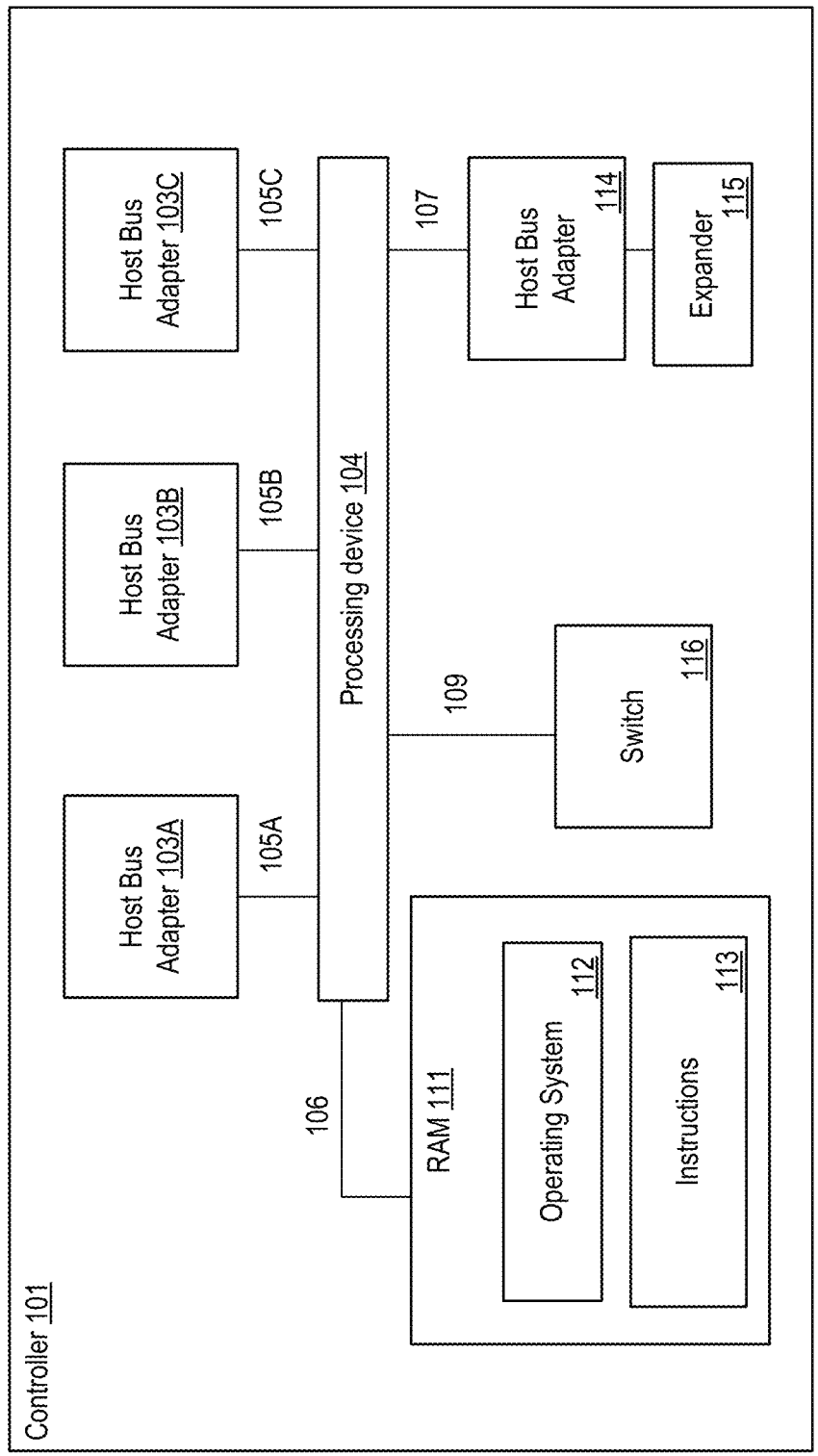
FIG. 1B illustrates a second example system for data storage in accordance with some implementations.

FIG. 1B illustrates an example system for data storage, in accordance with some implementations. Storage array controller 101 illustrated in FIG. 1B may similar to the storage array controllers 110 described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an application specific integrated circuit ('ASIC'), a field programmable gate array ('FPGA'), a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system.

In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
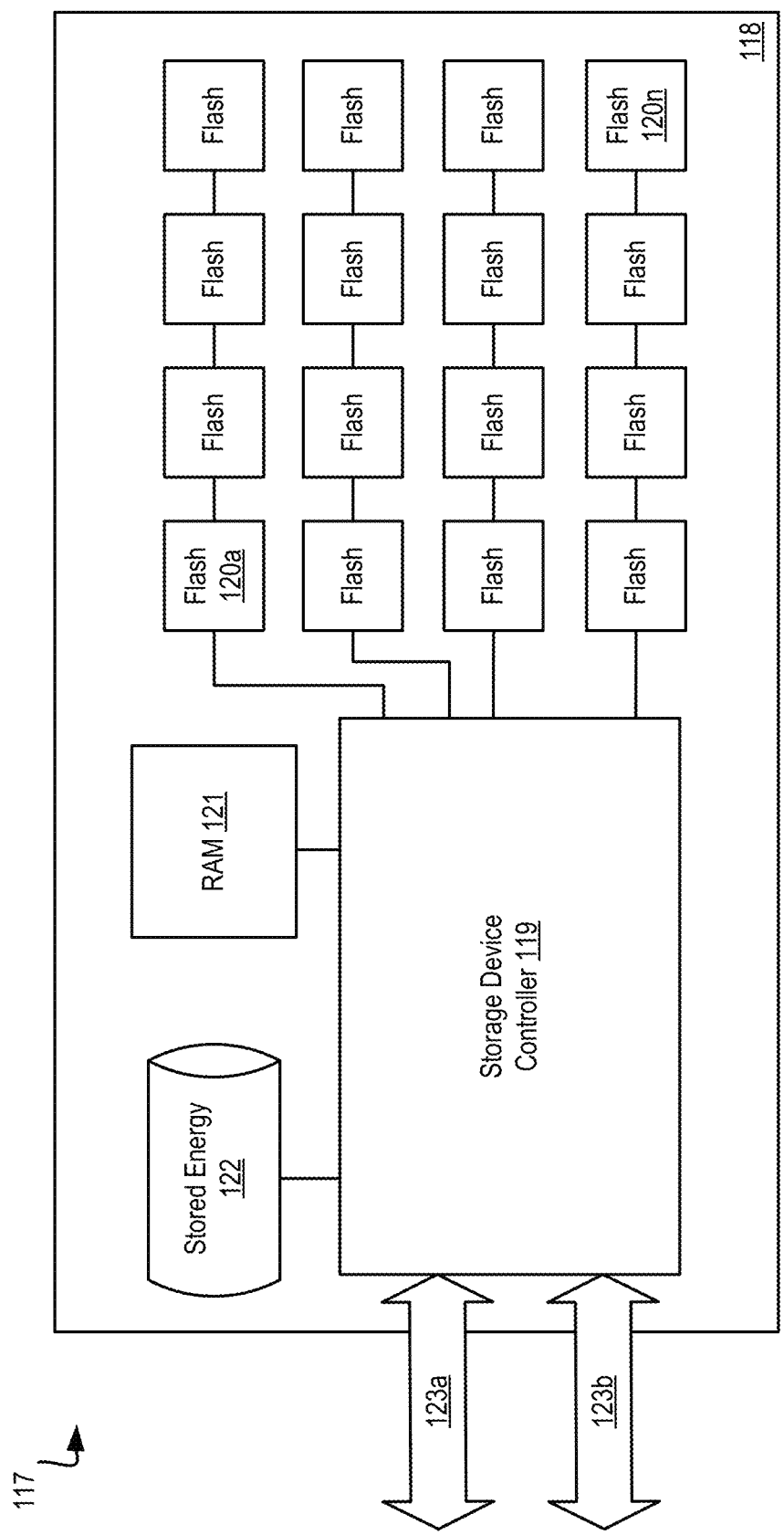
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage controller 119. In one embodiment, storage controller 119 may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119 as an addressable collection of Flash pages, erase blocks, and/or control elements sufficient to allow the storage device controller 119 to program and retrieve various aspects of the Flash. In one embodiment, storage device controller 119 may perform operations on flash memory devices 120A-N including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119 or multiple storage device controllers. The RAM 121 may be utilized for other purposes as well, such as temporary program memory for a processing device (e.g., a CPU) in the storage device controller 119.

In one embodiment, system 119 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119 may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119 from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119 may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119 may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 107a-120n stored energy device 122 may power storage device controller 119 and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
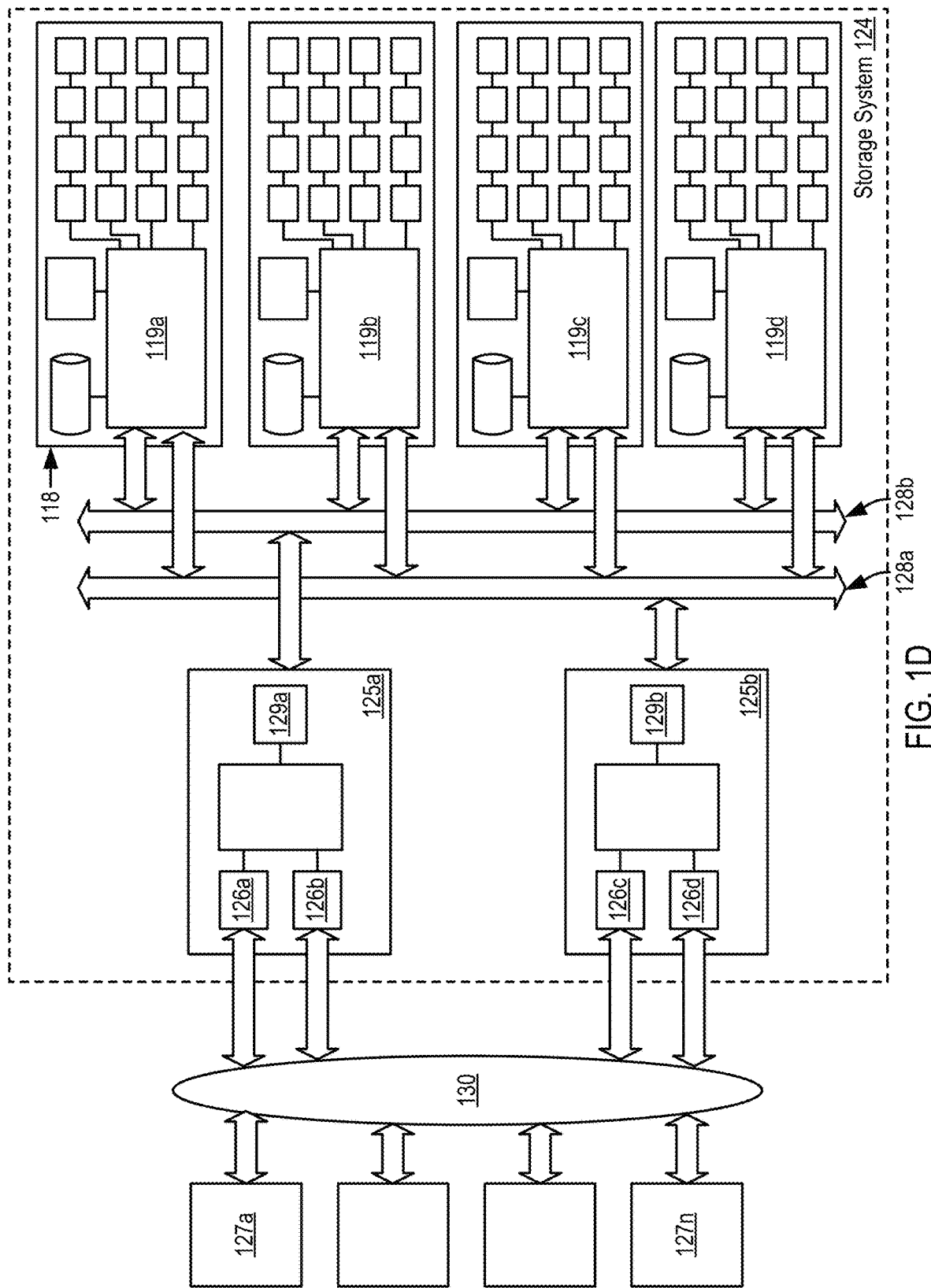
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage devices 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119 may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
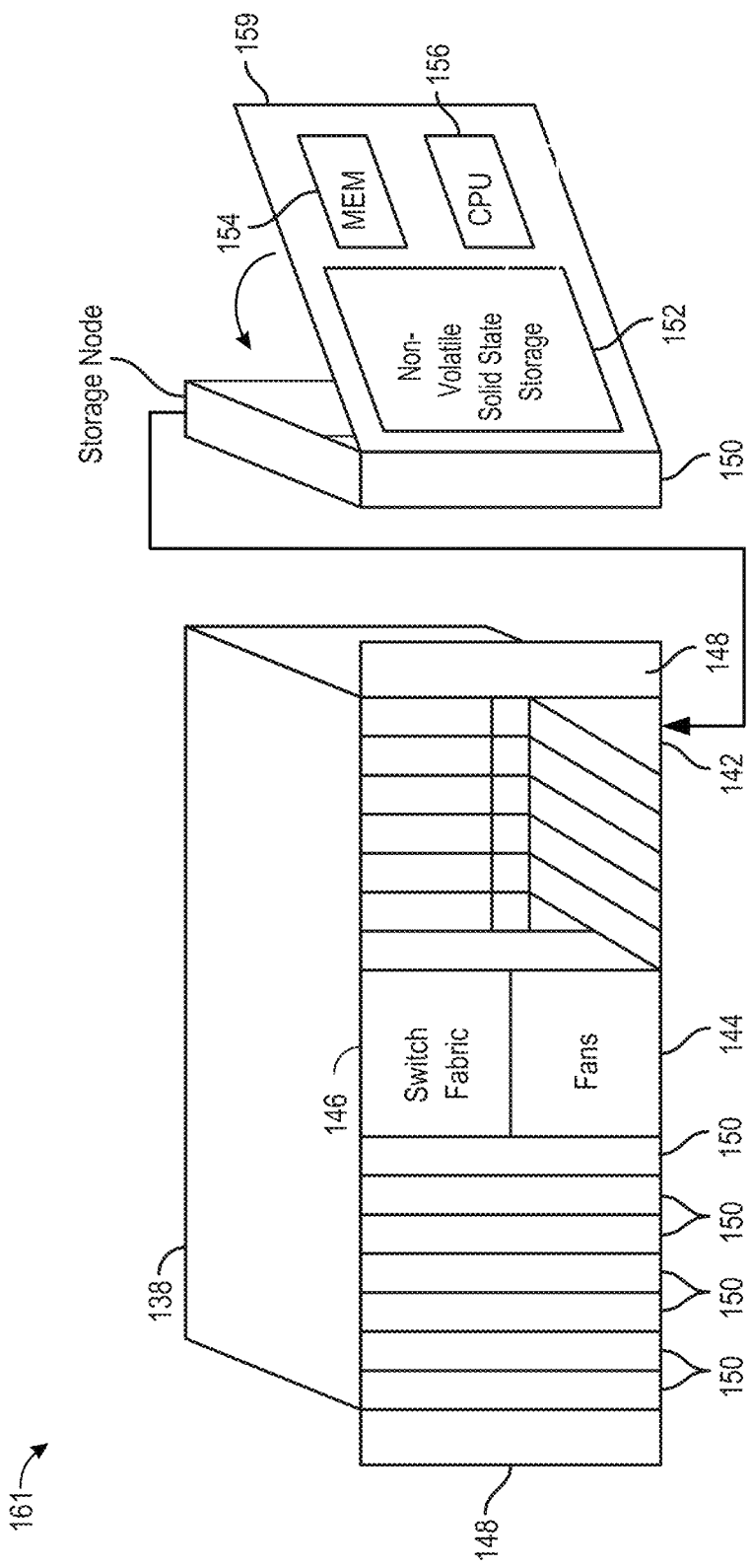
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
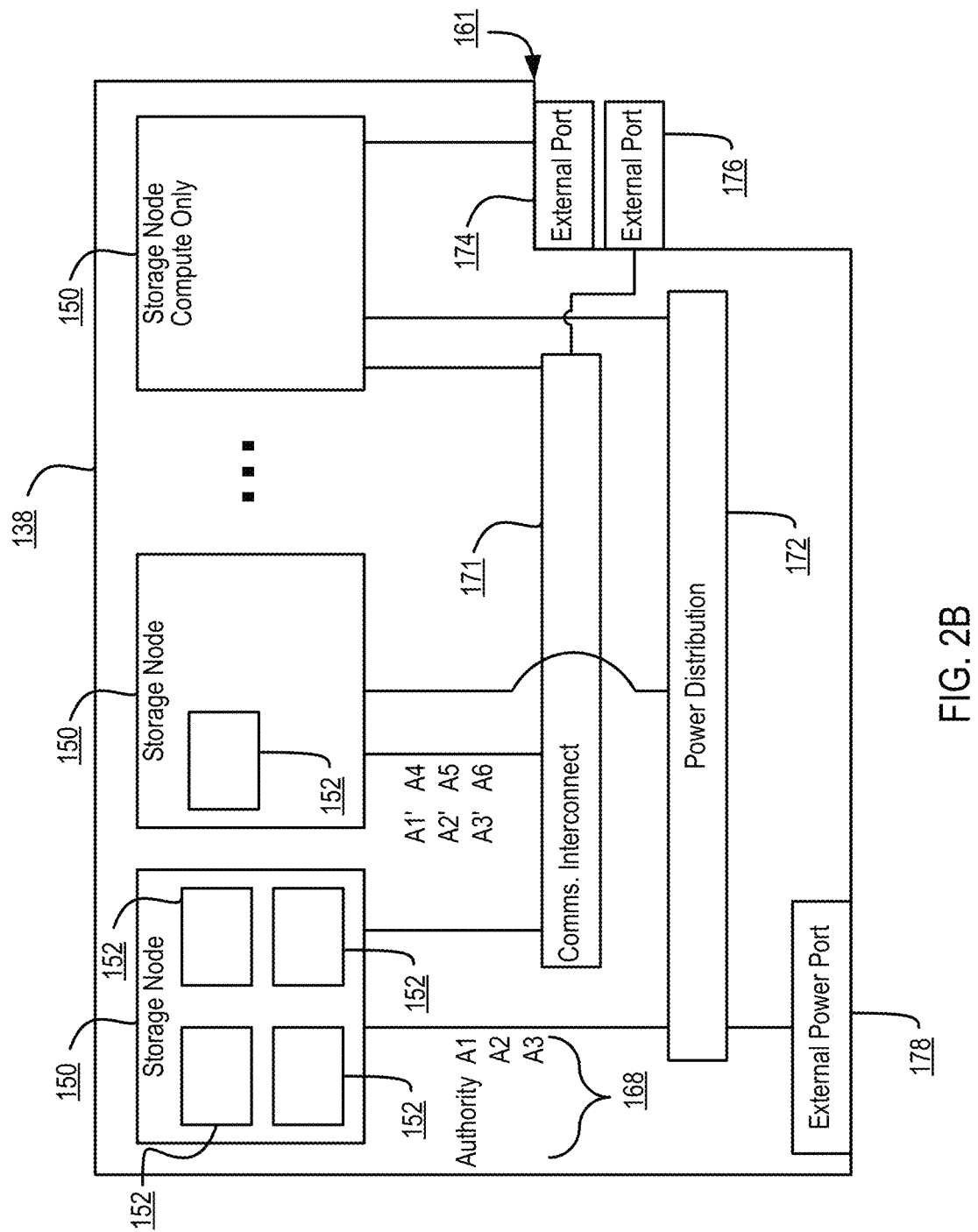
FIG. 2B is a block diagram showing an interconnect switch coupling multiple storage nodes in accordance with some embodiments.

FIG. 2B is a block diagram showing a communications interconnect 171A-F and power distribution bus 172 coupling multiple storage nodes 150. Referring back to FIG. 2A, the communications interconnect 171A-F can be included in or implemented with the switch fabric 146 in some embodiments. Where multiple storage clusters 161 occupy a rack, the communications interconnect 171A-F can be included in or implemented with a top of rack switch, in some embodiments. As illustrated in FIG. 2B, storage cluster 161 is enclosed within a single chassis 138. External port 176 is coupled to storage nodes 150 through communications interconnect 171A-F, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('IDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
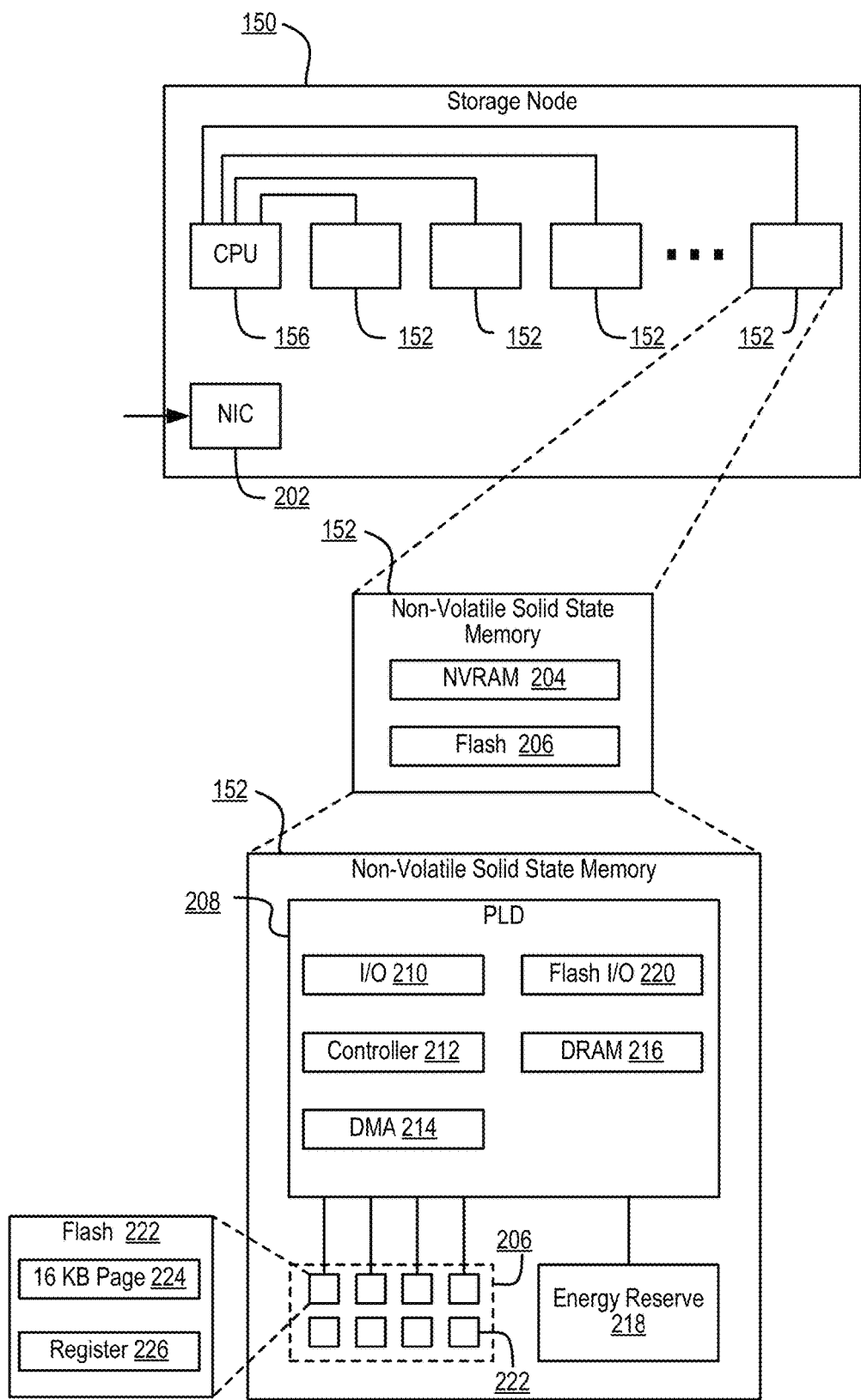
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
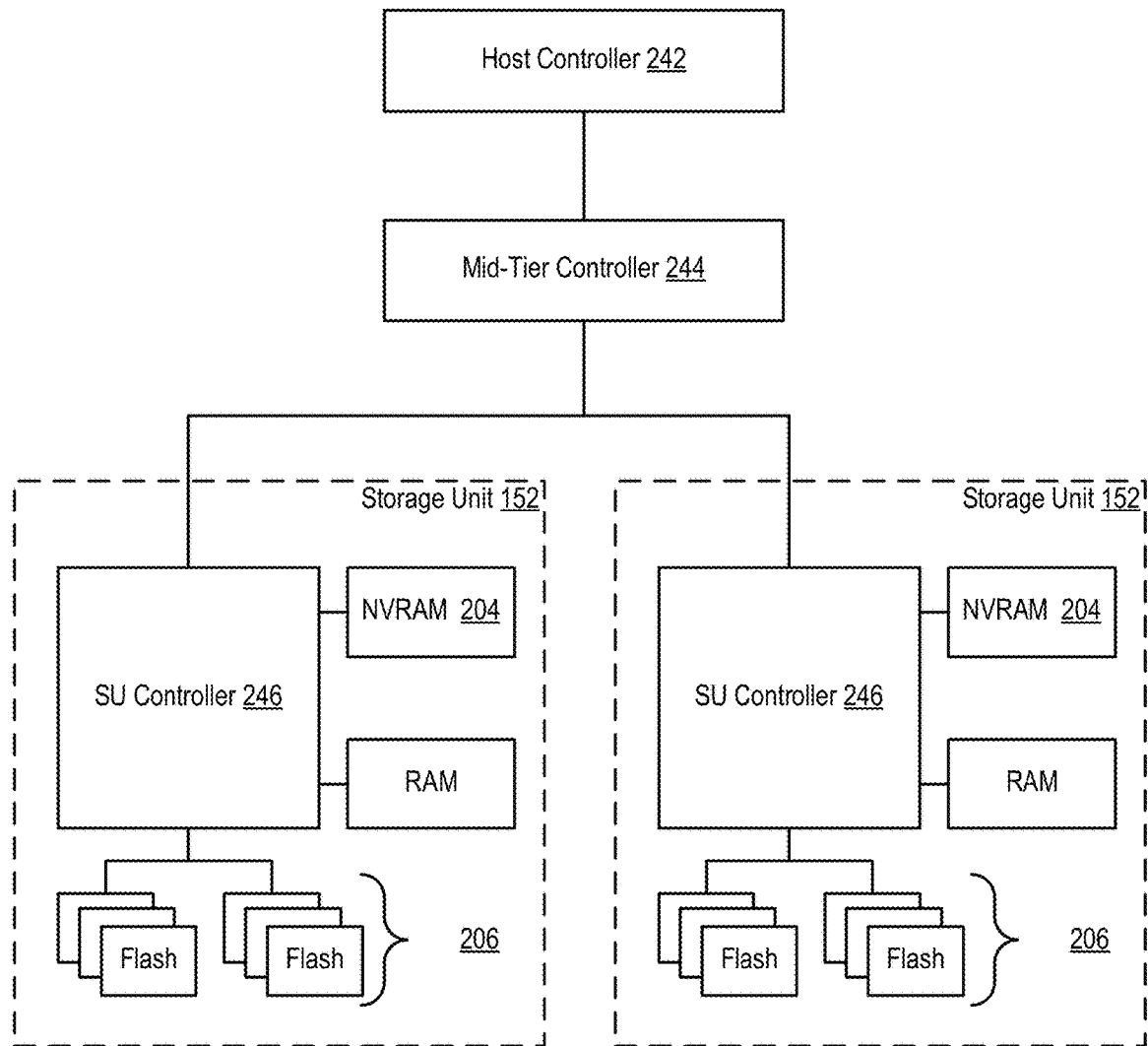
FIG. 2D shows a storage server environment, which uses embodiments of the storage nodes and storage units of some previous figures in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA (field programmable gate array), flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources.

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g. partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
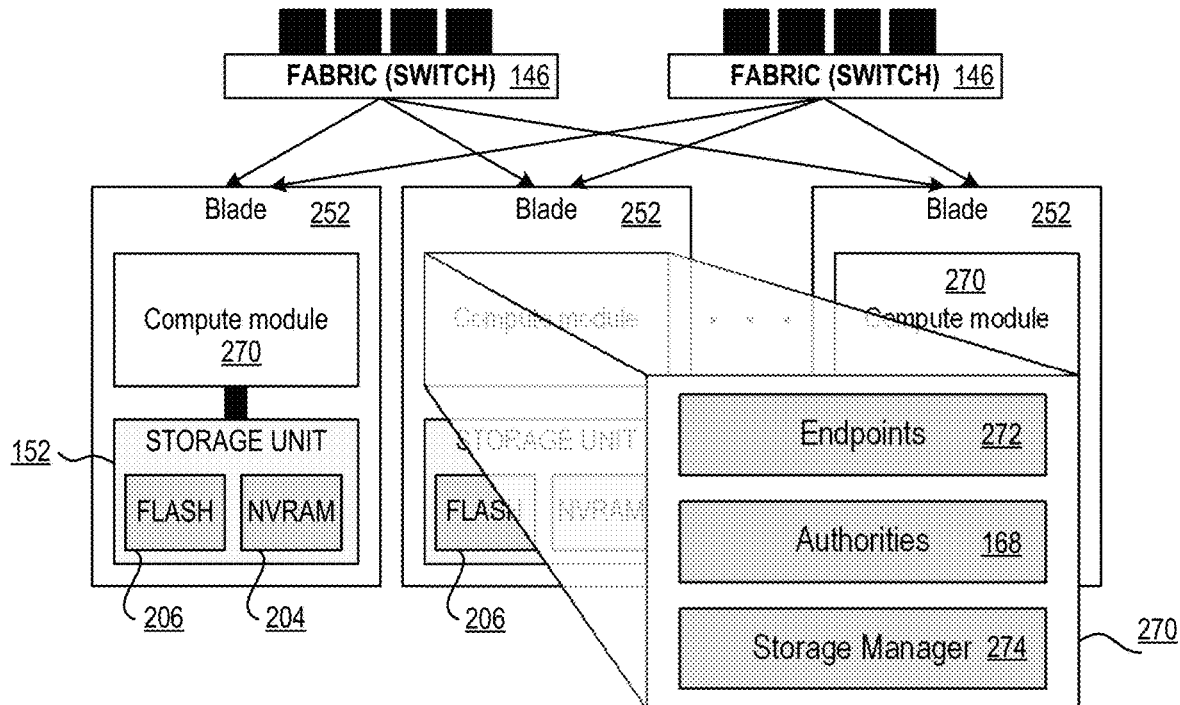
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
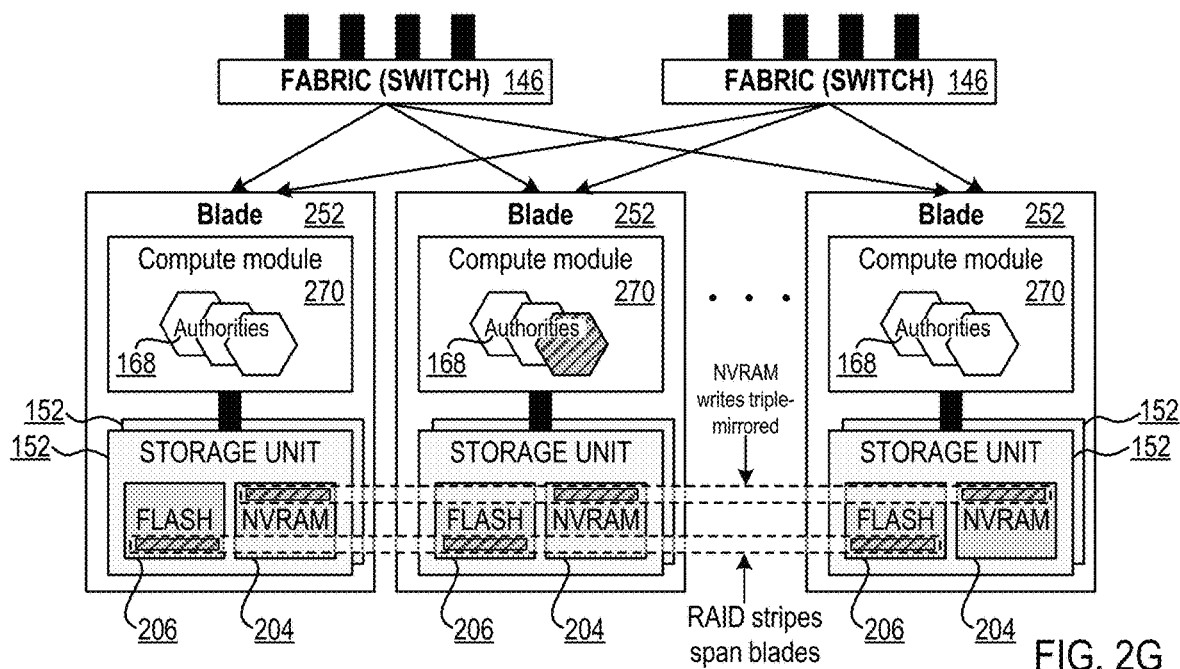
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS' environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block (' SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
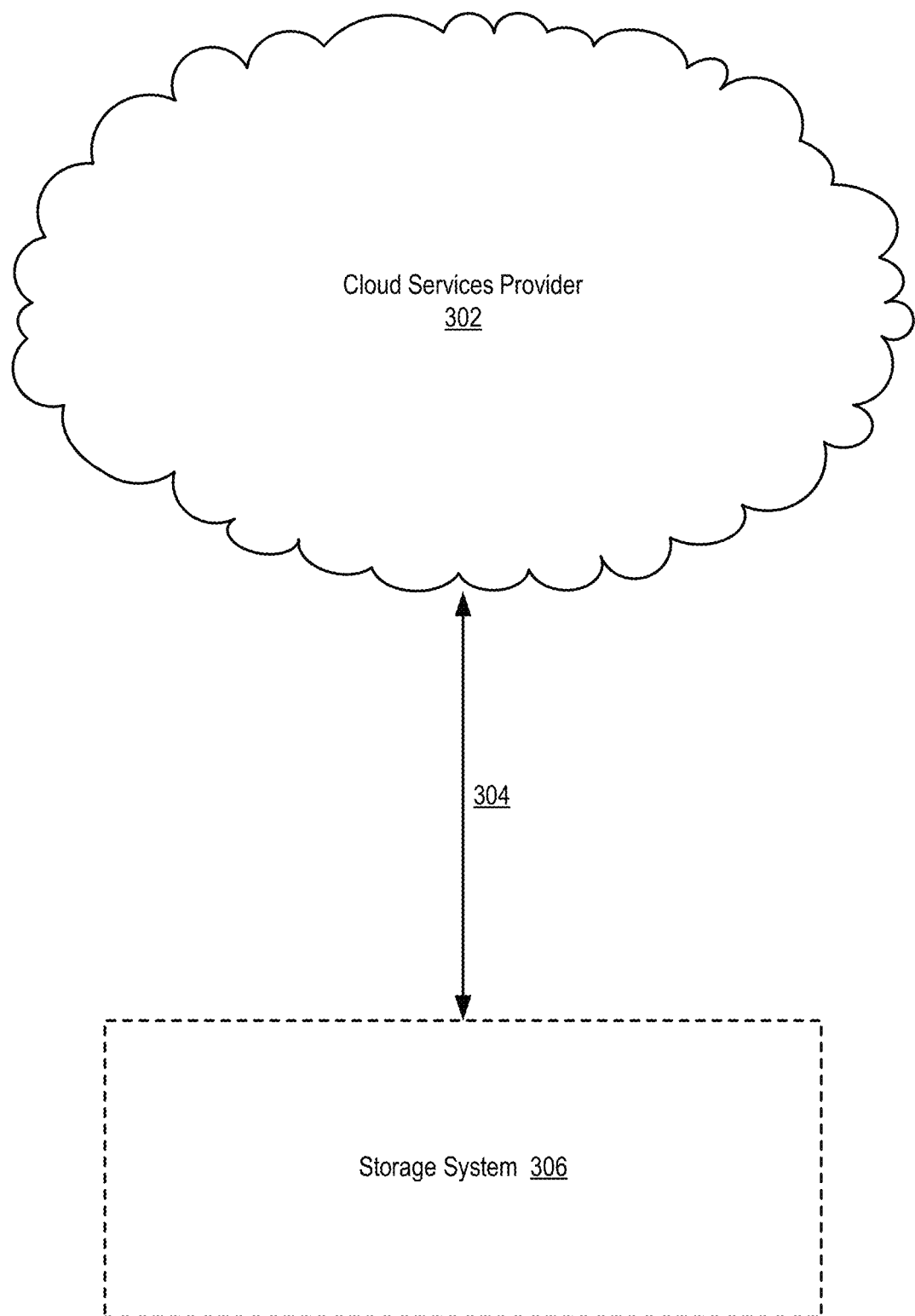
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or local area network ('LAN'), or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services to the storage system 306 and users of the storage system 306 through the implementation of an infrastructure as a service ('IaaS') service model where the cloud services provider 302 offers computing infrastructure such as virtual machines and other resources as a service to subscribers. In addition, the cloud services provider 302 may be configured to provide services to the storage system 306 and users of the storage system 306 through the implementation of a platform as a service ('PaaS') service model where the cloud services provider 302 offers a development environment to application developers. Such a development environment may include, for example, an operating system, programming-language execution environment, database, web server, or other components that may be utilized by application developers to develop and run software solutions on a cloud platform. Furthermore, the cloud services provider 302 may be configured to provide services to the storage system 306 and users of the storage system 306 through the implementation of a software as a service ('SaaS') service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. The cloud services provider 302 may be further configured to provide services to the storage system 306 and users of the storage system 306 through the implementation of an authentication as a service ('AaaS') service model where the cloud services provider 302 offers authentication services that can be used to secure access to applications, data sources, or other resources. The cloud services provider 302 may also be configured to provide services to the storage system 306 and users of the storage system 306 through the implementation of a storage as a service model where the cloud services provider 302 offers access to its storage infrastructure for use by the storage system 306 and users of the storage system 306. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. Public cloud and private cloud deployment models may differ and may come with various advantages and disadvantages. For example, because a public cloud deployment involves the sharing of a computing infrastructure across different organization, such a deployment may not be ideal for organizations with security concerns, mission-critical workloads, uptime requirements demands, and so on. While a private cloud deployment can address some of these issues, a private cloud deployment may require on-premises staff to manage the private cloud. In still alternative embodiments, the cloud services provider 302 may be embodied as a mix of a private and public cloud services with a hybrid cloud deployment.

Although not explicitly depicted in FIG. 3A, readers will appreciate that additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive telemetry data phoned home by the storage system 306. Such telemetry data may describe various operating characteristics of the storage system 306 and may be analyzed, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
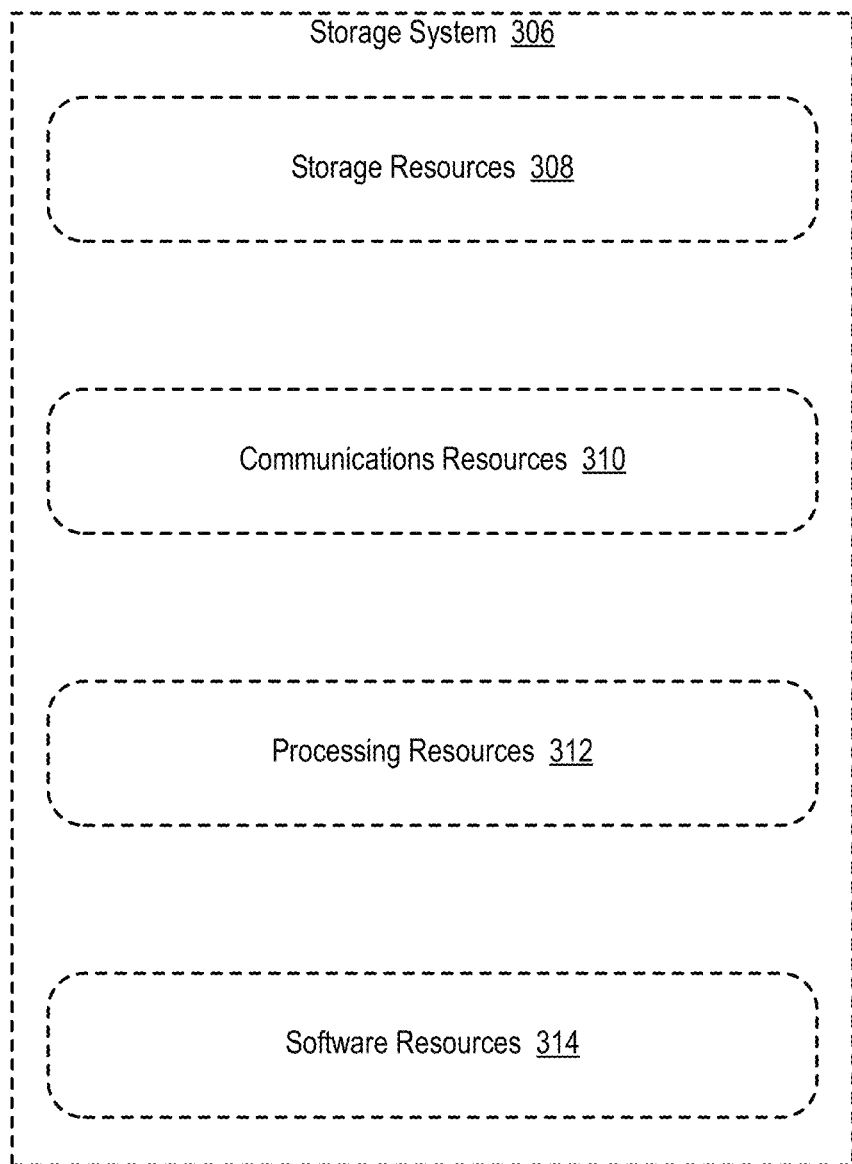
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include storage resources 308, which may be embodied in many forms. For example, in some embodiments the storage resources 308 can include nano-RAM or another form of nonvolatile random access memory that utilizes carbon nanotubes deposited on a substrate. In some embodiments, the storage resources 308 may include 3D crosspoint non-volatile memory in which bit storage is based on a change of bulk resistance, in conjunction with a stackable cross-gridded data access array. In some embodiments, the storage resources 308 may include flash memory, including single-level cell ('SLC') NAND flash, multi-level cell ('MLC') NAND flash, triple-level cell ('TLC') NAND flash, quad-level cell ('QLC') NAND flash, and others. In some embodiments, the storage resources 308 may include non-volatile magnetoresistive random-access memory ('MRAM'), including spin transfer torque ('STT') MRAM, in which data is stored through the use of magnetic storage elements. In some embodiments, the example storage resources 308 may include non-volatile phase-change memory ('PCM') that may have the ability to hold multiple bits in a single cell as cells can achieve a number of distinct intermediary states. In some embodiments, the storage resources 308 may include quantum memory that allows for the storage and retrieval of photonic quantum information. In some embodiments, the example storage resources 308 may include resistive random-access memory ('ReRAM') in which data is stored by changing the resistance across a dielectric solid-state material. In some embodiments, the storage resources 308 may include storage class memory ('SCM') in which solid-state nonvolatile memory may be manufactured at a high density using some combination of sub-lithographic patterning techniques, multiple bits per cell, multiple layers of devices, and so on. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC networks. The communications resources 310 can also include FC over ethernet ('FCoE') technologies through which FC frames are encapsulated and transmitted over Ethernet networks. The communications resources 310 can also include InfiniBand ('IB') technologies in which a switched fabric topology is utilized to facilitate transmissions between channel adapters. The communications resources 310 can also include NVM Express ('NVMe') technologies and NVMe over fabrics ('NVMeoF') technologies through which non-volatile storage media attached via a PCI express ('PCIe') bus may be accessed. The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more application-specific integrated circuits ('ASICs') that are customized for some particular purpose as well as one or more central processing units ('CPUs'). The processing resources 312 may also include one or more digital signal processors ('DSPs'), one or more field-programmable gate arrays ('FPGAs'), one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform various tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques. Through the use of such data protection techniques, business continuity and disaster recovery objectives may be met as a failure of the storage system may not result in the loss of data stored in the storage system.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Readers will appreciate that the various components depicted in FIG. 3B may be grouped into one or more optimized computing packages as converged infrastructures. Such converged infrastructures may include pools of computers, storage and networking resources that can be shared by multiple applications and managed in a collective manner using policy-driven processes. Such converged infrastructures may minimize compatibility issues between various components within the storage system 306 while also reducing various costs associated with the establishment and operation of the storage system 306. Such converged infrastructures may be implemented with a converged infrastructure reference architecture, with standalone appliances, with a software driven hyper-converged approach (e.g., hyper-converged infrastructures), or in other ways.

Readers will appreciate that the storage system 306 depicted in FIG. 3B may be useful for supporting various types of software applications. For example, the storage system 306 may be useful in supporting artificial intelligence ('AI') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may be also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. A GPU is a modern processor with thousands of cores, well-suited to run algorithms that loosely represent the parallel nature of the human brain.

Advances in deep neural networks have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing, and many others. Training deep neural networks, however, requires both high quality input data and large amounts of computation. GPUs are massively parallel processors capable of operating on large amounts of data simultaneously. When combined into a multi-GPU cluster, a high throughput pipeline may be required to feed input data from storage to the compute engines. Deep learning is more than just constructing and training models. There also exists an entire data pipeline that must be designed for the scale, iteration, and experimentation necessary for a data science team to succeed.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

A data scientist works to improve the usefulness of the trained model through a wide variety of approaches: more data, better data, smarter training, and deeper models. In many cases, there will be teams of data scientists sharing the same datasets and working in parallel to produce new and improved training models. Often, there is a team of data scientists working within these phases concurrently on the same shared datasets. Multiple, concurrent workloads of data processing, experimentation, and full-scale training layer the demands of multiple access patterns on the storage tier. In other words, storage cannot just satisfy large file reads, but must contend with a mix of large and small file reads and writes. Finally, with multiple data scientists exploring datasets and models, it may be critical to store data in its native format to provide flexibility for each user to transform, clean, and use the data in a unique way. The storage systems described above may provide a natural shared storage home for the dataset, with data protection redundancy (e.g., by using RAID6) and the performance necessary to be a common access point for multiple developers and multiple experiments. Using the storage systems described above may avoid the need to carefully copy subsets of the data for local work, saving both engineering and GPU-accelerated servers use time. These copies become a constant and growing tax as the raw data set and desired transformations constantly update and change.

Readers will appreciate that a fundamental reason why deep learning has seen a surge in success is the continued improvement of models with larger data set sizes. In contrast, classical machine learning algorithms, like logistic regression, stop improving in accuracy at smaller data set sizes. As such, the separation of compute resources and storage resources may also allow independent scaling of each tier, avoiding many of the complexities inherent in managing both together. As the data set size grows or new data sets are considered, a scale out storage system must be able to expand easily. Similarly, if more concurrent training is required, additional GPUs or other compute resources can be added without concern for their internal storage. Furthermore, the storage systems described above may make building, operating, and growing an AI system easier due to the random read bandwidth provided by the storage systems, the ability to of the storage systems to randomly read small files (50 KB) high rates (meaning that no extra effort is required to aggregate individual data points to make larger, storage-friendly files), the ability of the storage systems to scale capacity and performance as either the dataset grows or the throughput requirements grow, the ability of the storage systems to support files or objects, the ability of the storage systems to tune performance for large or small files (i.e., no need for the user to provision filesystems), the ability of the storage systems to support non-disruptive upgrades of hardware and software even during production model training, and for many other reasons.

Small file performance of the storage tier may be critical as many types of inputs, including text, audio, or images will be natively stored as small files. If the storage tier does not handle small files well, an extra step will be required to pre-process and group samples into larger files. Storage, built on top of spinning disks, that relies on SSD as a caching tier, may fall short of the performance needed. Because training with random input batches results in more accurate models, the entire data set must be accessible with full performance. SSD caches only provide high performance for a small subset of the data and will be ineffective at hiding the latency of spinning drives.

Readers will appreciate that the storage systems described above may be configured to support the storage of (among of types of data) blockchains. Such blockchains may be embodied as a continuously growing list of records, called blocks, which are linked and secured using cryptography. Each block in a blockchain may contain a hash pointer as a link to a previous block, a timestamp, transaction data, and so on. Blockchains may be designed to be resistant to modification of the data and can serve as an open, distributed ledger that can record transactions between two parties efficiently and in a verifiable and permanent way. This makes blockchains potentially suitable for the recording of events, medical records, and other records management activities, such as identity management, transaction processing, and others.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the systems described above may be better suited for the applications described above relative to other systems that may include, for example, a distributed direct-attached storage (DDAS) solution deployed in server nodes. Such DDAS solutions may be built for handling large, less sequential accesses but may be less able to handle small, random accesses. Readers will further appreciate that the storage systems described above may be utilized to provide a platform for the applications described above that is preferable to the utilization of cloud-based resources as the storage systems may be included in an on-site or in-house infrastructure that is more secure, more locally and internally managed, more robust in feature sets and performance, or otherwise preferable to the utilization of cloud-based resources as part of a platform to support the applications described above. For example, services built on platforms such as IBM's Watson may require a business enterprise to distribute individual user information, such as financial transaction information or identifiable patient records, to other institutions. As such, cloud-based offerings of AI as a service may be less desirable than internally managed and offered AI as a service that is supported by storage systems such as the storage systems described above, for a wide array of technical reasons as well as for various business reasons.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models."

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. Likewise, machines like locomotives and gas turbines that generate large amounts of information through the use of a wide array of data-generating sensors may benefit from the rapid data processing capabilities of an edge solution. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

Consider a specific example of inventory management in a warehouse, distribution center, or similar location. A large inventory, warehousing, shipping, order-fulfillment, manufacturing or other operation has a large amount of inventory on inventory shelves, and high resolution digital cameras that produce a firehose of large data. All of this data may be taken into an image processing system, which may reduce the amount of data to a firehose of small data. All of the small data may be stored on-premises in storage. The on-premises storage, at the edge of the facility, may be coupled to the cloud, for external reports, real-time control and cloud storage. Inventory management may be performed with the results of the image processing, so that inventory can be tracked on the shelves and restocked, moved, shipped, modified with new products, or discontinued/obsolescent products deleted, etc. The above scenario is a prime candidate for an embodiment of the configurable processing and storage systems described above. A combination of compute-only blades and offload blades suited for the image processing, perhaps with deep learning on offload-FPGA or offload-custom blade(s) could take in the firehose of large data from all of the digital cameras, and produce the firehose of small data. All of the small data could then be stored by storage nodes, operating with storage units in whichever combination of types of storage blades best handles the data flow. This is an example of storage and function acceleration and integration. Depending on external communication needs with the cloud, and external processing in the cloud, and depending on reliability of network connections and cloud resources, the system could be sized for storage and compute management with bursty workloads and variable conductivity reliability. Also, depending on other inventory management aspects, the system could be configured for scheduling and resource management in a hybrid edge/cloud environment.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. Big data analytics applications enable data scientists, predictive modelers, statisticians and other analytics professionals to analyze growing volumes of structured transaction data, plus other forms of data that are often left untapped by conventional business intelligence (BI) and analytics programs. As part of that process, semi-structured and unstructured data such as, for example, internet clickstream data, web server logs, social media content, text from customer emails and survey responses, mobile-phone call-detail records, IoT sensor data, and other data may be converted to a structured form. Big data analytics is a form of advanced analytics, which involves complex applications with elements such as predictive models, statistical algorithms and what-if analyses powered by high-performance analytics systems.

The storage systems described above may also support (including implementing as a system interface) applications that perform tasks in response to human speech. For example, the storage systems may support the execution intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

Figure 4:
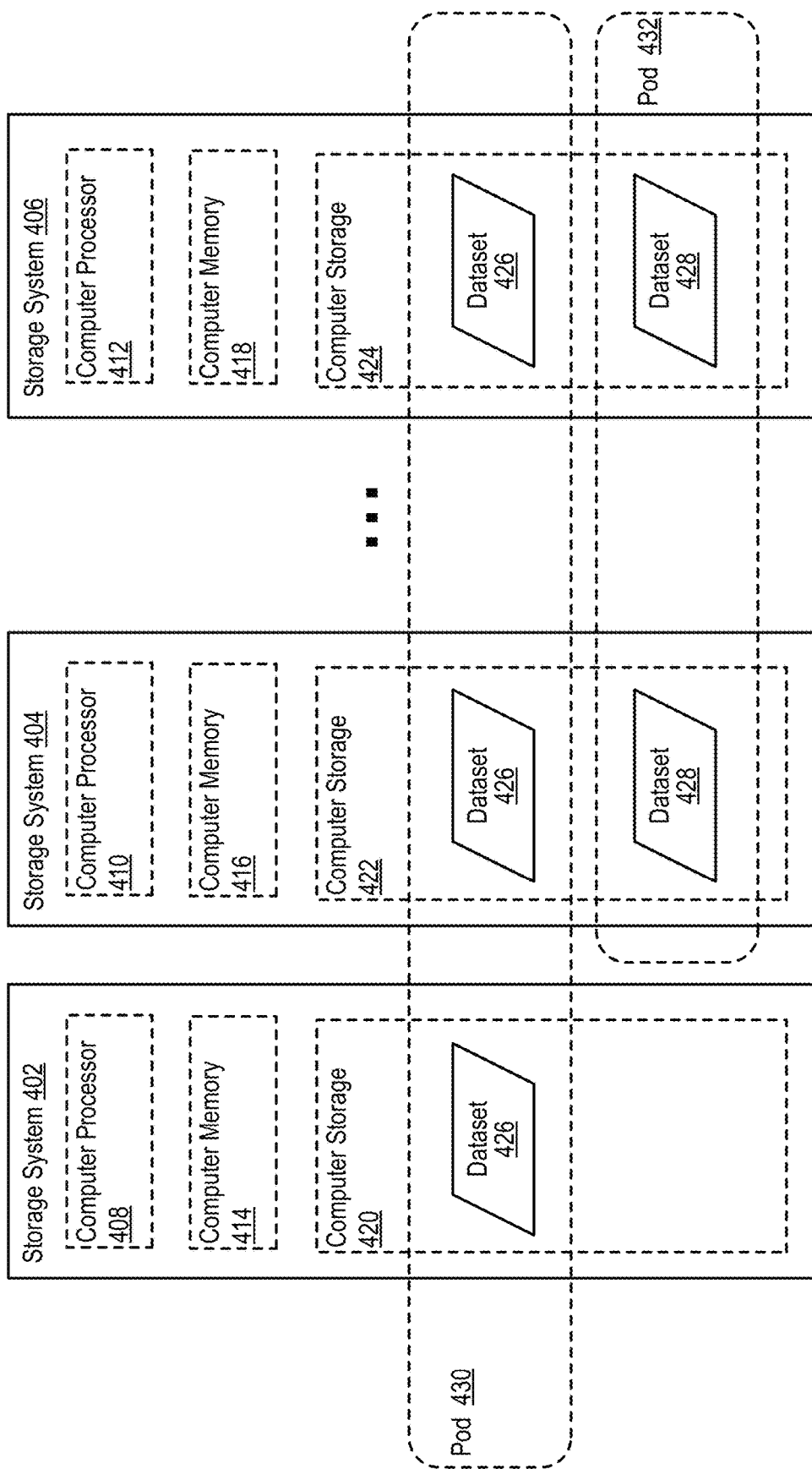
FIG. 4 sets forth a block diagram illustrating a plurality of storage systems that support a pod according to some embodiments of the present disclosure.

For further explanation, FIG. 4 sets forth a block diagram illustrating a plurality of storage systems (402, 404, 406) that support a pod according to some embodiments of the present disclosure. Although depicted in less detail, the storage systems (402, 404, 406) depicted in FIG. 4 may be similar to the storage systems described above with reference to FIGS. 1A-1D, FIGS. 2A-2G, FIGS. 3A-3B, or any combination thereof. In fact, the storage systems (402, 404, 406) depicted in FIG. 4 may include the same, fewer, or additional components as the storage systems described above.

In the example depicted in FIG. 4, each of the storage systems (402, 404, 406) is depicted as having at least one computer processor (408, 410, 412), computer memory (414, 416, 418), and computer storage (420, 422, 424). Although in some embodiments the computer memory (414, 416, 418) and the computer storage (420, 422, 424) may be part of the same hardware devices, in other embodiments the computer memory (414, 416, 418) and the computer storage (420, 422, 424) may be part of different hardware devices. The distinction between the computer memory (414, 416, 418) and the computer storage (420, 422, 424) in this particular example may be that the computer memory (414, 416, 418) is physically proximate to the computer processors (408, 410, 412) and may store computer program instructions that are executed by the computer processors (408, 410, 412), while the computer storage (420, 422, 424) is embodied as non-volatile storage for storing user data, metadata describing the user data, and so on. Referring to the example above in FIG. 1A, for example, the computer processors (408, 410, 412) and computer memory (414, 416, 418) for a particular storage system (402, 404, 406) may reside within one of more of the controllers (110A-110D) while the attached storage devices (171A-171F) may serve as the computer storage (420, 422, 424) within a particular storage system (402, 404, 406).

In the example depicted in FIG. 4, the depicted storage systems (402, 404, 406) may attach to one or more pods (430, 432) according to some embodiments of the present disclosure. Each of the pods (430, 432) depicted in FIG. 4 can include a dataset (426, 428). For example, a first pod (430) that three storage systems (402, 404, 406) have attached to includes a first dataset (426) while a second pod (432) that two storage systems (404, 406) have attached to includes a second dataset (428). In such an example, when a particular storage system attaches to a pod, the pod's dataset is copied to the particular storage system and then kept up to date as the dataset is modified. Storage systems can be removed from a pod, resulting in the dataset being no longer kept up to date on the removed storage system. In the example depicted in FIG. 4, any storage system which is active for a pod (it is an up-to-date, operating, non-faulted member of a non-faulted pod) can receive and process requests to modify or read the pod's dataset.

In the example depicted in FIG. 4, each pod (430, 432) may also include a set of managed objects and management operations, as well as a set of access operations to modify or read the dataset (426, 428) that is associated with the particular pod (430, 432). In such an example, the management operations may modify or query managed objects equivalently through any of the storage systems. Likewise, access operations to read or modify the dataset may operate equivalently through any of the storage systems. In such an example, while each storage system stores a separate copy of the dataset as a proper subset of the datasets stored and advertised for use by the storage system, the operations to modify managed objects or the dataset performed and completed through any one storage system are reflected in subsequent management objects to query the pod or subsequent access operations to read the dataset.

Readers will appreciate that pods may implement more capabilities than just a clustered synchronously replicated dataset. For example, pods can be used to implement tenants, whereby datasets are in some way securely isolated from each other. Pods can also be used to implement virtual arrays or virtual storage systems where each pod is presented as a unique storage entity on a network (e.g., a Storage Area Network, or Internet Protocol network) with separate addresses. In the case of a multi-storage-system pod implementing a virtual storage system, all physical storage systems associated with the pod may present themselves as in some way the same storage system (e.g., as if the multiple physical storage systems were no different than multiple network ports into a single storage system).

Readers will appreciate that pods may also be units of administration, representing a collection of volumes, file systems, object/analytic stores, snapshots, and other administrative entities, where making administrative changes (e.g., name changes, property changes, managing exports or permissions for some part of the pod's dataset), on any one storage system is automatically reflected to all active storage systems associated with the pod. In addition, pods could also be units of data collection and data analysis, where performance and capacity metrics are presented in ways that aggregate across all active storage systems for the pod, or that call out data collection and analysis separately for each pod, or perhaps presenting each attached storage system's contribution to the incoming content and performance for each a pod.

One model for pod membership may be defined as a list of storage systems, and a subset of that list where storage systems are considered to be in-sync for the pod. A storage system may be considered to be in-sync for a pod if it is at least within a recovery of having identical idle content for the last written copy of the dataset associated with the pod. Idle content is the content after any in-progress modifications have completed with no processing of new modifications. Sometimes this is referred to as "crash recoverable" consistency. Recovery of a pod carries out the process of reconciling differences in applying concurrent updates to in-sync storage systems in the pod. Recovery can resolve any inconsistencies between storage systems in the completion of concurrent modifications that had been requested to various members of the pod but that were not signaled to any requestor as having completed successfully. Storage systems that are listed as pod members but that are not listed as in-sync for the pod can be described as "detached" from the pod. Storage systems that are listed as pod members, are in-sync for the pod, and are currently available for actively serving data for the pod are "online" for the pod.

Each storage system member of a pod may have its own copy of the membership, including which storage systems it last knew were in-sync, and which storage systems it last knew comprised the entire set of pod members. To be online for a pod, a storage system must consider itself to be in-sync for the pod and must be communicating with all other storage systems it considers to be in-sync for the pod. If a storage system can't be certain that it is in-sync and communicating with all other storage systems that are in-sync, then it must stop processing new incoming requests for the pod (or must complete them with an error or exception) until it can be certain that it is in-sync and communicating with all other storage systems that are in-sync. A first storage system may conclude that a second paired storage system should be detached, which will allow the first storage system to continue since it is now in-sync with all storage systems now in the list. But, the second storage system must be prevented from concluding, alternatively, that the first storage system should be detached and with the second storage system continuing operation. This would result in a "split brain" condition that can lead to irreconcilable datasets, dataset corruption, or application corruption, among other dangers.

The situation of needing to determine how to proceed when not communicating with paired storage systems can arise while a storage system is running normally and then notices lost communications, while it is currently recovering from some previous fault, while it is rebooting or resuming from a temporary power loss or recovered communication outage, while it is switching operations from one set of storage system controller to another set for whatever reason, or during or after any combination of these or other kinds of events. In fact, any time a storage system that is associated with a pod can't communicate with all known non-detached members, the storage system can either wait briefly until communications can be established, go offline and continue waiting, or it can determine through some means that it is safe to detach the non-communicating storage system without risk of incurring a split brain due to the non-communicating storage system concluding the alternative view, and then continue. If a safe detach can happen quickly enough, the storage system can remain online for the pod with little more than a short delay and with no resulting application outages for applications that can issue requests to the remaining online storage systems.

One example of this situation is when a storage system may know that it is out-of-date. That can happen, for example, when a first storage system is first added to a pod that is already associated with one or more storage systems, or when a first storage system reconnects to another storage system and finds that the other storage system had already marked the first storage system as detached. In this case, this first storage system will simply wait until it connects to some other set of storage systems that are in-sync for the pod.

This model demands some degree of consideration for how storage systems are added to or removed from pods or from the in-sync pod members list. Since each storage system will have its own copy of the list, and since two independent storage systems can't update their local copy at exactly the same time, and since the local copy is all that is available on a reboot or in various fault scenarios, care must be taken to ensure that transient inconsistencies don't cause problems. For example, if one storage systems is in-sync for a pod and a second storage system is added, then if the second storage system is updated to list both storage systems as in-sync first, then if there is a fault and a restart of both storage systems, the second might startup and wait to connect to the first storage system while the first might be unaware that it should or could wait for the second storage system. If the second storage system then responds to an inability to connect with the first storage system by going through a process to detach it, then it might succeed in completing a process that the first storage system is unaware of, resulting in a split brain. As such, it may be necessary to ensure that storage systems won't disagree inappropriately on whether they might opt to go through a detach process if they aren't communicating.

One way to ensure that storage systems won't disagree inappropriately on whether they might opt to go through a detach process if they aren't communicating is to ensure that when adding a new storage system to the in-sync member list for a pod, the new storage system first stores that it is a detached member (and perhaps that it is being added as an in-sync member). Then, the existing in-sync storage systems can locally store that the new storage system is an in-sync pod member before the new storage system locally stores that same fact. If there is a set of reboots or network outages prior to the new storage system storing its in-sync status, then the original storage systems may detach the new storage system due to non-communication, but the new storage system will wait. A reverse version of this change might be needed for removing a communicating storage system from a pod: first the storage system being removed stores that it is no longer in-sync, then the storage systems that will remain store that the storage system being removed is no longer in-sync, then all storage systems delete the storage system being removed from their pod membership lists. Depending on the implementation, an intermediate persisted detached state may not be necessary. Whether or not care is required in local copies of membership lists may depend on the model storage systems use for monitoring each other or for validating their membership. If a consensus model is used for both, or if an external system (or an external distributed or clustered system) is used to store and validate pod membership, then inconsistencies in locally stored membership lists may not matter.

When communications fail or one or several storage systems in a pod fail, or when a storage system starts up (or fails over to a secondary controller) and can't communicate with paired storage systems for a pod, and it is time for one or more storage systems to decide to detach one or more paired storage systems, some algorithm or mechanism must be employed to decide that it is safe to do so and to follow through on the detach. One means of resolving detaches is use a majority (or quorum) model for membership. With three storage systems, as long as two are communicating, they can agree to detach a third storage system that isn't communicating, but that third storage system cannot by itself choose to detach either of the other two. Confusion can arise when storage system communication is inconsistent. For example, storage system A might be communicating with storage system B but not C, while storage system B might be communicating with both A and C. So, A and B could detach C, or B and C could detach A, but more communication between pod members may be needed to figure this out.

Care needs to be taken in a quorum membership model when adding and removing storage systems. For example, if a fourth storage system is added, then a "majority" of storage systems is at that point three. The transition from three storage systems (with two required for majority) to a pod including a fourth storage system (with three required for majority) may require something similar to the model described previously for carefully adding a storage system to the in-sync list. For example, the fourth storage system might start in an attaching state but not yet attached where it would never instigate a vote over quorum. Once in that state, the original three pod members could each be updated to be aware of the fourth member and the new requirement for a three storage system majority to detach a fourth. Removing a storage system from a pod might similarly move that storage system to a locally stored "detaching" state before updating other pod members. A variant scheme for this is to use a distributed consensus mechanism such as PAXOS or RAFT to implement any membership changes or to process detach requests.

Another means of managing membership transitions is to use an external system that is outside of the storage systems themselves to handle pod membership. In order to become online for a pod, a storage system must first contact the external pod membership system to verify that it is in-sync for the pod. Any storage system that is online for a pod should then remain in communication with the pod membership system and should wait or go offline if it loses communication. An external pod membership manager could be implemented as a highly available cluster using various cluster tools, such as Oracle RAC, Linux HA, VERITAS Cluster Server, IBM's HACMP, or others. An external pod membership manager could also use distributed configuration tools such as Etcd or Zookeeper, or a reliable distributed database such as Amazon's DynamoDB.

In the example depicted in FIG. 4, the depicted storage systems (402, 404, 406) may receive a request to read a portion of the dataset (426, 428) and process the request to read the portion of the dataset locally according to some embodiments of the present disclosure. Readers will appreciate that although requests to modify (e.g., a write operation) the dataset (426, 428) require coordination between the storage systems (402, 404, 406) in a pod, as the dataset (426, 428) should be consistent across all storage systems (402, 404, 406) in a pod, responding to a request to read a portion of the dataset (426, 428) does not require similar coordination between the storage systems (402, 404, 406). As such, a particular storage system that receives a read request may service the read request locally by reading a portion of the dataset (426, 428) that is stored within the storage system's storage devices, with no synchronous communication with other storage systems in the pod. Read requests received by one storage system for a replicated dataset in a replicated cluster are expected to avoid any communication in the vast majority of cases, at least when received by a storage system that is running within a cluster that is also running nominally. Such reads should normally be processed simply by reading from the local copy of a clustered dataset with no further interaction required with other storage systems in the cluster.

Readers will appreciate that the storage systems may take steps to ensure read consistency such that a read request will return the same result regardless of which storage system processes the read request. For example, the resulting clustered dataset content for any set of updates received by any set of storage systems in the cluster should be consistent across the cluster, at least at any time updates are idle (all previous modifying operations have been indicated as complete and no new update requests have been received and processed in any way). More specifically, the instances of a clustered dataset across a set of storage systems can differ only as a result of updates that have not yet completed. This means, for example, that any two write requests which overlap in their volume block range, or any combination of a write request and an overlapping snapshot, compare-and-write, or virtual block range copy, must yield a consistent result on all copies of the dataset. Two operations should not yield a result as if they happened in one order on one storage system and a different order on another storage system in the replicated cluster.

Furthermore, read requests can be made time order consistent. For example, if one read request is received on a replicated cluster and completed and that read is then followed by another read request to an overlapping address range which is received by the replicated cluster and where one or both reads in any way overlap in time and volume address range with a modification request received by the replicated cluster (whether any of the reads or the modification are received by the same storage system or a different storage system in the replicated cluster), then if the first read reflects the result of the update then the second read should also reflect the results of that update, rather than possibly returning data that preceded the update. If the first read does not reflect the update, then the second read can either reflect the update or not. This ensures that between two read requests "time" for a data segment cannot roll backward.

In the example depicted in FIG. 4, the depicted storage systems (402, 404, 406) may also detect a disruption in data communications with one or more of the other storage systems and determine whether to the particular storage system should remain in the pod. A disruption in data communications with one or more of the other storage systems may occur for a variety of reasons. For example, a disruption in data communications with one or more of the other storage systems may occur because one of the storage systems has failed, because a network interconnect has failed, or for some other reason. An important aspect of synchronous replicated clustering is ensuring that any fault handling doesn't result in unrecoverable inconsistencies, or any inconsistency in responses. For example, if a network fails between two storage systems, at most one of the storage systems can continue processing newly incoming I/O requests for a pod. And, if one storage system continues processing, the other storage system can't process any new requests to completion, including read requests.

In the example depicted in FIG. 4, the depicted storage systems (402, 404, 406) may also determine whether the particular storage system should remain in the pod in response to detecting a disruption in data communications with one or more of the other storage systems. As mentioned above, to be 'online' as part of a pod, a storage system must consider itself to be in-sync for the pod and must be communicating with all other storage systems it considers to be in-sync for the pod. If a storage system can't be certain that it is in-sync and communicating with all other storage systems that are in-sync, then it may stop processing new incoming requests to access the dataset (426, 428). As such, the storage system may determine whether to the particular storage system should remain online as part of the pod, for example, by determining whether it can communicate with all other storage systems it considers to be in-sync for the pod (e.g., via one or more test messages), by determining whether the all other storage systems it considers to be in-sync for the pod also consider the storage system to be attached to the pod, through a combination of both steps where the particular storage system must confirm that it can communicate with all other storage systems it considers to be in-sync for the pod and that all other storage systems it considers to be in-sync for the pod also consider the storage system to be attached to the pod, or through some other mechanism.

In the example depicted in FIG. 4, the depicted storage systems (402, 404, 406) may also keep the dataset on the particular storage system accessible for management and dataset operations in response to determining that the particular storage system should remain in the pod. The storage system may keep the dataset (426, 428) on the particular storage system accessible for management and dataset operations, for example, by accepting requests to access the version of the dataset (426, 428) that is stored on the storage system and processing such requests, by accepting and processing management operations associated with the dataset (426, 428) that are issued by a host or authorized administrator, by accepting and processing management operations associated with the dataset (426, 428) that are issued by one of the other storage systems, or in some other way.

In the example depicted in FIG. 4, the depicted storage systems (402, 404, 406) may, however, make the dataset on the particular storage system inaccessible for management and dataset operations in response to determining that the particular storage system should not remain in the pod. The storage system may make the dataset (426, 428) on the particular storage system inaccessible for management and dataset operations, for example, by rejecting requests to access the version of the dataset (426, 428) that is stored on the storage system, by rejecting management operations associated with the dataset (426, 428) that are issued by a host or other authorized administrator, by rejecting management operations associated with the dataset (426, 428) that are issued by one of the other storage systems in the pod, or in some other way.

In the example depicted in FIG. 4, the depicted storage systems (402, 404, 406) may also detect that the disruption in data communications with one or more of the other storage systems has been repaired and make the dataset on the particular storage system accessible for management and dataset operations. The storage system may detect that the disruption in data communications with one or more of the other storage systems has been repaired, for example, by receiving a message from the one or more of the other storage systems. In response to detecting that the disruption in data communications with one or more of the other storage systems has been repaired, the storage system may make the dataset (426, 428) on the particular storage system accessible for management and dataset operations once the previously detached storage system has been resynchronized with the storage systems that remained attached to the pod.

In the example depicted in FIG. 4, the depicted storage systems (402, 404, 406) may also go offline from the pod such that the particular storage system no longer allows management and dataset operations. The depicted storage systems (402, 404, 406) may go offline from the pod such that the particular storage system no longer allows management and dataset operations for a variety of reasons. For example, the depicted storage systems (402, 404, 406) may also go offline from the pod due to some fault with the storage system itself, because an update or some other maintenance is occurring on the storage system, due to communications faults, or for many other reasons. In such an example, the depicted storage systems (402, 404, 406) may subsequently update the dataset on the particular storage system to include all updates to the dataset since the particular storage system went offline and go back online with the pod such that the particular storage system allows management and dataset operations, as will be described in greater detail in the resynchronization sections included below.

In the example depicted in FIG. 4, the depicted storage systems (402, 404, 406) may also identifying a target storage system for asynchronously receiving the dataset, where the target storage system is not one of the plurality of storage systems across which the dataset is synchronously replicated. Such a target storage system may represent, for example, a backup storage system, as some storage system that makes use of the synchronously replicated dataset, and so on. In fact, synchronous replication can be leveraged to distribute copies of a dataset closer to some rack of servers, for better local read performance. One such case is smaller top-of-rack storage systems symmetrically replicated to larger storage systems that are centrally located in the data center or campus and where those larger storage systems are more carefully managed for reliability or are connected to external networks for asynchronous replication or backup services.

In the example depicted in FIG. 4, the depicted storage systems (402, 404, 406) may also identify a portion of the dataset that is not being asynchronously replicated to the target storage system by any of the other storages systems and asynchronously replicate, to the target storage system, the portion of the dataset that is not being asynchronously replicated to the target storage system by any of the other storages systems, wherein the two or more storage systems collectively replicate the entire dataset to the target storage system. In such a way, the work associated with asynchronously replicating a particular dataset may be split amongst the members of a pod, such that each storage system in a pod is only responsible for asynchronously replicating a subset of a dataset to the target storage system.

In the example depicted in FIG. 4, the depicted storage systems (402, 404, 406) may also detach from the pod, such that the particular storage system that detaches from the pod is no longer included in the set of storage systems across which the dataset is synchronously replicated. For example, if storage system (404) in FIG. 4 detached from the pod (430) illustrated in FIG. 4, the pod (430) would only include storage systems (402, 406) as the storage systems across which the dataset (426) that is included in the pod (430) would be synchronously replicated across. In such an example, detaching the storage system from the pod could also include removing the dataset from the particular storage system that detached from the pod. Continuing with the example where the storage system (404) in FIG. 4 detached from the pod (430) illustrated in FIG. 4, the dataset (426) that is included in the pod (430) could be deleted or otherwise removed from the storage system (404).

Readers will appreciate that there are a number of unique administrative capabilities enabled by the pod model that can further be supported. Also, the pod model itself introduces some issues that can be addressed by an implementation. For example, when a storage system is offline for a pod, but is otherwise running, such as because an interconnect failed and another storage system for the pod won out in mediation, there may still be a desire or need to access the offline pod's dataset on the offline storage system. One solution may be simply to enable the pod in some detached mode and allow the dataset to be accessed. However, that solution can be dangerous and that solution can cause the pod's metadata and data to be much more difficult to reconcile when the storage systems do regain communication. Furthermore, there could still be a separate path for hosts to access the offline storage system as well as the still online storage systems. In that case, a host might issue I/O to both storage systems even though they are no longer being kept in sync, because the host sees target ports reporting volumes with the same identifiers and the host I/O drivers presume it sees additional paths to the same volume. This can result in fairly damaging data corruption as reads and writes issued to both storage systems are no longer consistent even though the host presumes they are. As a variant of this case, in a clustered application, such as a shared storage clustered database, the clustered application running on one host might be reading or writing to one storage system and the same clustered application running on another host might be reading or writing to the "detached" storage system, yet the two instances of the clustered application are communicating between each other on the presumption that the dataset they each see is entirely consistent for completed writes. Since they aren't consistent, that presumption is violated and the application's dataset (e.g., the database) can quickly end up being corrupted.

One way to solve both of these problems is to allow for an offline pod, or perhaps a snapshot of an offline pod, to be copied to a new pod with new volumes that have sufficiently new identities that host I/O drivers and clustered applications won't confuse the copied volumes as being the same as the still online volumes on another storage system. Since each pod maintains a complete copy of the dataset, which is crash consistent but perhaps slightly different from the copy of the pod dataset on another storage system, and since each pod has an independent copy of all data and metadata needed to operate on the pod content, it is a straightforward problem to make a virtual copy of some or all volumes or snapshots in the pod to new volumes in a new pod. In a logical extent graph implementation, for example, all that is needed is to define new volumes in a new pod which reference logical extent graphs from the copied pod associated with the pod's volumes or snapshots, and with the logical extent graphs being marked as copy on write. The new volumes should be treated as new volumes, similarly to how volume snapshots copied to a new volume might be implemented. Volumes may have the same administrative name, though within a new pod namespace. But, they should have different underlying identifiers, and differing logical unit identifiers from the original volumes.

In some cases it may be possible to use virtual network isolation techniques (for example, by creating a virtual LAN in the case of IP networks or a virtual SAN in the case of fiber channel networks) in such a way that isolation of volumes presented to some interfaces can be assured to be inaccessible from host network interfaces or host SCSI initiator ports that might also see the original volumes. In such cases, it may be safe to provide the copies of volumes with the same SCSI or other storage identifiers as the original volumes. This could be used, for example, in cases where the applications expect to see a particular set of storage identifiers in order to function without an undue burden in reconfiguration.

Some of the techniques described herein could also be used outside of an active fault context to test readiness for handling faults. Readiness testing (sometimes referred to as "fire drills") is commonly required for disaster recovery configurations, where frequent and repeated testing is considered a necessity to ensure that most or all aspects of a disaster recovery plan are correct and account for any recent changes to applications, datasets, or changes in equipment. Readiness testing should be non-disruptive to current production operations, including replication. In many cases the real operations can't actually be invoked on the active configuration, but a good way to get close is to use storage operations to make copies of production datasets, and then perhaps couple that with the use of virtual networking, to create an isolated environment containing all data that is believed necessary for the important applications that must be brought up successfully in cases of disasters. Making such a copy of a synchronously replicated (or even an asynchronously replicated) dataset available within a site (or collection of sites) that is expected to perform a disaster recovery readiness test procedure and then starting the important applications on that dataset to ensure that it can startup and function is a great tool, since it helps ensure that no important parts of the application datasets were left out in the disaster recovery plan. If necessary, and practical, this could be coupled with virtual isolated networks coupled perhaps with isolated collection of physical or virtual machines, to get as close as possible to a real world disaster recovery takeover scenario. Virtually copying a pod (or set of pods) to another pod as a point-in-time image of the pod datasets immediately creates an isolated dataset that contains all the copied elements and that can then be operated on essentially identically to the originally pods, as well as allowing isolation to a single site (or a few sites) separately from the original pod. Further, these are fast operations and they can be torn down and repeated easily allowing testing to repeated as often as is desired.

Some enhancements could be made to get further toward perfect disaster recovery testing. For example, in conjunction with isolated networks, SCSI logical unit identities or other types of identities could be copied into the target pod so that the test servers, virtual machines, and applications see the same identities. Further, the administrative environment of the servers could be configured to respond to requests from a particular virtual set of virtual networks to respond to requests and operations on the original pod name so scripts don't require use of test-variants with alternate "test" versions of object names. A further enhancement can be used in cases where the host-side server infrastructure that will take over in the case of a disaster takeover can be used during a test. This includes cases where a disaster recovery data center is completely stocked with alternative server infrastructure that won't generally be used until directed to do so by a disaster. It also includes cases where that infrastructure might be used for non-critical operations (for example, running analytics on production data, or simply supporting application development or other functions which may be important but can be halted if needed for more critical functions). Specifically, host definitions and configurations and the server infrastructure that will use them can be set up as they will be for an actual disaster recovery takeover event and tested as part of disaster recovery takeover testing, with the tested volumes being connected to these host definitions from the virtual pod copy used to provide a snapshot of the dataset. From the standpoint of the storage systems involved, then, these host definitions and configurations used for testing, and the volume-to-host connection configurations used during testing, can be reused when an actual disaster takeover event is triggered, greatly minimizing the configuration differences between the test configuration and the real configuration that will be used in case of a disaster recovery takeover.

In some cases it may make sense to move volumes out of a first pod and into a new second pod including just those volumes. The pod membership and high availability and recovery characteristics can then be adjusted separately, and administration of the two resulting pod datasets can then be isolated from each other. An operation that can be done in one direction should also be possible in the other direction. At some point, it may make sense to take two pods and merge them into one so that the volumes in each of the original two pods will now track each other for storage system membership and high availability and recovery characteristics and events. Both operations can be accomplished safely and with reasonably minimal or no disruption to running applications by relying on the characteristics suggested for changing mediation or quorum properties for a pod which were discussed in an earlier section. With mediation, for example, a mediator for a pod can be changed using a sequence consisting of a step where each storage system in a pod is changed to depend on both a first mediator and a second mediator and each is then changed to depend only on the second mediator. If a fault occurs in the middle of the sequence, some storage systems may depend on both the first mediator and the second mediator, but in no case will recovery and fault handling result in some storage systems depending only on the first mediator and other storage systems only depending on the second mediator. Quorum can be handled similarly by temporarily depending on winning against both a first quorum model and a second quorum model in order to proceed to recovery. This may result in a very short time period where availability of the pod in the face of faults depend on additional resources, thus reducing potential availability, but this time period is very short and the reduction in availability is often very little. With mediation, if the change in mediator parameters is nothing more than the change in the key used for mediation and the mediation service used is the same, then the potential reduction in availability is even less, since it now depends only on two calls to the same service versus one call to that service, and rather than separate calls to two separate services.

Readers will note that changing the quorum model may be quite complex. An additional step may be necessary where storage systems will participate in the second quorum model but won't depend on winning in that second quorum model, which is then followed by the step of also depending on the second quorum model. This may be necessary to account for the fact that if only one system has processed the change to depend on the quorum model, then it will never win quorum since there will never be a majority. With this model in place for changing the high availability parameters (mediation relationship, quorum model, takeover preferences), we can create a safe procedure for these operations to split a pod into two or to join two pods into one. This may require adding one other capability: linking a second pod to a first pod for high availability such that if two pods include compatible high availability parameters the second pod linked to the first pod can depend on the first pod for determining and instigating detach-related processing and operations, offline and in-sync states, and recovery and resynchronization actions.

To split a pod into two, which is an operation to move some volumes into a newly created pod, a distributed operation may be formed that can be described as: form a second pod into which we will move a set of volumes which were previously in a first pod, copy the high availability parameters from the first pod into the second pod to ensure they are compatible for linking, and link the second pod to the first pod for high availability. This operation may be encoded as messages and should be implemented by each storage system in the pod in such a way that the storage system ensures that the operation happens completely on that storage system or does not happen at all if processing is interrupted by a fault. Once all in-sync storage systems for the two pods have processed this operation, the storage systems can then process a subsequent operation which changes the second pod so that it is no longer linked to the first pod. As with other changes to high availability characteristics for a pod, this involves first having each in-sync storage system change to rely on both the previous model (that model being that high availability is linked to the first pod) and the new model (that model being its own now independent high availability). In the case of mediation or quorum, this means that storage systems which processed this change will first depend on mediation or quorum being achieved as appropriate for the first pod and will additionally depend on a new separate mediation (for example, a new mediation key) or quorum being achieved for the second pod before the second pod can proceed following a fault that required mediation or testing for quorum. As with the previous description of changing quorum models, an intermediate step may set storage systems to participate in quorum for the second pod before the step where storage systems participate in and depend on quorum for the second pod. Once all in-sync storage systems have processed the change to depend on the new parameters for mediation or quorum for both the first pod and the second pod, the split is complete.

Joining a second pod into a first pod operates essentially in reverse. First, the second pod must be adjusted to be compatible with the first pod, by having an identical list of storage systems and by having a compatible high availability model. This may involve some set of steps such as those described elsewhere in this paper to add or remove storage systems or to change mediator and quorum models. Depending on implementation, it may be necessary only to reach an identical list of storage systems. Joining proceeds by processing an operation on each in-sync storage system to link the second pod to the first pod for high availability. Each storage system which processes that operation will then depend on the first pod for high availability and then the second pod for high availability. Once all in-sync storage systems for the second pod have processed that operation, the storage systems will then each process a subsequent operation to eliminate the link between the second pod and the first pod, migrate the volumes from the second pod into the first pod, and delete the second pod. Host or application dataset access can be preserved throughout these operations, as long as the implementation allows proper direction of host or application dataset modification or read operations to the volume by identity and as long as the identity is preserved as appropriate to the storage protocol or storage model (for example, as long as logical unit identifiers for volumes and use of target ports for accessing volumes are preserved in the case of SCSI).

Migrating a volume between pods may present issues. If the pods have an identical set of in-sync membership storage systems, then it may be straightforward: temporarily suspend operations on the volumes being migrated, switch control over operations on those volumes to controlling software and structures for the new pod, and then resume operations. This allows for a seamless migration with continuous uptime for applications apart from the very brief operation suspension, provided network and ports migrate properly between pods. Depending on the implementation, suspending operations may not even be necessary, or may be so internal to the system that the suspension of operations has no impact. Copying volumes between pods with different in-sync membership sets is more of a problem. If the target pod for the copy has a subset of in-sync members from the source pod, this isn't much of a problem: a member storage system can be dropped safely enough without having to do more work. But, if the target pod adds in-sync member storage systems to the volume over the source pod, then the added storage systems must be synchronized to include the volume's content before they can be used. Until synchronized, this leaves the copied volumes distinctly different from the already synchronized volumes, in that fault handling differs and request handling from the not yet synced member storage systems either won't work or must be forwarded or won't be as fast because reads will have to traverse an interconnect. Also, the internal implementation will have to handle some volumes being in sync and ready for fault handling and others not being in sync.

There are other problems relating to reliability of the operation in the face of faults. Coordinating a migration of volumes between multi-storage-system pods is a distributed operation. If pods are the unit of fault handling and recovery, and if mediation or quorum or whatever means are used to avoid split-brain situations, then a switch in volumes from one pod with a particular set of state and configurations and relationships for fault handling, recovery, mediation and quorum to another then storage systems in a pod have to be careful about coordinating changes related to that handling for any volumes. Operations can't be atomically distributed between storage systems, but must be staged in some way. Mediation and quorum models essentially provide pods with the tools for implementing distributed transactional atomicity, but this may not extend to inter-pod operations without adding to the implementation.

Consider even a simple migration of a volume from a first pod to a second pod even for two pods that share the same first and second storage systems. At some point the storage systems will coordinate to define that the volume is now in the second pod and is no longer in the first pod. If there is no inherent mechanism for transactional atomicity across the storage systems for the two pods, then a naive implementation could leave the volume in the first pod on the first storage system and the second pod on the second storage system at the time of a network fault that results in fault handling to detach storage systems from the two pods. If pods separately determine which storage system succeeds in detaching the other, then the result could be that the same storage system detaches the other storage system for both pods, in which case the result of the volume migration recovery should be consistent, or it could result in a different storage system detaching the other for the two pods. If the first storage system detaches the second storage system for the first pod and the second storage system detaches the first storage system for the second pod, then recovery might result in the volume being recovered to the first pod on the first storage system and into the second pod on the second storage system, with the volume then running and exported to hosts and storage applications on both storage systems. If instead the second storage system detaches the first storage system for the first pod and first storage detaches the second storage system for the second pod, then recovery might result in the volume being discarded from the second pod by the first storage system and the volume being discarded from the first pod by the second storage system, resulting in the volume disappearing entirely. If the pods a volume is being migrated between are on differing sets of storage systems, then things can get even more complicated.

A solution to these problems may be to use an intermediate pod along with the techniques described previously for splitting and joining pods. This intermediate pod may never be presented as visible managed objects associated with the storage systems. In this model, volumes to be moved from a first pod to a second pod are first split from the first pod into a new intermediate pod using the split operation described previously. The storage system members for the intermediate pod can then be adjusted to match the membership of storage systems by adding or removing storage systems from the pod as necessary. Subsequently, the intermediate pod can be joined with the second pod.

Figure 5:
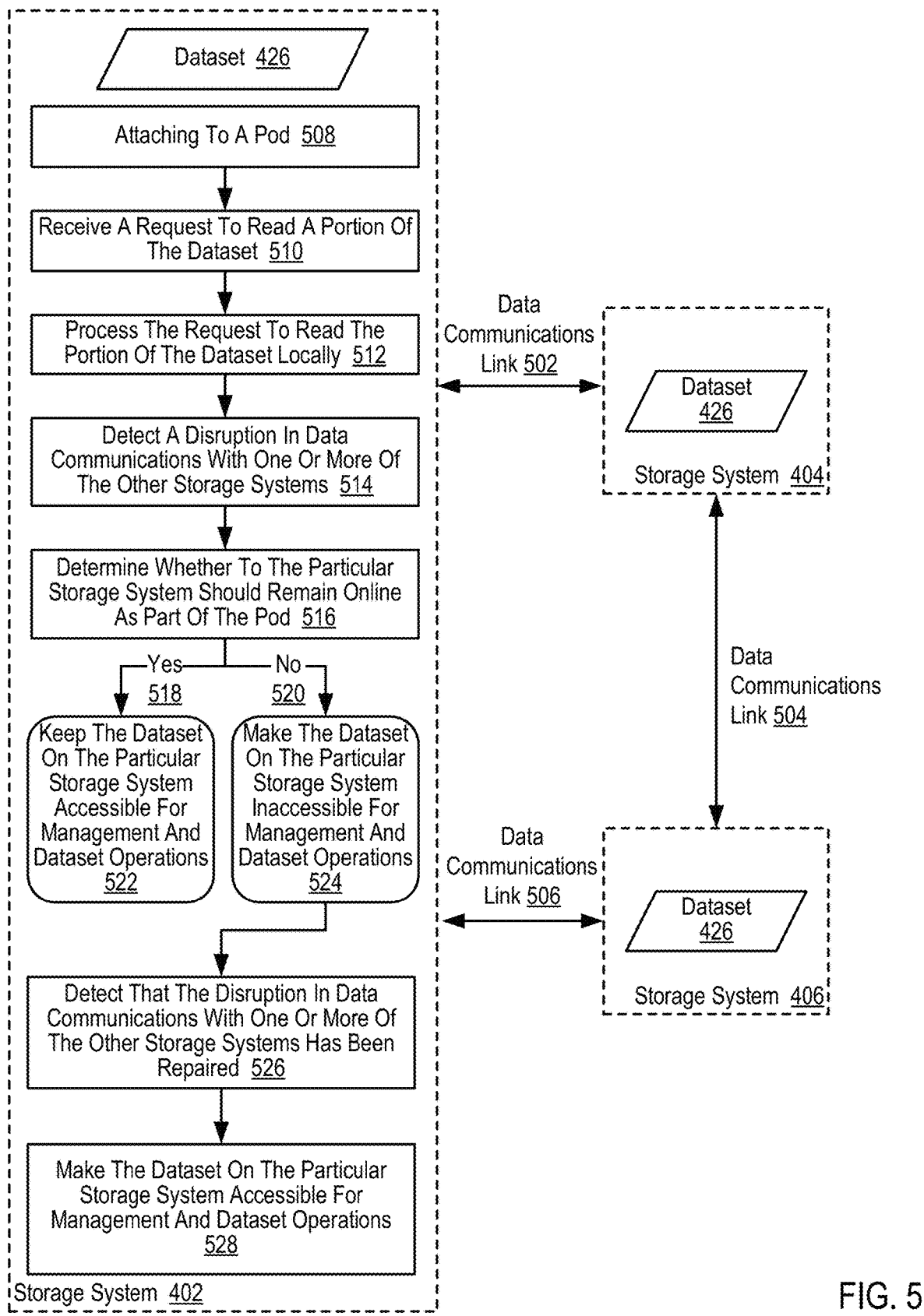
FIG. 5 sets forth a block diagram illustrating a plurality of storage systems that support a pod according to some embodiments of the present disclosure.

For further explanation, FIG. 5 sets forth a flow chart illustrating steps that may be performed by storage systems (402, 404, 406) that support a pod according to some embodiments of the present disclosure. Although depicted in less detail, the storage systems (402, 404, 406) depicted in FIG. 5 may be similar to the storage systems described above with reference to FIGS. 1A-1D, FIGS. 2A-2G, FIGS. 3A-3B, FIG. 4, or any combination thereof. In fact, the storage systems (402, 404, 406) depicted in FIG. 5 may include the same, fewer, additional components as the storage systems described above.

In the example method depicted in FIG. 5, a storage system (402) may attach (508) to a pod. The model for pod membership may include a list of storage systems and a subset of that list where storage systems are presumed to be in-sync for the pod. A storage system is in-sync for a pod if it is at least within a recovery of having identical idle content for the last written copy of the dataset associated with the pod. Idle content is the content after any in-progress modifications have completed with no processing of new modifications. Sometimes this is referred to as "crash recoverable" consistency. Storage systems that are listed as pod members but that are not listed as in-sync for the pod can be described as "detached" from the pod. Storage systems that are listed as pod members, are in-sync for the pod, and are currently available for actively serving data for the pod are "online" for the pod.

In the example method depicted in FIG. 5, the storage system (402) may attach (508) to a pod, for example, by synchronizing its locally stored version of the dataset (426) along with an up-to-date version of the dataset (426) that is stored on other storage systems (404, 406) in the pod that are online, as the term is described above. In such an example, in order for the storage system (402) to attach (508) to the pod, a pod definition stored locally within each of the storage systems (402, 404, 406) in the pod may need to be updated in order for the storage system (402) to attach (508) to the pod. In such an example, each storage system member of a pod may have its own copy of the membership, including which storage systems it last knew were in-sync, and which storage systems it last knew comprised the entire set of pod members.

In the example method depicted in FIG. 5, the storage system (402) may also receive (510) a request to read a portion of the dataset (426) and the storage system (402) may process (512) the request to read the portion of the dataset (426) locally. Readers will appreciate that although requests to modify (e.g., a write operation) the dataset (426) require coordination between the storage systems (402, 404, 406) in a pod, as the dataset (426) should be consistent across all storage systems (402, 404, 406) in a pod, responding to a request to read a portion of the dataset (426) does not require similar coordination between the storage systems (402, 404, 406). As such, a particular storage system (402) that receives a read request may service the read request locally by reading a portion of the dataset (426) that is stored within the storage system's (402) storage devices, with no synchronous communication with other storage systems (404, 406) in the pod. Read requests received by one storage system for a replicated dataset in a replicated cluster are expected to avoid any communication in the vast majority of cases, at least when received by a storage system that is running within a cluster that is also running nominally. Such reads should normally be processed simply by reading from the local copy of a clustered dataset with no further interaction required with other storage systems in the cluster Readers will appreciate that the storage systems may take steps to ensure read consistency such that a read request will return the same result regardless of which storage system processes the read request. For example, the resulting clustered dataset content for any set of updates received by any set of storage systems in the cluster should be consistent across the cluster, at least at any time updates are idle (all previous modifying operations have been indicated as complete and no new update requests have been received and processed in any way). More specifically, the instances of a clustered dataset across a set of storage systems can differ only as a result of updates that have not yet completed. This means, for example, that any two write requests which overlap in their volume block range, or any combination of a write request and an overlapping snapshot, compare-andwrite, or virtual block range copy, must yield a consistent result on all copies of the dataset. Two operations cannot yield a result as if they happened in one order on one storage system and a different order on another storage system in the replicated cluster.

Furthermore, read requests may be time order consistent. For example, if one read request is received on a replicated cluster and completed and that read is then followed by another read request to an overlapping address range which is received by the replicated cluster and where one or both reads in any way overlap in time and volume address range with a modification request received by the replicated cluster (whether any of the reads or the modification are received by the same storage system or a different storage system in the replicated cluster), then if the first read reflects the result of the update then the second read should also reflect the results of that update, rather than possibly returning data that preceded the update. If the first read does not reflect the update, then the second read can either reflect the update or not. This ensures that between two read requests "time" for a data segment cannot roll backward.

In the example method depicted in FIG. 5, the storage system (402) may also detect (514) a disruption in data communications with one or more of the other storage systems (404, 406). A disruption in data communications with one or more of the other storage systems (404, 406) may occur for a variety of reasons. For example, a disruption in data communications with one or more of the other storage systems (404, 406) may occur because one of the storage systems (402, 404, 406) has failed, because a network interconnect has failed, or for some other reason. An important aspect of synchronous replicated clustering is ensuring that any fault handling doesn't result in unrecoverable inconsistencies, or any inconsistency in responses. For example, if a network fails between two storage systems, at most one of the storage systems can continue processing newly incoming I/O requests for a pod. And, if one storage system continues processing, the other storage system can't process any new requests to completion, including read requests.

In the example method depicted in FIG. 5, the storage system (402) may also determine (516) whether to the particular storage system (402) should remain online as part of the pod. As mentioned above, to be 'online' as part of a pod, a storage system must consider itself to be in-sync for the pod and must be communicating with all other storage systems it considers to be in-sync for the pod. If a storage system can't be certain that it is in-sync and communicating with all other storage systems that are in-sync, then it may stop processing new incoming requests to access the dataset (426). As such, the storage system (402) may determine (516) whether to the particular storage system (402) should remain online as part of the pod, for example, by determining whether it can communicate with all other storage systems (404, 406) it considers to be in-sync for the pod (e.g., via one or more test messages), by determining whether the all other storage systems (404, 406) it considers to be in-sync for the pod also consider the storage system (402) to be attached to the pod, through a combination of both steps where the particular storage system (402) must confirm that it can communicate with all other storage systems (404, 406) it considers to be in-sync for the pod and that all other storage systems (404, 406) it considers to be in-sync for the pod also consider the storage system (402) to be attached to the pod, or through some other mechanism.

In the example method depicted in FIG. 5, the storage system (402) may also, responsive to affirmatively (518) determining that the particular storage system (402) should remain online as part of the pod, keep (522) the dataset (426) on the particular storage system (402) accessible for management and dataset operations. The storage system (402) may keep (522) the dataset (426) on the particular storage system (402) accessible for management and dataset operations, for example, by accepting requests to access the version of the dataset (426) that is stored on the storage system (402) and processing such requests, by accepting and processing management operations associated with the dataset (426) that are issued by a host or authorized administrator, by accepting and processing management operations associated with the dataset (426) that are issued by one of the other storage systems (404, 406) in the pod, or in some other way.

In the example method depicted in FIG. 5, the storage system (402) may also, responsive to determining that the particular storage system should not (520) remain online as part of the pod, make (524) the dataset (426) on the particular storage system (402) inaccessible for management and dataset operations. The storage system (402) may make (524) the dataset (426) on the particular storage system (402) inaccessible for management and dataset operations, for example, by rejecting requests to access the version of the dataset (426) that is stored on the storage system (402), by rejecting management operations associated with the dataset (426) that are issued by a host or other authorized administrator, by rejecting management operations associated with the dataset (426) that are issued by one of the other storage systems (404, 406) in the pod, or in some other way.

In the example method depicted in FIG. 5, the storage system (402) may also detect (526) that the disruption in data communications with one or more of the other storage systems (404, 406) has been repaired. The storage system (402) may detect (526) that the disruption in data communications with one or more of the other storage systems (404, 406) has been repaired, for example, by receiving a message from the one or more of the other storage systems (404, 406). In response to detecting (526) that the disruption in data communications with one or more of the other storage systems (404, 406) has been repaired, the storage system (402) may make (528) the dataset (426) on the particular storage system (402) accessible for management and dataset operations.

Readers will appreciate that the example depicted in FIG. 5 describes an embodiment in which various actions are depicted as occurring within some order, although no ordering is required. Furthermore, other embodiments may exist where the storage system (402) only carries out a subset of the described actions. For example, the storage system (402) may perform the steps of detecting (514) a disruption in data communications with one or more of the other storage systems (404, 406), determining (516) whether to the particular storage system (402) should remain in the pod, keeping (522) the dataset (426) on the particular storage system (402) accessible for management and dataset operations or making (524) the dataset (426) on the particular storage system (402) inaccessible for management and dataset operations without first receiving (510) a request to read a portion of the dataset (426) and processing (512) the request to read the portion of the dataset (426) locally. Furthermore, the storage system (402) may detect (526) that the disruption in data communications with one or more of the other storage systems (404, 406) has been repaired and make (528) the dataset (426) on the particular storage system (402) accessible for management and dataset operations without first receiving (510) a request to read a portion of the dataset (426) and processing (512) the request to read the portion of the dataset (426) locally. In fact, none of the steps described herein are explicitly required in all embodiments as prerequisites for performing other steps described herein.

Figure 6:
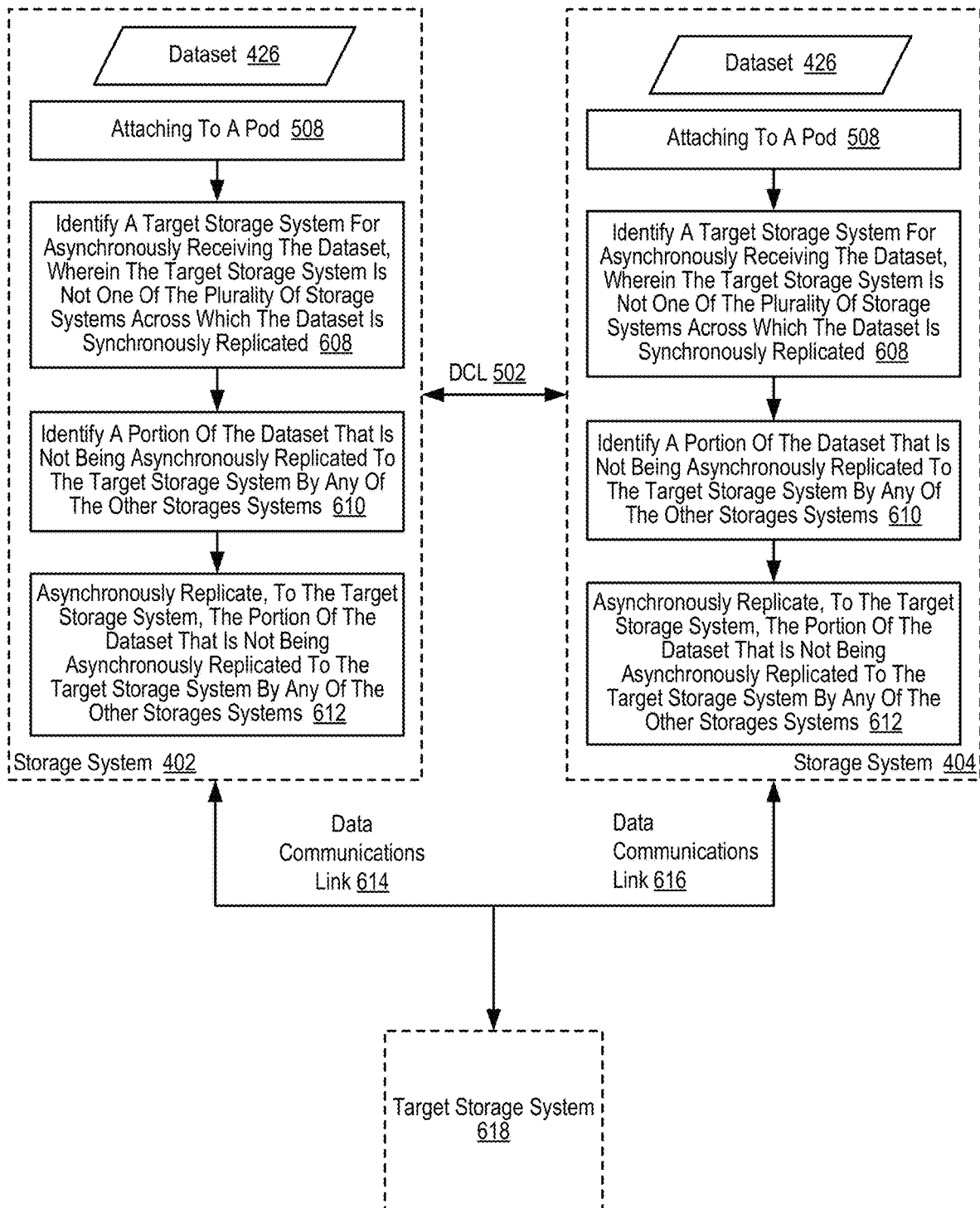
FIG. 6 sets forth a block diagram illustrating a plurality of storage systems that support a pod according to some embodiments of the present disclosure.

For further explanation, FIG. 6 sets forth a flow chart illustrating steps that may be performed by storage systems (402, 404, 406) that support a pod according to some embodiments of the present disclosure. Although depicted in less detail, the storage systems (402, 404, 406) depicted in FIG. 6 may be similar to the storage systems described above with reference to FIGS. 1A-1D, FIGS. 2A-2G, FIGS. 3A-3B, FIG. 4, or any combination thereof. In fact, the storage systems (402, 404, 406) depicted in FIG. 6 may include the same, fewer, additional components as the storage systems described above.

In the example method depicted in FIG. 6, two or more of the storage systems (402, 404) may each identify (608) a target storage system (618) for asynchronously receiving the dataset (426). The target storage system (618) for asynchronously receiving the dataset (426) may be embodied, for example, as a backup storage system that is located in a different data center than either of the storage systems (402, 404) that are members of a particular pod, as cloud storage that is provided by a cloud services provider, or in many other ways. Readers will appreciate that the target storage system (618) is not one of the plurality of storage systems (402, 404) across which the dataset (426) is synchronously replicated, and as such, the target storage system (618) initially does not include an up-to-date local copy of the dataset (426).

In the example method depicted in FIG. 6, two or more of the storage systems (402, 404) may each also identify (610) a portion of the dataset (426) that is not being asynchronously replicated to the target storage (618) system by any of the other storages systems that are members of a pod that includes the dataset (426). In such an example, the storage systems (402, 404) may each asynchronously replicate (612), to the target storage system (618), the portion of the dataset (426) that is not being asynchronously replicated to the target storage system by any of the other storages systems. Consider an example in which a first storage system (402) is responsible for asynchronously replicating a first portion (e.g., a first half of an address space) of the dataset (426) to the target storage system (618). In such an example, the second storage system (404) would be responsible for asynchronously replicating a second portion (e.g., a second half of an address space) of the dataset (426) to the target storage system (618), such that the two or more storage systems (402, 404) collectively replicate the entire dataset (426) to the target storage system (618).

Readers will appreciate that through the use of pods, as described above, the replication relationship between two storage systems may be switched from a relationship where data is asynchronously replicated to a relationship where data is synchronously replicated. For example, if storage system A is configured to asynchronously replicate a dataset to storage system B, creating a pod that includes the dataset, storage system A as a member, and storage system B as a member can switch the relationship where data is asynchronously replicated to a relationship where data is synchronously replicated. Likewise, through the use of pods, the replication relationship between two storage systems may be switched from a relationship where data is synchronously replicated to a relationship where data is asynchronously replicated. For example, if a pod is created that includes the dataset, storage system A as a member, and storage system B as a member, by merely unstretching the pod (to remove storage system A as a member or to remove storage system B as a member), a relationship where data is synchronously replicated between the storage systems can immediately be switched to a relationship where data is asynchronously replicated. In such a way, storage systems may switch back-and-forth as needed between asynchronous replication and synchronous replication.

This switching can be facilitated by the implementation relying on similar techniques for both synchronous and asynchronous replication. For example, if resynchronization for a synchronously replicated dataset relies on the same or a compatible mechanism as is used for asynchronous replication, then switching to asynchronous replication is conceptually identical to dropping the in-sync state and leaving a relationship in a state similar to a "perpetual recovery" mode. Likewise, switching from asynchronous replication to synchronous replication can operate conceptually by "catching up" and becoming in-sync just as is done when completing a resynchronization with the switching system becoming an in-sync pod member.

Alternatively, or additionally, if both synchronous and asynchronous replication rely on similar or identical common metadata, or a common model for representing and identifying logical extents or stored block identities, or a common model for representing content-addressable stored blocks, then these aspects of commonality can be leveraged to dramatically reduce the content that may need to be transferred when switching to and from synchronous and asynchronous replication. Further, if a dataset is asynchronously replicated from a storage system A to a storage system B, and system B further asynchronously replicates that data set to a storage system C, then a common metadata model, common logical extent or block identities, or common representation of content-addressable stored blocks, can dramatically reduce the data transfers needed to enable synchronous replication between system A and system C.

Readers will further appreciate that that through the use of pods, as described above, replication techniques may be used to perform tasks other than replicating data. In fact, because a pod may include a set of managed objects, tasks like migrating a virtual machine may be carried out using pods and the replication techniques described herein. For example, if virtual machine A is executing on storage system A, by creating a pod that includes virtual machine A as a managed object, storage system A as a member, and storage system B as a member, virtual machine A and any associated images and definitions may be migrated to storage system B, at which time the pod could simply be destroyed, membership could be updated, or other actions may be taken as necessary.

For further explanation, FIG. 7 sets forth diagrams of metadata representations that may be implemented as a structured collection of metadata objects that, together, may represent a logical volume of storage data, or a portion of a logical volume, in accordance with some embodiments of the present disclosure. Metadata representations 750, 754, and 760 may be stored within a storage system (706), and one or more metadata representations may be generated and maintained for each of multiple storage objects, such as volumes, or portions of volumes, stored within a storage system (706).

While other types of structured collections of the metadata objects are possible, in this example, metadata representations may be structured as a directed acyclic graph (DAG) of nodes, where, to maintain efficient access to any given node, the DAG may be structured and balanced according to various methods. For example, a DAG for a metadata representation may be defined as a type of B-tree, and balanced accordingly in response to changes to the structure of the metadata representation, where changes to the metadata representation may occur in response to changes to, or additions to, underlying data represented by the metadata representation. While in this example, there are only two levels for the sake of simplicity, in other examples, metadata representations may span across multiple levels and may include hundreds or thousands of nodes, where each may include any number of links to other nodes.

Further, in this example, the leaves of a metadata representation may include pointers to the stored data for a volume, or portion of a volume, where a logical address, or a volume and offset, may be used to identify and navigate through the metadata representation to reach one or more leaf nodes that reference stored data corresponding to the logical address. For example, a volume (752) may be represented by a metadata representation (750), which includes multiple metadata object nodes (752, 752A-752N), where leaf nodes (752A-752N) include pointers to respective data objects (753A-753N, 757). Data objects may be any size unit of data within a storage system (706). For example, data objects (753A-753N, 757) may each be a logical extent, where logical extents may be some specified size, such as 1 MB, 4 MB, or some other size.

In this example, a snapshot (756) may be created as a snapshot of a storage object, in this case, a volume (752), where at the point in time when the snapshot (756) is created, the metadata representation (754) for the snapshot (756) includes all of the metadata objects for the metadata representation (750) for the volume (752). Further, in response to creation of the snapshot (756), the metadata representation (754) may be designated to be read only. However, the volume (752) sharing the metadata representation may continue to be modified, and while at the moment the snapshot is created, the metadata representations for the volume (752) and the snapshot (756) are identical, as modifications are made to data corresponding to the volume (752), and in response to the modifications, the metadata representations for the volume (752) and the snapshot (756) may diverge and become different.

For example, given a metadata representation (750) to represent a volume (752) and a metadata representation (754) to represent a snapshot (756), the storage system (706) may receive an I/O operation that writes to data that is ultimately stored within a particular data object (753B), where the data object (753B) is pointed to by a leaf node pointer (752B), and where the leaf node pointer (752B) is part of both metadata representations (750, 754). In response to the write operation, the read only data objects (753A-753N) referred to by the metadata representation (754) remain unchanged, and the pointer (752B) may also remain unchanged. However, the metadata representation (750), which represents the current volume (752), is modified to include a new data object to hold the data written by the write operation, where the modified metadata representation is depicted as the metadata representation (760). Further, the write operation may be directed to only a portion of the data object (753B), and consequently, the new data object (757) may include a copy of previous contents of the data object (753B) in addition to the payload for the write operation.

In this example, as part of processing the write operation, the metadata representation (760) for the volume (752) is modified to remove an existing metadata object pointer (752B) and to include a new metadata object pointer (758), where the new metadata object pointer (758) is configured to point to a new data object (757), where the new data object (757) stores the data written by the write operation. Further, the metadata representation (760) for the volume (752) continues to include all metadata objects included within the previous metadata representation (750)—with the exclusion of the metadata object pointer (752B) that referenced the target data object, where the metadata object pointer (752B) continues to reference the read only data object (753B) that would have been overwritten.

In this way, using metadata representations, a volume or a portion of a volume may be considered to be snapshotted, or considered to be copied, by creating metadata objects, and without actual duplication of data objects—where the duplication of data objects may be deferred until a write operation is directed at one of the read only data objects referred to by the metadata representations.

In other words, an advantage of using a metadata representation to represent a volume is that a snapshot or a copy of a volume may be created and be accessible in constant order time, and specifically, in the time it takes to create a metadata object for the snapshot or copy, and to create a reference for the snapshot or copy metadata object to the existing metadata representation for the volume being snapshotted or copied.

As an example use, a virtualized copy-by-reference may make use of a metadata representation in a manner that is similar to the use of a metadata representation in creating a snapshot of a volume—where a metadata representation for a virtualized copy-by-reference may often correspond to a portion of a metadata representation for an entire volume. An example implementation of virtualized copy-by-reference may be within the context of a virtualized storage system, where multiple block ranges within and between volumes may reference a unified copy of stored data. In such virtualized storage system, the metadata described above may be used to handle the relationship between virtual, or logical, addresses and physical, or real, addresses—in other words, the metadata representation of stored data enables a virtualized storage system that may be considered flash-friendly in that it reduces, or minimizes, wear on flash memory.

In some examples, logical extents may be combined in various ways, including as simple collections or as logically related address ranges within some larger-scale logical extent that is formed as a set of logical extent references. These larger combinations could also be given logical extent identities of various kinds, and could be further combined into still larger logical extents or collections. A copy-on-write status could apply to various layers, and in various ways depending on the implementation. For example, a copy on write status applied to a logical collection of logical collections of extents might result in a copied collection retaining references to unchanged logical extents and the creation of copied-on-write logical extents (through copying references to any unchanged stored data blocks as needed) when only part of the copy-on-write logical collection is changed.

Deduplication, volume snapshots, or block range snapshots may be implemented in this model through combinations of referencing stored data blocks, or referencing logical extents, or marking logical extents (or identified collections of logical extents) as copy-on-write.

Further, with flash storage systems, stored data blocks may be organized and grouped together in various ways as collections are written out into pages that are part of larger erase blocks. Eventual garbage collection of deleted or replaced stored data blocks may involve moving content stored in some number of pages elsewhere so that an entire erase block can be erased and prepared for reuse. This process of selecting physical flash pages, eventually migrating and garbage collecting them, and then erasing flash erase blocks for reuse may or may not be coordinated, driven by, or performed by the aspect of a storage system that is also handling logical extents, deduplication, compression, snapshots, virtual copying, or other storage system functions. A coordinated or driven process for selecting pages, migrating pages, garbage collecting and erasing erase blocks may further take into account various characteristics of the flash memory device cells, pages, and erase blocks such as number of uses, aging predictions, adjustments to voltage levels or numbers of retries needed in the past to recover stored data. They may also take into account analysis and predictions across all flash memory devices within the storage system.

To continue with this example, where a storage system may be implemented based on directed acyclic graphs comprising logical extents, logical extents can be categorized into two types: leaf logical extents, which reference some amount of stored data in some way, and composite logical extents, which reference other leaf or composite logical extents.

A leaf extent can reference data in a variety of ways. It can point directly to a single range of stored data (e.g., 64 kilobytes of data), or it can be a collection of references to stored data (e.g., a 1 megabyte "range" of content that maps some number of virtual blocks associated with the range to physically stored blocks). In the latter case, these blocks may be referenced using some identity, and some blocks within the range of the extent may not be mapped to anything. Also, in that latter case, these block references need not be unique, allowing multiple mappings from virtual blocks within some number of logical extents within and across some number of volumes to map to the same physically stored blocks. Instead of stored block references, a logical extent could encode simple patterns: for example, a block which is a string of identical bytes could simply encode that the block is a repeated pattern of identical bytes.

A composite logical extent can be a logical range of content with some virtual size, which comprises a plurality of maps that each map from a subrange of the composite logical extent logical range of content to an underlying leaf or composite logical extent. Transforming a request related to content for a composite logical extent, then, involves taking the content range for the request within the context of the composite logical extent, determining which underlying leaf or composite logical extents that request maps to, and transforming the request to apply to an appropriate range of content within those underlying leaf or composite logical extents.

Volumes, or files or other types of storage objects, can be described as composite logical extents. Thus, these presented storage objects can be organized using this extent model.

Depending on implementation, leaf or composite logical extents could be referenced from a plurality of other composite logical extents, effectively allowing inexpensive duplication of larger collections of content within and across volumes. Thus, logical extents can be arranged essentially within an acyclic graph of references, each ending in leaf logical extents. This can be used to make copies of volumes, to make snapshots of volumes, or as part of supporting virtual range copies within and between volumes as part of EXTENDED COPY or similar types of operations.

An implementation may provide each logical extent with an identity which can be used to name it. This simplifies referencing, since the references within composite logical extents become lists comprising logical extent identities and a logical subrange corresponding to each such logical extent identity. Within logical extents, each stored data block reference may also be based on some identity used to name it.

To support these duplicated uses of extents, we can add a further capability: copy-on-write logical extents. When a modifying operation affects a copy-on-write leaf or composite logical extent the logical extent is copied, with the copy being a new reference and possibly having a new identity (depending on implementation). The copy retains all references or identities related to underlying leaf or composite logical extents, but with whatever modifications result from the modifying operation. For example, a WRITE, WRITE SAME, XDWRITEREAD, XPWRITE, or COMPARE AND WRITE request may store new blocks in the storage system (or use deduplication techniques to identify existing stored blocks), resulting in modifying the corresponding leaf logical extents to reference or store identities to a new set of blocks, possibly replacing references and stored identities for a previous set of blocks. Alternately, an UNMAP request may modify a leaf logical extent to remove one or more block references. In both types of cases, a leaf logical extent is modified. If the leaf logical extent is copy-on-write, then a new leaf logical extent will be created that is formed by copying unaffected block references from the old extent and then replacing or removing block references based on the modifying operation.

A composite logical extent that was used to locate the leaf logical extent may then be modified to store the new leaf logical extent reference or identity associated with the copied and modified leaf logical extent as a replacement for the previous leaf logical extent. If that composite logical extent is copy-on-write, then a new composite logical extent is created as a new reference or with a new identity, and any unaffected references or identities to its underlying logical extents are copied to that new composite logical extent, with the previous leaf logical extent reference or identity being replaced with the new leaf logical extent reference or identity.

This process continues further backward from referenced extent to referencing composite extent, based on the search path through the acyclic graph used to process the modifying operation, with all copy-on-write logical extents being copied, modified, and replaced.

These copied leaf and composite logical extents can then drop the characteristic of being copy on write, so that further modifications do not result in an additional copy. For example, the first time some underlying logical extent within a copy-on-write "parent" composite extent is modified, that underlying logical extent may be copied and modified, with the copy having a new identity which is then written into a copied and replaced instance of the parent composite logical extent. However, a second time some other underlying logical extent is copied and modified and with that other underlying logical extent copy's new identity being written to the parent composite logical extent, the parent can then be modified in place with no further copy and replace necessary on behalf of references to the parent composite logical extent.

Modifying operations to new regions of a volume or of a composite logical extent for which there is no current leaf logical extent may create a new leaf logical extent to store the results of those modifications. If that new logical extent is to be referenced from an existing copy-on-write composite logical extent, then that existing copy-on-write composite logical extent will be modified to reference the new logical extent, resulting in another copy, modify, and replace sequence of operations similar to the sequence for modifying an existing leaf logical extent.

If a parent composite logical extent cannot be grown large enough (based on implementation) to cover an address range associated that includes new leaf logical extents to create for a new modifying operation, then the parent composite logical extent may be copied into two or more new composite logical extents which are then referenced from a single "grandparent" composite logical extent which yet again is a new reference or a new identity. If that grandparent logical extent is itself found through another composite logical extent that is copy-on-write, then that another composite logical extent will be copied and modified and replaced in a similar way as described in previous paragraphs. This copy-on-write model can be used as part of implementing snapshots, volume copies, and virtual volume address range copies within a storage system implementation based on these directed acyclic graphs of logical extents. To make a snapshot as a read-only copy of an otherwise writable volume, a graph of logical extents associated with the volume is marked copy-on-write and a reference to the original composite logical extents are retained by the snapshot. Modifying operations to the volume will then make logical extent copies as needed, resulting in the volume storing the results of those modifying operations and the snapshots retaining the original content. Volume copies are similar, except that both the original volume and the copied volume can modify content resulting in their own copied logical extent graphs and subgraphs.

Virtual volume address range copies can operate either by copying block references within and between leaf logical extents (which does not itself involve using copy-on-write techniques unless changes to block references modifies copy-on-write leaf logical extents). Alternately, virtual volume address range copies can duplicate references to leaf or composite logical extents, which works well for volume address range copies of larger address ranges. Further, this allows graphs to become directed acyclic graphs of references rather than merely reference trees. Copy-on-write techniques associated with duplicated logical extent references can be used to ensure that modifying operations to the source or target of a virtual address range copy will result in the creation of new logical extents to store those modifications without affecting the target or the source that share the same logical extent immediately after the volume address range copy operation.

Input/output operations for pods may also be implemented based on replicating directed acyclic graphs of logical extents. For example, each storage system within a pod could implement private graphs of logical extents, such that the graphs on one storage system for a pod have no particular relationship to the graphs on any second storage system for the pod. However, there is value in synchronizing the graphs between storage systems in a pod. This can be useful for resynchronization and for coordinating features such as asynchronous or snapshot based replication to remote storage systems. Further, it may be useful for reducing some overhead for handling the distribution of snapshot and copy related processing. In such a model, keeping the content of a pod in sync across all in-sync storage systems for a pod is essentially the same as keeping graphs of leaf and composite logical extents in sync for all volumes across all in-sync storage systems for the pod, and ensuring that the content of all logical extents is in-sync. To be in sync, matching leaf and composite logical extents should either have the same identity or should have mappable identities. Mapping could involve some set of intermediate mapping tables or could involve some other type of identity translation. In some cases, identities of blocks mapped by leaf logical extents could also be kept in sync.

In a pod implementation based on a leader and followers, with a single leader for each pod, the leader can be in charge of determining any changes to the logical extent graphs. If a new leaf or composite logical extent is to be created, it can be given an identity. If an existing leaf or composite logical extent is to be copied to form a new logical extent with modifications, the new logical extent can be described as a copy of a previous logical extent with some set of modifications. If an existing logical extent is to be split, the split can be described along with the new resulting identities. If a logical extent is to be referenced as an underlying logical extent from some additional composite logical extent, that reference can be described as a change to the composite logical extent to reference that underlying logical extent.

Modifying operations in a pod thus comprises distributing descriptions of modifications to logical extent graphs (where new logical extents are created to extend content or where logical extents are copied, modified, and replaced to handle copy-on-write states related to snapshots, volume copies, and volume address range copies) and distributing descriptions and content for modifications to the content of leaf logical extents. An additional benefit that comes from using metadata in the form of directed acyclic graphs, as described above, is that I/O operations that modify stored data in physical storage may be given effect at a user level through the modification of metadata corresponding to the stored data in physical storage—without modifying the stored data in physical storage. In the disclosed embodiments of storage systems, where the physical storage may be a solid state drive, the wear that accompanies modifications to flash memory may be avoided or reduced due to I/O operations being given effect through the modifications of the metadata representing the data targeted by the I/O operations instead of through the reading, erasing, or writing of flash memory. Further, as noted above, in such a virtualized storage system, the metadata described above may be used to handle the relationship between virtual, or logical, addresses and physical, or real, addresses—in other words, the metadata representation of stored data enables a virtualized storage system that may be considered flash-friendly in that it reduces, or minimizes, wear on flash memory.

Leader storage systems may perform their own local operations to implement these descriptions in the context of their local copy of the pod dataset and the local storage system's metadata. Further, the in-sync followers perform their own separate local operations to implement these descriptions in the context of their separate local copy of the pod dataset and their separate local storage system's metadata. When both leader and follower operations are complete, the result is compatible graphs of logical extents with compatible leaf logical extent content. These graphs of logical extents then become a type of "common metadata" as described in previous examples. This common metadata can be described as dependencies between modifying operations and required common metadata. Transformations to graphs can be described as separate operations within a set of or more predicates that may describe relationships, such as dependencies, with one or more other operations. In other words, interdependencies between operations may be described as a set of precursors that one operation depends on in some way, where the set of precursors may be considered predicates that must be true for an operation to complete. A fuller description of predicates may be found within application Ser. No. 15/696,418, which is included herein by reference in its entirety. Alternately, each modifying operation that relies on a particular same graph transformation that has not yet been known to complete across the pod can include the parts of any graph transformation that it relies on. Processing an operation description that identifies a "new" leaf or composite logical extent that already exists can avoid creating the new logical extent since that part was already handled in the processing of some earlier operation, and can instead implement only the parts of the operation processing that change the content of leaf or composite logical extents. It is a role of the leader to ensure that transformations are compatible with each other. For example, we can start with two writes come that come in for a pod. A first write replaces a composite logical extent A with a copy of formed as composite logical extent B, replaces a leaf logical extent C with a copy as leaf logical extent D and with modifications to store the content for the second write, and further writes leaf logical extent D into composite logical extent B. Meanwhile, a second write implies the same copy and replacement of composite logical extent A with composite logical extent B but copies and replaces a different leaf logical extent E with a logical extent F which is modified to store the content of the second write, and further writes logical extent F into logical extent B. In that case, the description for the first write can include the replacement of A with B and C with D and the writing of D into composite logical extent B and the writing of the content of the first write into leaf extend B; and, the description of the second write can include the replacement of A with B and E with F and the writing of F into composite logical extent B, along with the content of the second write which will be written to leaf extent F. A leader or any follower can then separately process the first write or the second write in any order, and the end result is B copying and replacing A, D copying and replacing C, F copying replacing E, and D and F being written into composite logical extent B. A second copy of A to form B can be avoided by recognizing that B already exists. In this way, a leader can ensure that the pod maintains compatible common metadata for a logical extent graph across in-sync storage systems for a pod.

Given an implementation of storage systems using directed acyclic graphs of logical extents, recovery of pods based on replicated directed acyclic graphs of logical extents may be implemented. Specifically, in this example, recovery in pods may be based on replicated extent graphs then involves recovering consistency of these graphs as well as recovering content of leaf logical extents. In this implementation of recovery, operations may include querying for graph transformations that are not known to have completed on all in-sync storage systems for a pod, as well as all leaf logical extent content modifications that are not known to have completed across all storage systems for the pod. Such querying could be based on operations since some coordinated checkpoint, or could simply be operations not known to have completed where each storage system keeps a list of operations during normal operation that have not yet been signaled as completed. In this example, graph transformations are straightforward: a graph transformation may create new things, copy old things to new things, and copy old things into two or more split new things, or they modify composite extents to modify their references to other extents. Any stored operation description found on any in-sync storage system that creates or replaces any logical extent can be copied and performed on any other storage system that does not yet have that logical extent. Operations that describe modifications to leaf or composite logical extents can apply those modifications to any in-sync storage system that had not yet applied them, as long as the involved leaf or composite logical extents have been recovered properly.

In another example, as an alternative to using a logical extent graph, storage may be implemented based on a replicated content-addressable store. In a content-addressable store, for each block of data (for example, every 512 bytes, 4096 bytes, 8192 bytes or even 16384 bytes) a unique hash value (sometimes also called a fingerprint) is calculated, based on the block content, so that a volume or an extent range of a volume can be described as a list of references to blocks that have a particular hash value. In a synchronously replicated storage system implementation based on references to blocks with the same hash value, replication could involve a first storage system receiving blocks, calculating fingerprints for those blocks, identifying block references for those fingerprints, and delivering changes to one or a plurality of additional storage systems as updates to the mapping of volume blocks to referenced blocks. If a block is found to have already been stored by the first storage system, that storage system can use its reference to name the reference in each of the additional storage systems (either because the reference uses the same hash value or because an identifier for the reference is either identical or can be mapped readily). Alternately, if a block is not found by the first storage system, then content of the first storage system may be delivered to other storage systems as part of the operation description along with the hash value or identity associated with that block content. Further, each in-sync storage system's volume descriptions are then updated with the new block references. Recovery in such a store may then include comparing recently updated block references for a volume. If block references differ between different in-sync storage systems for a pod, then one version of each reference can be copied to other storage systems to make them consistent. If the block reference on one system does not exist, then it be copied from some storage system that does store a block for that reference. Virtual copy operations can be supported in such a block or hash reference store by copying the references as part of implementing the virtual copy operation.

As described above, metadata may be synchronized among storage systems that are synchronously replicating a dataset. Such metadata may be referred to as common metadata, or shared metadata, that is stored by a storage system on behalf of a pod related to the mapping of segments of content stored within the pod to virtual address within storage objects within the pod, where information related to those mappings is synchronized between member storage systems for the pod to ensure correct behavior—or better performance—for storage operations related to the pod. In some examples, a storage object may implement a volume or a snapshot. The synchronized metadata may include: (a) information to keep volume content mappings synchronized among the storage systems in the pod; (b) tracking data for recovery checkpoints or for in-progress write operations; (c) information related to the delivery of data and mapping information to a remote storage system for asynchronous or periodic replication.

Information to keep volume content mappings synchronized among the storage systems in the pod may enable efficient creating of snapshots, which in turn enables that subsequent updates, copies of snapshots, or snapshot removals may be performed efficiently and consistently across the pod member storage systems.

Tracking data for recovery checkpoints or for in-progress write operations may enable efficient crash recovery and efficient detection of content or volume mappings that may have been partially or completely applied on individual storage systems for a pod, but that may not have been completely applied on other storage systems for the pod.

Information related to the delivery of data and mapping information to a remote storage system for asynchronous or periodic replication may enable more than one member storage system for a pod to serve as a source for the replicated pod content with minimal concerns for dealing with mismatches in mapping and differencing metadata used to drive asynchronous or periodic replication.

In some examples, shared metadata may include descriptions for, or indications of, a named grouping, or identifiers for, of one or more volumes or one or more storage objects that are a subset of an entire synchronously replicated dataset for a pod—where such a of volumes or storage objects of a dataset may be referred to as a consistency group. A consistency group may be defined to specify a subset of volumes or storage objects of the dataset to be used for consistent snapshots, asynchronous replication, or periodic replication. In some examples, a consistency group may be calculated dynamically, such as by including all volumes connected to a particular set of hosts or host network ports, or that are connected to a particular set of applications or virtual machines or containers, where the applications, virtual machines, or containers may operate on external server systems or may operate on one or more of the storage systems that are members of a pod. In other examples, a consistency group may be defined according to user selections of a type of data or set of data, or specifications of a consistency group similar to the dynamic calculation, where a user may specify, for example through a command or management console, that a particular, or named, consistency group be created to include all volumes connected to a particular set of hosts or host network ports, or be created to include data for a particular set of applications or virtual machines or containers.

In an example using a consistency group, a first consistency group snapshot of a consistency group may include a first set of snapshot for all volumes or other storage objects that are members of the consistency group at the time of the first dataset snapshot, with a second consistency group snapshot of the same consistency group including a second set of snapshots for the volumes or other storage objects that are members of the consistency group at the time of the second dataset snapshot. In other examples, a snapshot of the dataset may be stored on one or more target storage systems in an asynchronous manner. Similarly, asynchronous replication of a consistency group may account for dynamic changes to member volumes and other storage objects of the consistency group, where consistency group snapshots of the consistency group at either the source or the target of the asynchronous replication link include the volumes and other storage objects that are members in relationship to the consistency group at the time that the dataset snapshot relates to. In the case of a target of an asynchronous replication connection, the time that the dataset snapshot relates to depends on the dynamic dataset of the sender as it was received and was in process at the time of the consistency group snapshot on the target. For example, if a target of an asynchronous replication is, say, 2000 operations behind, where some of those operations are consistency group member changes, where a first set of such changes are more than 2000 operations ago for the source, and a second set of changes are within the last 2000, then a consistency group snapshot at that time on the target will account for the first set of member changes and will not account for the second set of changes. Other uses of the target of asynchronous replication may similarly account for the nature of the time of the dataset for the consistency group in determining the volumes or other storage objects (and their content) for those uses. For example, in the same case of asynchronous replication being 2000 operations behind, use of the target for a disaster recovery failover might start from a dataset that includes the volumes and other storage objects (and their content) as they were 2000 operations ago at the source. In this discussion, concurrent operations at the source (e.g., writes, storage object creations or deletions, changes to properties that affect inclusion or exclusion of volumes or other storage objects or other data from a consistency group, or other operations that were in progress and not signaled as completed at a same point in time) might not have a single well-defined ordering, so the count of operations only needs to represent some plausible ordering based on any allowed ordering of concurrent operations on the source.

As another example using consistency groups, in the case of periodic replication based on replication of consistency group snapshots, each replicated consistency group snapshot would include the volumes and other storage objects at the time each consistency group snapshot was formed on the source. Ensuring that membership in a consistency group is kept consistent by using common, or shared, metadata, ensures that a fault—or other change which may cause the source of replication, or the system that forms a dataset snapshot, to switch from one storage system in a pod to another—does not lose information needed for properly handling those consistency group snapshots or the consistency group replication. Further, this type of handling may allow for multiple storage systems that are members of a pod to concurrently serve as source systems for asynchronous or periodic replication.

Further, synchronized metadata describing mapping of segments to storage objects is not limited to mappings themselves, and may include additional information such as sequence numbers (or some other value for identifying stored data), timestamps, volume/snapshot relationships, checkpoint identities, trees or graphs defining hierarchies, or directed graphs of mapping relationships, among other storage system information.

Figure 8:
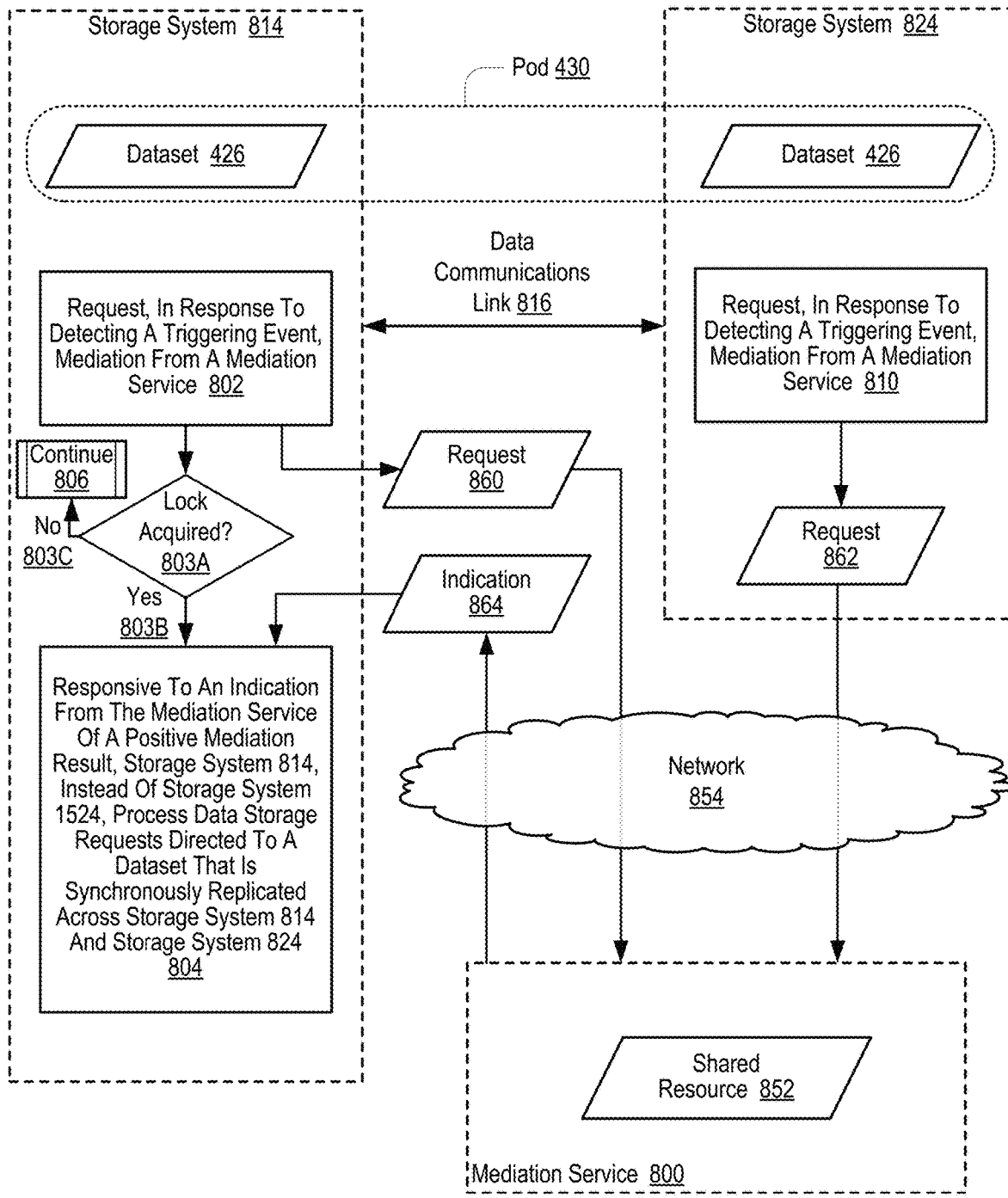
FIG. 8 sets forth a flow chart illustrating an example method of mediation between storage systems according to some embodiments of the present disclosure.

For further explanation, FIG. 8 sets forth a flow chart illustrating an example method for mediating between storage systems synchronously replicating a dataset according to some embodiments of the present disclosure. Although the example method depicted in FIG. 8 illustrates an embodiment in which a dataset (426) is synchronously replicated across only two storage systems (814, 824), the example depicted in FIG. 8 can be extended to embodiments in which the dataset (426) is synchronously replicated across additional storage systems.

In the following examples, mediation among a set of storage systems (814, 824) for a pod allows the storage systems to resolve lost communication with a paired system, where communication may be lost due to communication faults or some other kind of system fault. As described below, solutions to mediation may include use of quorums and an external control system that dictates which of the storage systems should continue processing I/O operations directed to a pod dataset, and racing for a resource such as a mediator. However, an advantage of mediation is that it is simpler than quorum protocols, and mediation works well with a two storage system configuration for synchronously replicated storage systems, which is a common configuration. Further, mediation may be more robust and easier to configure than external control systems and many other types of resources that may be raced against.

As depicted in FIG. 8, multiple storage systems (814, 824) that are synchronously replicating a dataset (426) may be in communication with a mediation service (800) over a network (854)—where a mediation service (800) may resolve which storage system continues to service the dataset in the event of a communication fault between storage systems, in the event of a storage system going offline, or due to some other triggering event. Mediation is advantageous because if the storage systems are unable to communicate with each other, they may be unable to maintain a synchronously replicated dataset, and any received requests to modify a dataset would be unserviceable because otherwise the dataset would become unsynchronized. In this example, mediation services for storage systems that are synchronously replicating a dataset may be provided by a mediation service (800) that is external to the storage systems (814, 824). While in this example, there are only two storage systems (814, 824) depicted, in general, some other number of two or more storage systems may be part of an in-sync list that is synchronously replicating a dataset. Specifically, if a first storage system (814) has detected a triggering event, such as loss of a communication link (816) to a second storage system (824), the first storage system (814) may contact an external mediation service (800) to determine whether it can safely take over the task of removing the non-communicating storage system from an in-sync list that specifies the storage systems that are synchronized with respect to replicating a dataset. In other cases, the first storage system (814) may contact the external mediation service (800) and determine that it, the first storage system (814), may have been removed from the in-sync list by a second storage system. In these examples, the storage systems (814, 824) need not be in continuous communication with the external mediation service (800) because under normal conditions the storage systems (814, 824) do not need any information from the mediation service (800) to operate normally and to maintain synchronous replication of a dataset (426). In other words, in this example, the mediation service (800) may not have an active role in membership management of an in-sync list, and further, the mediation service (800) may not even be aware of the normal operation of the storage systems (814, 824) in the in-sync list. Instead, the mediation service (800) may simply provide persistent information that is used by the storage systems (814, 824) to determine membership in an in-sync list, or to determine whether a storage system can act to detach another storage system.

In some examples, a mediation service (800) may be contacted by one or more storage systems (814, 824) in response to a triggering event such as a communication link failure preventing the storage systems (814, 824) from communication with each other; however, each storage system (814, 824) may be able to communicate with the mediation service (800) over a communication channel that is different from the communication channel used between the storage systems (814, 824). Consequently, while the storage systems (814, 824) may be unable to communicate with each other, yet each of the storage systems (814, 824) may still be in communication with the mediation service (800), where the storage systems (814, 824) may use the mediation service (800) to resolve which storage system may proceed to service data storage requests. Further, the storage system that wins mediation from the mediation service (800) may detach another storage system and update an in-sync list indicating the storage systems that may continue to synchronously replicate a dataset (426). In some examples, a mediation service (800) may handle various types of requests, such as a request to set a membership list that includes a requestor storage system and excludes another storage system. In this example, a request completes successfully if the mediation service (800) currently lists the requestor as a member, and the request fails if the mediation service (800) does not currently list the requestor as a member. In this way, if two storage systems (814, 824) are each making requests at approximately the same time, where the requests serve to exclude the other, then the first request received may succeed—where the mediation service sets the membership list to exclude the other storage system according to the first request—and the second request received may fail because the membership list has been set to exclude it. The mutually exclusive access to a shared resource storing a membership list serves to ensure that only a single system as a time is allowed to set a membership list.

In another example, mediation may be based on a partition identifier, where a value may be defined to indicate a pod membership partition identifier to assert that membership has partitioned off, or removed, some set of storage systems from a pod. A 'pod', as the term is used here and throughout the remainder of the present application, may be embodied as a management entity that represents a dataset, a set of managed objects and management operations, a set of access operations to modify or read the dataset, and a plurality of storage systems. Such management operations may modify or query managed objects equivalently through any of the storage systems, where access operations to read or modify the dataset operate equivalently through any of the storage systems. Each storage system may store a separate copy of the dataset as a proper subset of the datasets stored and advertised for use by the storage system, where operations to modify managed objects or the dataset performed and completed through any one storage system are reflected in subsequent management objects to query the pod or subsequent access operations to read the dataset. Additional details regarding a 'pod' may be found in previously filed provisional patent application No. 62/518,071, which is incorporated herein by reference.

A partition identifier may be local information stored on a given storage system, in addition to the given storage system storing a pod membership list. Systems that are in proper communication with each other and are in-sync may have the same partition identifier, and when storage systems are added to a pod, then the current partition identifier may be copied along with the pod data contents. In this example, when one set of storage systems is not communicating with another set of storage systems, one storage system from each set may come up with a new and unique partition identifier and attempt to set it in the shared resource maintained by the mediation service (800) by using a particular operation that succeeds for a storage system that first acquires a lock on the shared resource, where another storage system—that failed to acquire a lock on the shared resource—fails an attempt at performing the particular operation. In one implementation, an atomic compare-and-set operation may be used, where the last partition identifier value stored by the mediation service (800) may be provided by a storage system to have the permission to change the partition identifier to a new value. In this example, a compare-and-set operation may be successful for a storage system that is aware of the current partition identifier value—where a storage system that first sets the partition identifier value would be the storage system aware of the current partition identifier value. Further, a conditional-store or a PUT operation, which may be available in web service protocols, may work to set the partition identifier value as described in this example. In other cases, such as in a SCSI environment, a compare-and-write operation may be used. In still other cases, the mediation service (800) may perform the compare-and-set operation by receiving a request from a storage system, where the request indicates an old partition identifier value and also a new partition identifier value, and where the mediation service (800) changes the stored partition identifier to the new partition identifier value if and only if the currently stored value is equal to the old partition identifier.

In this way, mediation based on a partition identifier may be used to persist information that may be used by storage systems to determine whether or not a given storage system is included within a partitioned off set of consistent pod members. In some cases, a partition identifier may only change in the case of a spontaneous detach due to a fault in either a storage system or a network interconnect. In these examples, a storage system that brings itself offline for a pod in a controlled way may communicate with other storage systems to remove itself as an in-sync pod member, thus not requiring the formation of a mediated new partition identifier. Further, a storage system that removes itself as a member of an in-sync pod may then add itself back as an in-sync pod member in a controlled way that does not require a mediated new partition identifier. In addition, new storage system may be added to the in-sync pod as long as the storage systems are communicating with in-sync pod members, where the new storage systems may add themselves in a controlled way that does not require a mediated new partition identifier.

Consequently, an advantage of the mediated partition identifier mechanism is that the mediation service (800) may only be necessary when there is a fault, or other triggering event, that at least one set of storage systems react to by attempting to remove one or more non-communicating storage systems from the in-sync pod membership list, where the non-communicating storage systems may attempt to do the same, but in reverse. Another advantage is that a mediation service (800) may be less than absolutely reliable and have little impact on the availability of the overall storage service provided by in-sync pod members. For example, if two synchronously replicated storage systems each fail once per year, then unless the mediation service (800) is unavailable at the exact moment a first of the two storage systems fail, the second storage system should successfully mediate to remove the first storage system. In short, if the mediation service (800) is up and available at least 99% of the time, the probability of the mediation service (800) not being available when needed becomes exceedingly low. In this example, the chances would be only 1 out of 100 (1% or less) that the mediation service (800) would not be available at a critical time—which can reduce a once-a-year outage into a once-a-century outage. However, to lessen the odds of unavailability of a mediation service (800), the mediation service (800) may be monitored on a periodic basis to alert an administrator if a mediation service is not generally available, where the mediation service (800) may also monitor storage systems to generate an alert in case a particular storage system becomes unavailable.

In another example, as an alternative to using a partition identifier associated with in-sync members for a pod, the mediation service (800) may provide a one-time mediation race target. Specifically, each time the in-sync member storage systems for a pod may need to allow for the possibility that one storage system may be detached by others, a mediation race target may be established. For example, an agreed-upon key in a table of mediation values may be set one time to a new value, where to win mediation, a storage system sets the agreed-upon key to a unique value that no other separately racing storage system would use. Previous to the mediation race, the agreed-upon key may not exist, or if it does exist, it may be set to some agreed-upon precursor value such as an UNSET, or null, value. In this example, an operation to set the key to a particular value succeeds if the key does not exist, if the key is in the UNSET state, or if the key is being set to a value equal to a current value—otherwise, the operation to set the key fails. Once a set of storage systems wins mediation, the remaining set of storage systems may define a new key to use for future mediations. In this example, a storage system may record the value it uses prior to the mediation race so that the storage system may use the value again if it faults and recovers, or reboots, before learning that it may have won the mediation race. If two or more storage systems are communicating and are together racing against some other set of storage systems that are not communicating, this value may be shared to those other communicating storage system so that any one of them may continue the mediation race, and perhaps engage in a second mediation race, after some additional sequence of faults. For example, it may be necessary for correctness to race for or validate the first mediation race target before racing for a unique value for a second mediation race target. In particular, this sequence may be necessary until a second mediation race target is reliably distributed to all storage systems that share the first mediation race target and all storage systems are made aware that it has been reliably distributed. At that point, there may be no continuing need to first race for the first mediation target before racing for the second mediation target.

In some examples, a mediation service (800) may be managed on computer systems provided by an organization other than an organization or owner of the storage systems being mediated. For example, if a vendor sells two storage systems to a customer, the vendor may host the mediators on servers provided in vendor-owned or managed data centers, or the vendor may contract with a cloud services provider to host the service. A vendor may also ensure that the mediation service is sufficiently reliable and distinct from any of the customer's fault zones. In one case, without excluding other cloud services providers, the mediation service may be hosted in Amazon Web Services™, and the mediation service may be implemented with DynamoDB for reliable database service, where DynamoDB may provide support for conditional-store primitives as web API database updates. In some cases, a mediation service may be implemented to operate across multiple cloud services provider regions or fault zones to further improve reliability. One advantage of using a vendor to provide mediation services is that the mediation service is straightforward to configure. Further, during creation of a pod a storage system may obtain a cryptographic token from the mediation service, and store the cryptographic token in addition to storing a partition identifier and a pod membership list—where the cryptographic token may be used to securely communicate the unique mediation service information for a pod.

In some cases, the mediation service (800) may be unavailable when a storage system attempts to mediate, and the following method provides a process of recovering, at least eventually, from such a service outage. For example, if a first set of storage systems attempts to detach a second set of storage systems through a mediation service, but the first set of storage systems cannot communicate with the mediation service (800), then the first set of storage systems cannot complete the detach operation and cannot continue serving the pod. In some cases, if the two sets of storage systems manage to reconnect with each other, such that all in-sync storage systems are communicating again—but with the mediation service (800) still being unavailable—the two sets of storage systems may synchronize and resume servicing the pod. However, in this example, one or more requests may have been sent to the mediation service (800) to change the partition identifier, or to change whatever other properties associated with mediation, and none of the storage systems may be certain whether a request was or was not received and processed, where a confirming response may have been lost. As a result, if there is a set of faulted storage systems or network interconnects, then no storage system may be sure which value to assert for the partition identifier if and when the mediation service (800) comes back online. In such a scenario, it is preferable for the pod's service to resume either when all in-sync storage systems come back online and resume communicating, or when an in-sync storage system can reconnect to the mediation service (800). In one implementation, when all in-sync storage systems reconnect, the in-sync storage systems all exchange known partition identifier values that may have been sent to the mediation service (800). For example, if two storage systems had each tried to change the partition identifier value, where one storage system attempts to change the partition identifier to, say, 1749137481890, and another storage system attempts to change the partition identifier to, say, 87927401839, and the last value known to have been acknowledged by the mediation service (800) was 79223402936, then the mediation service (800) may currently store any of these three partition identifier values. As a result, any future attempt to change the mediation partition identifier to a new value may supply any or all of these three partition identifiers in attempts to gain the authority to make the change. Further, a fourth attempt to change the partition identifier value may also encounter a fault, resulting in a fourth value that may need to be remembered by any storage systems that later attempts yet another mediation. In addition, if any storage system successfully changes the mediation service (800) partition identifier value, that storage system may purge the older partition identifier values from any in-sync storage systems and from any storage systems that become in-sync in the future.

In another example, a mediation service (800) may mediate based on a unique key arranged for each potential future race. In such a case, the in-sync storage systems may agree to use a new key. Given that a new key may not be set atomically on all storage systems at the same time, until all in-sync storage systems receive and record the new key, all storage systems should retain their old keys and the values each storage system attempted to set in any previous mediation attempt. In this example, any earlier non-raced keys and any earlier key/value mediation attempts may be circulated between all in-sync storage systems for the pod and recorded on each such storage system, along with a new key to use for future mediation attempts. For each previous non-raced key (not including the new key), this exchange may also select a single, agreed-upon value that all systems may use in racing for that key. After all in-sync storage systems for a pod have received and recorded all of these mediation keys and values (and the new agreed-upon key for any future race), the storage systems in the pod may then agree to discard the older keys and values in favor of the single new key. Note that two or more storage systems may have attempted to set the same mediation key to different values, and all such values may be recorded. If there is a fault during the process of exchanging or receiving all these mediation keys and key/value pairs for past mediation attempts, then some storage systems may not have received and recorded the new mediation keys and values, while others might have. If the mediation service (800) becomes available before all in-sync storage systems for the pod can reconnect with each other, then a subset of storage systems for the pod may attempt to use the mediation service (800) to detach another storage system from the pod. To win mediation, a storage system may attempt to set all recorded keys to their recorded values, and if that works, to then set the new key to a unique value. If more than one value was recorded for the same key, then that step succeeds if setting any one of those values is successful. If the first step (setting previous keys) fails or the second step (setting the new key to the new unique value) fails, then the storage systems participating in that attempt at mediation may go offline (retaining the value it attempted to set for the new key). If both steps succeed, then the communicating storage systems may detach the non-communicating storage systems and continue serving the pod. As an alternative to exchanging all past keys and values, a storage system may record only the keys and values that it tries, with no exchange of keys and values from other storage systems for a pod. Then, if an in-sync storage system reconnects with other in-sync storage systems for a pod (where none had succeeded in interacting with a mediation service), the in-sync storage system may exchange one new mediation key, and then exchange an acknowledgment that they both received and recorded the agreed upon new key. If a fault prevents exchanging the acknowledgment, then a future attempt at mediation (to a now-available mediation service) by a storage system that had never received the new key may attempt to reassert its previous keys and values. A storage system that had received the new key but had not received an indication that all storage systems for the pod had received the key may assert its previous mediation keys as well as asserting a value for the new key, previous keys first, then the new key. That future mediation attempt may still fail, and then the storage system may again reconnect to other in-sync storage systems and may again incompletely exchange new keys, leading to another key. This adds another key. As keys build up over time with a set of incomplete exchanges of new keys, future mediation attempts by a storage system may reassert each of its keys, along with any values it previously asserted for those keys, in the order that they were recorded, until it successfully asserts a value for all keys, or it encounters a failure to assert a key at which point it stops asserting keys and goes offline.

In another example, a new mediation service may be configured when a current mediation service is unavailable. For example, if all in-sync storage systems for a pod are communicating with each other, but are not in communication with the current mediation service, then the pod may be configured with a new mediation service. This is similar to the previous algorithm of selecting a new key or new mediation values, but the new key is further configured to use a new mediation service rather than merely being another key associated with the same service. Further, if there is a fault during this operation, as with the previous algorithm, some systems may race for older keys, and so systems that know both the old keys and the new key with the new mediation service may race for the new key on the new mediator service. If the previous mediation service is permanently unavailable, then all in-sync storage systems should eventually reconnect with each other and complete the exchange of the new mediation service and any keys and values associated with the new mediation service before pod service can be resumed safely.

In another example, a model for resolving faults may be to implement preference rules to favor one storage system over other storage systems. In this example, if a preferred storage system is running, it stays running and detaches any storage systems it is not communicating with. Further, any other system that is not in proven communication with the preferred system takes itself offline. In this example, when a non-preferred storage system eventually reconnects with a preferred storage system, then if the preferred storage system had not yet detached the reconnecting storage system, then the two storage systems may recover and resume from the state of both storage systems being in-sync, whereas if the preferred storage system had detached the reconnecting storage system then the reconnecting storage system must be resynchronized first to get it in-sync for the pod before it can resume servicing the pod. Having, a preferred storage system may not be as useful for providing high availability, but may be useful for other uses of synchronous replication, particularly asymmetric synchronous replication. Take for example, the case of mirroring a pod from a central, large storage system in a data center or campus, to a smaller (perhaps less managed) storage system running closer to application servers, such as in top-of-rack configurations. In this case, it may be beneficial to always favor the larger, more managed central storage system in cases of network failures or when the top-of-rack storage system fails, while bringing down service for a pod altogether if the centrally managed storage system fails. Such top-of-rack storage systems might be used only to improve read performance or to reduce load on data-center storage networks, but if asynchronous replication or other data management services are running only on the centrally managed system, it may be preferable to reroute traffic to the central storage system or stop servicing and call tech support than to allow the top-of-rack storage system to continue alone. Further, preference rules may be more complex—there may be two or more such "preferred" storage systems coupled, perhaps, with some number of additional storage systems that rely on the preferred or required storage systems. In this example, the pod is online if all the preferred or required storage systems are running, and is down if some of them are not running. This is similar to a quorum model where the size of the quorum is the same as the number of voting members, but it is simpler to implement than a generalized quorum model that allows for fewer than all voting members.

In another example, a combination of mechanisms may be used, which may be useful when a pod is stretched across more than two storage systems. In one example, preference rules may be combined with mediation. In the top-of-rack example, the larger central storage system in a data center or campus might itself be synchronously replicated to a large storage system in a second location. In that case, the top-of-rack storage systems may never resume alone, and may prefer any of the larger central storage systems in the two locations. The two larger storage systems in that case might be configured to mediate between each other, and any smaller storage systems that can connect to whichever of the two larger storage systems that remain online may continue servicing their pod, and any smaller storage systems that cannot connect to either of the two large storage systems (or that can only connect to one which is offline for the pod) may stop servicing the pod. Further, a preference model may also be combined with a quorum-based model. For example, three large storage systems in three locations might use a quorum model between each other, with smaller satellite or top-of-rack storage systems lacking any votes and working only if they can connect to one of the larger in-sync storage systems that are online.

In another example of combining mechanisms, mediation may be combined with a quorum model. For example, there may be three storage systems that normally vote between each other to ensure that two storage systems can safely detach a third that is not communicating, while one storage system can never detach the two other storage systems by itself. However, after two storage systems have successfully detached a third storage system, the configuration is now down to two storage systems that agree they are in-sync and that agree on the fact that the third storage system is detached. In that case, the two remaining storage systems may agree to use mediation (such as with a cloud service) to handle an additional storage system or network fault. This mediation and quorum combination may be extended further. For example, in a pod stretched between four storage systems, any three can detach a fourth, but if two in-sync storage systems are communicating with each other but not to two other storage systems they both currently consider to be in-sync, then they could use mediation to safely detach the other two. Even in a five storage system pod configuration, if four storage systems vote to detach a fifth, then the remaining four can use mediation if they are split into two equal halves, and once the pod is down to two storage systems, they can use mediation to resolve a successive fault. Five to three might then use quorum between the three allowing a drop to two, with the two remaining storage systems again using mediation if there is a further failure. This general multi-mode quorum and mediation mechanism can handle an additional number of situations that neither quorum between symmetric storage systems nor mediation by itself can handle. This combination may increase the number of cases where faulty or occasionally unreachable mediators can be used reliably (or in the case of cloud mediators, where customers may not entirely trust them). Further, this combination better handles the case of three storage system pods, where mediation alone might result in a first storage system successfully detaching a second and third storage systems on a network fault affecting just the first storage system. This combination may also better handle a sequence of faults affecting one storage system at a time, as described in the three to two, and then to one example. These combinations work because being in-sync and a detach operation result in specific states—in other words, the system is stateful because it is a process to go from detached to in-sync, and each stage in a sequence of quorum/mediator relationships ensures that at every point all online/in-sync storage systems agree on the current persistent state for the pod. This is unlike in some other clustering models where simply having a majority of cluster nodes communicating again is expected to be enough to resume operation. However, the preference model can still be added in, with satellite or top-of-rack storage systems never participating in either mediation or quorum, and serving the pod only if they can connect to an online storage system that does participate in mediation or quorum.

In some examples, a mediation service (800), or external pod membership managers, may be located in fault zones that are different than fault zones for the synchronously replicated storage systems (814, 824). For example, with a two storage system pod (430), if the two storage systems (814, 824) are separated into distinct fault zones by, for example, physical location—one in a city and the other in the outskirts of the city, or one in a data center connected to one power grid or Internet access point and the other in another data center connected to a different power grid or Internet access point—then it is generally preferable to be in some other fault zone than the two storage systems. As one example, the mediation service (800) may be in a different part of the extended urban area of the city, or connected to a different power grid or Internet access point. However, synchronously replicated storage systems may also be within a same data center to provide better storage reliability, and in this case, network, power, and cooling zones may be taken into account.

The example method depicted in FIG. 8 includes requesting (802), by a first storage system (814) in response to detecting a triggering event, mediation from a mediation service (800). In this example, a triggering event may be a communication fault in the data communications link (816) between the first storage system (814) and the second storage system (824), where detecting the fault may be based on a hardware failure initiating an interrupt, based on a failure to acknowledge a transmission, or based on failed retry efforts, or through some other method. In other cases, a triggering event may be expiration of a synchronous replication lease, and requesting mediation may be part of attempting to coordinate synchronizing the connection and resuming of activity leases. Such a lease may initially be established in dependence upon the timing information for at least one of the plurality of storage systems in a variety of different ways. For example, the storage systems may establish a synchronous replication lease by utilizing the timing information for each of the plurality of storage systems to coordinate or exchange clocks. In such an example, once the clocks are coordinated for each of the storage systems, the storage system may establish a synchronous replication lease that extends for a predetermined period of time beyond the coordinated or exchanged clock values. For example, if the clocks for each storage system are coordinated at time X, the storage systems may each be configured to establish a synchronous replication lease that is valid until X+2 seconds. A further explanation for coordinating or exchanging clocks may be found within U.S. Provisional Application 62/518,071, which is incorporated by reference herein in its entirety.

Further, requesting (802), by the first storage system (814) in response to detecting the triggering event, mediation from the mediation service (800) may be implemented by a controller of the first storage system (814) detecting a triggering event and sending a request (860) over a network (854) to a mediation service (800). In some examples, a mediation service (800) may be a third party service that provides—to multiple computer systems—mutually exclusive access to a resource, such as a particular database entry for storing a value. For example, the mediation service (800) may be provided by a database service provided by a cloud service provider, provided by a host computer issuing requests to modify the dataset, or by some third party service providing mutually exclusive access to a resource, where the resource may be storage, a state machine, or some other type of resource capable of indicating a particular modification based on a request from a particular client. In this example, after sending the request (860) for mediation, the first storage system (814) waits (803A) for an indication from the mediation service (800) that indicates a positive mediation result (803B) or a negative mediation result or lack of response (803C). If the first storage system (814) receives a negative mediation result or receives no response (803C), and if a threshold amount of time to wait has not been exceeded, then the first storage system (814) may continue (806) to wait more time. However, if the amount of time waiting exceeds the threshold amount, then the first storage system (814) may continue (806) by determining that another computer system won mediation, and taking itself offline. In some examples, as discussed above, a request for mediation may be received by the mediation service (800) as an atomic compare-and-set operation that attempts to set a value for a shared resource (852) that may also be the target of a compare-and-set operation received from another of the storage systems maintaining the pod (430), where the storage system that successfully sets the shared resource (852) wins mediation.

The example in FIG. 8 also includes the second storage system (824) requesting (810), in response to detecting a triggering event, mediation from the mediation service (800). Requesting (810), in response to detecting a triggering event, mediation from the mediation service (800) may be implemented similarly to the implementation of requesting (802), in response to the triggering event, mediation on the first storage system (814). However, in this example, the second storage system (824), in response to sending a request (862) to the mediation service, may—contrary to the mediation success of the first storage system (814)—receive a failure message, or some indication that the request (862) for mediation was not successful.

The example method in FIG. 8 continues by (804), in the event that an indication (864) of a positive mediation result is received by the first computer system (814), responsive to the indication (864) of the positive mediation result from the mediation service (800), the first computer system (814)—instead of the second storage system (824)—processing (804) data storage requests directed to a dataset (426) that is synchronously replicated across the first storage system (814) and the second storage system (824). Synchronous replication of a dataset (426), which implements a pod (430), in addition to receiving and processing data storage requests directed to a dataset (426) may be implemented as described with reference to FIGS. 8A and 8B of U.S. Provisional Applications 62/470,172 and 62/518,071, which are incorporated herein in their entirety. In this example, as described earlier with reference to FIG. 8, responsive to an indication (864) of a positive mediation result, the first storage system (814) may be considered the storage system that wins mediation, and the first storage system (814) may detach the storage system with which communication was lost. However, in other examples, mediation may be implemented according to any of the other described methods of mediation, or combinations of methods of mediation.

In some examples, defining a preference for which storage system among a plurality of storage systems synchronously replicating a dataset (426) is to win mediation may be implemented by specifying a delay value for each of the plurality of storage systems. For example, if a first storage system (814) is designated as a preferred storage system, then the first storage system (814) may be assigned a delay value of zero (0) before making a request for mediation from the mediation service. However, for non-preferred storage systems, a delay value may be assigned to be greater than zero, such as 3 seconds, or some other value that would generally result in the preferred storage system winning mediation simply due to a loss of communications between synchronously replicated storage systems.

For a further explanation of mediation solutions, the following examples extend the techniques for implementing mediation described within U.S. Application Ser. Nos.

62/470,172 and 62/518,071, which are incorporated herein in their entirety, including but not limited to, implementations regarding "pods" for a representation of a particular dataset synchronously replicated between some number of storage systems, "membership" as a term for the storage systems that nominally hold synchronous replicas of a particular pod, "in-sync" for a member's copy of a dataset that is considered up-to-data with respect to a pod's dataset, and "online" for a storage system that is ready for actively serving the contents of a pod.

As described in the above-referenced applications, a storage system may implement a set of models for discovering and responding to faults within and between the storage systems that are synchronously replicating data—where such an implementation may ensure that split-brain operation does not occur, which may render a synchronously replicated data set vulnerable to data corruption. Further, the embodiments in the above-referenced applications describe implementations that include: defining preferences; mediation; quorum policies; how subsets of storage systems being associated with a pod may delay or not automatically trigger mediation in order to code soft preferences; models for updating mediators; altering preferences; and switching from quorum models to preference models or mediation models as storage systems fail incrementally. As described below, one or more of these implementations may serve as a basis for additional implementations.

In some implementations, a storage system may make adjustments in response to unavailable mediators. For example, a storage system implementing a pod that is configured to use mediation to respond to faults should agree on a mediation service and agree on a set of mediation parameters to be used for mediation—such as the key that will be used when performing mediation. Further, a mediation service and the mediation parameters may be altered such as through use of a model that transitions through intermediate steps that make use of both an earlier and a subsequent mediator service and parameters prior to transitioning to use of a single, subsequent mediation service and mediation parameters. In some implementations, these example alterations may be performed safely through to completion by a storage system without the storage system communicating with a mediation service given that at least some of the storage systems are able to communicate with each other. For example, if one or more storage systems that are configured for mediation stop communicating, such as due to a storage system fault or network fault, then mediation—possibly including use of multiple mediator services or mediation parameters—may be used to proceed further unless communication is restored.

In some implementations, if a mediator service is unavailable at the time of a network or storage system fault, then operation of a pod may fail or may pause until the mediator service becomes available again or until the network or storage system fault is repaired or communication is otherwise restored. In some examples, for an individual storage system case, pod failure may depend on failure of both a storage system within the pod and of the mediator service (or at least of access to the mediator service)—this may be considered a low-probability, double-failure event. However, if there are a large number of storage systems and a large number of pods, where those pods use the same mediator service, then a probability of a mediator service failure leading to a failure of at least one pod increases substantially. In such an example, this issue of increased probability of failure may be solved using the capability for run-time switching of mediator services by mediation-enabled storage systems for a pod by storage systems in the pod monitoring their ability to communicate with various mediator services, and switching mediator services for the pod if any issues arise, where a goal may be to complete a switch before any issue arises that may require mediation and while the online storage systems for a pod are still communicating with each other. In some examples, switching to a new mediator service may be performed quickly; if, for example, mediator service access is checked periodically or responsive to a monitoring event—where an example period may be once every 30 seconds and where a monitoring event may include a change in network status—the mediator service may be switched responsive to one or more failed health checks or to one or more monitoring events. Continuing with this example, responsive to a negative periodic check and/or a monitoring event, then any pods using the particular mediator service may switch to an alternative solution for mediation, where the switch may in some examples occur within about one minute of a mediator service becoming unavailable or unreachable. In this examples, such monitoring or responsiveness to monitoring events may greatly reduce the window of vulnerability for any of pod failing due to a dual failure that includes a mediator service failure.

In some implementations, mediator services may be implemented on physical servers or virtual servers, where a given mediator service may be internally clustered or may be distributed for high availability with multiple network addresses. In other cases, a mediator service may be a simple, one-node service that does not use any internal form of high availability. In some examples, mediator services may also be implemented within a public cloud, such as Amazon Web Services™, Microsoft Azure™, Alibaba-Cloud™, among others, or a mediator service may be implemented in vendor-provided and managed data centers. In other examples, a mediator service may be implemented using a database service to store keys using atomic primitives such as an exclusive create or atomic compare and swap.

In some implementations, a particular mediator service may be described according to a mediator type, method of access, or types of mediator primitives offered, in addition to being described according to how a determination is made for naming and accessing a mediator service over a network. For example, a mediator service may provide a list of Internet Protocol addresses, one or more names that may be looked up using DNS, or a service name that may be looked up in other types of directories or using other directory services. Further, some existing web storage or database services that are provided by cloud services may directly implement mediator services based on providing operations such as conditional PUT requests, such as conditional PUT requests in Amazon™ S3 or some conditional database operations such as those provided by DynamoDB™. In these cloud services examples, the naming may be a bucket or database name associated with a customer account.

In some implementations, a set of storage systems or pods may be configured with a set of possible mediator services. In some examples, alternatively, or additionally, storage systems, or pods, may be configured to use intermediate mediator service brokers that may provide lists of possible mediator services, where those lists may also change over time—for example, a list may be updated to include new mediator services, or to remove or replace mediator services that may be obsolete or that may be scheduled for servicing or to be taken offline. As an example, a vendor may provide a mediator broker service that may provide storage systems with sets of public cloud-based mediator services that are scattered around and between different availability zones, such as those provided by AWS™, scattered around and between different geographic regions, or even scattered between multiple different cloud service providers. Further, a vendor may add a set of mediator services running on their own infrastructure in addition to mediator services provided through public cloud services. In some examples, as an alternative, a local IT service or department may deploy both storage systems implementing synchronously replicated data and also local mediator services, such as a local mediator service operating in a local virtual machine, where the local mediator services may be installed at a variety of locations that are managed by the local IT service or department. Further, in some examples, combinations of environments may be used in implementing mediator services, such as where a local mediator service may serve a local storage system that is synchronously replicating data, where local mediation is provide instead of a cloud-based mediator service—where a local mediator service may be integrated with a vendor- or cloud-operated service to provide links to local mediator service instances back to local storage systems from the vendor- or cloud-operated service in order to avoid needing to configure all storage systems to communicate with a local broker.

In some implementations, storage systems configured to use mediation must agree on which mediator service to use, agree on what events or circumstances are to occur prior to mediation, and agree on mediation parameters when invoking a mediator service. Further, during a change in mediator service or mediation parameters for a storage system pod, there may be a discrepancy in mediator configuration between storage systems implementing a pod; however, such differences may be transitional or temporary.

In some implementations, a list of mediator services, such as the list described above, may be coupled with a list of proposed mediator services that are determined by mediator service brokers, where the resulting list may form a list of potential mediator services that a storage system, or pod, may choose among. For example, if a pod is stretched to include a second or subsequent storage system that is configured for mediation for the pod, then one of those mediation services, and any necessary mediation parameters, may be chosen and communicated between those mediation-enabled storage systems. In this example, a mediator service should be usable from all of those storage systems, and if the storage systems are unable to agree on a common usable mediator service, then a stretch operation might fail or might be delayed until conditions change and the storage systems are able to agree or reach a consensus.

In some implementations, on an ongoing basis, online mediation-enabled storage systems for a pod may monitor a currently chosen mediator service and potential alternatives. For example, on a periodic or aperiodic basis, one or more storage systems may monitor one or more of the available mediator services to determine if a mediator service is unavailable or unreliable. In this example, a given mediator service from among multiple mediator services may be determined to be unavailable if one or more attempts to communicate with the given mediator service are not successful. Further, in this example, a given mediator service from among multiple mediator services may be considered unreliable if it has been unavailable over some previous window of time even if the given mediator service is available at a current point in time—particularly if it has been found unavailable but becomes available and then unavailable again several times over some recent period of time. In some examples, a mediator service may also be considered unreliable if it responds unusually slowly to monitor requests. Similarly, a mediator service previously determined to be unreliable may be upgraded to being reliable if it responds quickly or reliably over a subsequent window of time.

In some implementations, mediator service monitoring could also result in alerts which could notify an administrator or user, notify the public cloud provider, or notify the vendor so the mediator service can be repaired or the mediator service broker's mediator service list can be adjusted to include more reliable alternatives.

In some implementations, mediator service parameters and characteristics may be used by a storage system pod as a basis for choosing a mediator service from among multiple available mediator services. For example, if locations of pod member storage systems and locations of mediator services are known (such as because locations are detected through network analysis or because location is explicitly configured), then this information can also be used for mediator service selection. For example, if a locally deployed synchronously replicated storage system operates across multiple data centers, and if the storage systems are marked by a given data center, and the mediators are marked by data center (or if marked storage systems can serve as mediators), then a pod stretched between two or more of the multiple data centers may automatically use a mediator service (or a storage system as a mediator) from a data center other than any one of the data centers that the pod is stretched to.

In some implementations, as mentioned above, mediation-enabled storage systems for a pod can monitor and evaluate a current mediation service for availability or reliability. For example, a service may be determined to be available if it is reachable and responds to monitor requests. Further, in this example, health or status of a mediator service may be monitored by other storage systems or other tools, where the health or status may be communicated to storage systems as part of a selection criterion. In this way, with a cloud- or vendor-hosted mediator monitoring service, any storage systems or monitoring service could track health or status results for any mediator service from among a list of available mediator services. In some examples, some other service, perhaps integrated with a mediator service broker, could accumulate and provide health or status information on request or could otherwise update storage systems and pods so that storage systems can be made aware of any issues with a given mediator service. Such a monitoring service is not critical to performing actual mediation, so this health or status data can be distributed in ways to make it widely available, as long as it is reasonably up-to-date and does not report results that are excessively incorrect or otherwise incorrect beyond a given error tolerance.

In some implementations, a storage system that is synchronously replicating data may implement multiple different mediator preferences. For example, given a list of mediator services to choose from, a set of storage systems can determine whether some mediator services are in some way better than others, or they can rule out some mediator services altogether. Further, in some examples, mediator service preferences could also be defined for a storage system pod or for storage systems, or for a particular IT department or customer explicitly through some mechanism such as setting a value that can be sorted for preference, or by tagging mediator services as preferential for a particular purpose, or for some storage systems or pods.

In some implementations, with regard to mediator parameters, mediator service location is one useful parameter, as noted previously. For example, if the mediator service location is known, and the location of a storage system is known, then the location of the mediator service can be chosen based on a relative location of a given storage system and mediator service—where a nearer, or more quickly accessible, mediator service may be preferred over mediator services farther away. Further, in some examples, if storage systems are added to a pod, mediator service location can be reevaluated with respect to the added storage systems. In other examples, information regarding a data center may be another parameter, where if a pod includes two mediation-enabled storage systems, and those two storage systems are in separate data centers, then a mediator service may be selected which is in a third data center. In other words, a mediator service may be selected based on being implemented in a data center that is independent of the one or more data centers implementing a storage system pod to ensure greater reliability and/or availability of the mediator service in the event that the one or more data centers implementing the storage system pod is undergoing network faults, power failures, or some other type of data center fault. However, in other cases, if multiple mediation-enabled storage systems for a pod are in the same data center, then a mediator service may be selected within the same data center, but where network layout relative to the mediator service and storage systems may be considered; for example, a mediator service may be selected such that a communication failure between the storage systems is unlikely to coincide with a communication failure between all mediation-enabled storage systems and the selected mediator service.

In some implementations, such as in the case of cloud- or vendor-provided mediator services, geography can either be tagged, or networks can be probed for response time, network hops, or network address ranges. A cloud or vendor provided mediator service may provide geographic location information without much overhead. However, in the case of a local storage system implementation for synchronously replicating data, geographic information may be inferred from network information, such as IP addresses or geolocation among other methods. Further, synchronous replication is not generally implemented over very long distances, therefore storage systems that are members of a pod may typically be within one geography and are connectable with similar latency and network hop counts to typical cloud- or vendor-provided mediator services within that geography.

In some implementations, as discussed above, there may be multiple aspects to location information. For example, data center information, network layout information within one data center, power and cooling zone information within a data center, civil infrastructure power grid information, data center complex information, urban area descriptions, administrative zone information, controlling government entity information, among other information—where mediator services and storage systems may be tagged with any set or subset of these and other types of location information. Further, in some examples, any number of these various aspects of location information may be taken into account simultaneously, such that if mediation-enabled storage systems for a pod appear to be separated from each other by some particular parameter, a mediator service may be chosen to be independent with respect to that particular parameter from each of the mediation-enabled storage systems. In some cases, aspects of location information may be prioritized. For example, two storage systems may be in distinct administrative zones, but there may not be a third administrative zone, even though there is a third power grid.

In some implementations, with regard to mediator parameters, health history and scheduled downtime may be considered as bases for selecting a mediator service. For example, if planned downtime for a computing environment that implements a mediator service may be scheduled in advance, then a storage system implementing a pod may have time to switch to a mediator different from the mediator service scheduled for downtime prior to the downtime where the storage system may switch back subsequent to the scheduled downtime, or the storage system may remain with the switched-to mediator service until another event prompts another switch.

In some implementations, a factor for selecting a mediator service may be based on an entity serving as a host for the mediator service. For example, locally, an IT department may prefer locally implemented mediator services, but may accept using a cloud- or vendor-provided mediator service if a suitable local mediator service is not available or is being taken offline, such as for maintenance, or if a suitable third location is not yet configured. Further, in some examples, a vendor may prefer that customers for the vendor use a public cloud-based mediator service, but may let customers use back-end, vendor-hosted mediator services during public cloud outages or for improving mediation response time (such as because a cloud service is under a denial-of-service attack or doesn't have data centers operating in a geography, such as China or Antarctica).

In some implementations, given a list of available and configured mediator services, from whatever sources (explicit configuration, mediator service brokers, etc.), some mediator services may be eliminated from consideration to serve as mediators based on not matching or meeting specified requirements (e.g., mediation-enabled storage systems for a pod are in separate data centers, but a particular mediator service is in one of those data centers), or based on being scheduled for downtime. In some examples, other mediator services can be sorted for priority based on one or more of: health or health history, suitability according to one or more preferences or requirements, scheduled maintenance, geography, network hops to reach a given mediator service, network latency to the mediator service, network subnets, among others.

In some implementations, with regard to selecting a mediator service, a current list of potential mediator services may be evaluated and the most suitable mediator service that matches one or more requirements may be selected, or selection could match the most number of high priority requirements. As mentioned previously, a list of potential mediator services can be re-evaluated from time-to-time or responsive to events corresponding to changes in mediator service status or the addition of more available mediator services.

In some implementations, future mediation may only be necessary for a pod where there is currently more than one active online mediation-enabled storage system. In some examples, prior (perhaps mediated) faults may have already resulted in some storage systems becoming offline for a pod. In such an example, until one of those storage systems comes back online, how the offline storage systems might relate to a particular mediator service may not matter. Further, in this example, in order for a storage system to come back online for a pod and resume being mediation enabled, the storage system that had been offline for the pod may first be required to ensure that it has reliable access to a suitable mediator service that is shared among the storage systems, and where the mediator service is reliably accessible from the existing online mediation-enabled storage system for the pod. In this example, this may result in the existing online mediation-enabled storage systems switching to a new mediator as part of bringing the additional mediation-enabled storage system back online. In some examples, a degenerate case is where a fault or a sequence of faults resulted in exactly one mediator-enabled storage system for a pod remaining online, in which case mediation is no longer necessary until another mediator-enabled storage system comes back online.

In some implementations, where a storage system is not configured to use a mediator service, the storage system may remain online and continue to synchronously replicate data for a pod, or may rejoin a pod after coming back online after being offline—where the storage systems remain online and in-sync based on being able to communicate with other storage systems. However, in this example, if storage systems are unable to communicate with each other, a storage system may remain offline until a communication link is re-established. Further, in this example where a mediator service is not available or where a storage system is not configured to use a mediator service, the storage system may implement one or more quorum protocols, as discussed previously. Further, in this example, additional storage systems that are not current members of a pod may be added to extend the set of storage systems that participate in the one or more quorum protocols.

In some implementations, a storage system may switch to alternative models in response to mediator reliability changes or mediator availability changes. In this example, a storage system may switch to an alternate mediator service in response to a first mediator service becoming unavailable or unreliable—which is one response among other possible responses. For example, another response to a mediator service becoming unavailable or unreliable is to switch cluster availability models. Continuing with this examples, other availability models were suggested in the earlier referenced applications, including quorum models and preference models. In some cases, a particularly applicable alternative model is a preference model because an efficient response to appropriate mediator services becoming unavailable is for storage systems for a pod to agree on a preferred storage system that will remain online for a pod if a later fault prevents storage systems for the pod from communicating. In this example, as long as this transition to a preference model is reliably and sufficiently communicated prior to a fault that would otherwise have been mediated, the preference model can operate safely. As a more specific example, for a pod with two mediation-enabled storage systems, if the mediator service is found to be unavailable or unreliable one of those two storage systems can be chosen, and if the two storage systems subsequently stop communicating, then the preferred storage system may remain online for the maintaining or servicing the pod (given that the preferred storage system is operating properly) and the other, non-preferred, storage system may go offline for the pod (whether or not it is operating properly and whether or not the other storage system is running properly). Concluding this example, this situation can be re-evaluated until continued monitoring of mediator services indicates that a suitable, available, and sufficiently reliable mediator service can again be selected for the storage system.

In some implementations, if there are more than two mediation-enabled storage systems implementing a pod, and at least two of the storage systems can still reliably access a common mediator service, but one or more cannot, then the inability of the additional storage systems to reliably access the mediator service might not have to result in switching to a preference model or other model because mediating only between those two might be considered sufficiently reliable and better than switching to preference model. Continuing with this example, even in the case of only one mediation-enabled storage system for a pod being able to access a mediator service, mediation could be left in place instead of switching to a preference model, which essentially means that if there is a failure, only the storage system in communication with the mediator service may take over unless and until the situation is remedied. In this example, the storage system in communication with the mediator service taking over may be preferable, where even after complete unavailability of any suitable mediator service results in a pod switching to a preferred storage system, the pod may switch back to a mediation model after at least one storage system reliably accesses a mediator service instead of waiting for multiple storage systems or all storage systems. In this example, only one storage system being able to mediate is not worse than a preference model given that the mediator service remains available and allows for another storage system to win mediation if the situation is repaired—even in the case of all storage systems going down and some coming back up with repaired mediator service connections.

In some implementations, in response to the currently active and online mediation-enabled storage system for a pod detecting that some or all previous reliably available and suitable mediator services for the pod are no longer reliable or available, and in response to choosing to switch to a preference fault handling model, at least until the condition partially or completely recovers, the storage system for the pod may use a variety of models for deciding whether preference should be assigned to one storage system or another storage system for the pod. In some cases, different models may be selected based on one or more factors corresponding to: host connectivity, host locations, current load, network paths or latency between hosts and individual storage controllers or network adaptors on individual storage systems within the pod, among other. In other cases, a fallback preference can be explicitly configured, or it can track available information about applications and services running on hosts and their ability to adapt to loss of access to one storage system or another.

Further, in some examples, responsive to switching from mediated availability to preferred availability, the change can be communicated to a host-side device, application, or data center management infrastructure that may result in some applications or services being moved around to match the new storage system preferences. In other cases, some applications or services could be configured so that when they have access issues, they will also switch themselves to the locations or access paths associated with the preferred storage system for the pod. In this way, in this example, this bi-directional communication with other applications and services that depend on storing data can be beneficial to the handling those applications and services.

In some implementations, a storage system for a pod may implement various techniques for managing disaster recovery. For example, a model for configuring hosts, applications, and storage systems for disaster recovery is to have a set of storage systems and servers that run together for a set of applications and services in a first location, but where procedures are in place to bring up storage systems, applications, and services together in a second location when there is a sufficiently catastrophic fault that the first location can no longer serve critical applications and services (floods, extended power grid failure, and terrorism are commonly cited examples, but more common ones are human error and network isolation). In some implementations, a technique for handling this situation is to depend on some higher-level monitoring and high-availability service to migrate storage accessibility from the first location to the second location together with applications and services, and to do all of the migration in response to the higher-level monitoring and high-availability service determining that such a migration is necessary. In some environments, this change may be triggered by human intervention via a control interface instead of automatically.

In some implementations, storage is a particularly critical aspect of access migration because storage is particularly subject to becoming corrupt or unrecoverable if services are accidentally running in two locations. One example for handling services running in two locations with less danger of corruption is to use snapshots in response to higher level service triggering migrating storage access to a second location. In this model, a storage system at the second location for a pod might be configured such that it will not mediate, participate in quorum, or prefer itself to take over the pod. In this example, if a pod includes only two storage systems, where one storage system is at a first location and another storage system is at a second location, then the first location may be preferred. Continuing with this example, the first location (or a first location and some third location) might otherwise comprise multiple storage systems for the pod, which may be configured to mediate or use quorum between them (or might prefer a subset of those storage systems), but storage systems at the second location would not participate in a quorum, and would become offline in case of faults that prevent the storage systems at the second location from communicating with other online, in-sync storage systems for the pod.

Continuing with this example, in this model, storage takeover in the second data center might involve making a logical copy of any pods to form new pods, where the new pods and storage entities (volumes, file systems, object stores, etc.) have sufficiently different identities that the logical copy of each such pod is not confused by hosts, applications, or services with any such storage entities and pods that might still be running in the first (or other) location (or locations). Further, example models for copying a pod, including logically copying a pod on a storage system that is currently offline for the pod, are included within U.S. Patent Application No. 62/518,071, which is incorporated herein in its entirety.

In some examples, if a network fault or communication failure recovers, then if the original pod can come back online for the storage systems among the first and second locations, then at that time, the logical copy of the pod can be logically copied back to the original pod as part of a coordinated fail-back operation which first ensures that affected hosts, applications, and services are offline in the first location (and other locations) before logically copying back the pod. In this example, this may, for example, make temporary use of asynchronous or periodic replication, or may use models such as synchronous replication resync methods to bring the original pod up-to-date prior to failing back the hosts, applications, and services to the first location (and possibly other locations). Further, in this example, prior to logically copying back to the original pod, a snapshot might be taken of that pod to ensure that updates are not lost.

Continuing with this example, logical copies of pods in a second location may also be used for testing, such as part of a procedure to ensure that all of a critical dataset is properly replicated to the second location, or for other uses of a logical copy of a data set such as running reports or for using copies of production data for development or research purposes that are logically isolated from production locations. Further, in some cases, identities that might have to be changed as part of making and presenting a suitable copy of a pod can include fibre channel identifiers, network addresses, iSCSI IQNs, SCSI serial numbers, volume identifiers, pod identifiers, file system unique identifiers, file system export names, or object pool/bucket identifiers. In some cases, names can be kept the same even as underlying identifiers are changed (which can be enough to ensure, say, that a multipathing disk driver will not be confused). In other cases, names might be changed as well, such as because takeover scripts and procedures are written to use new names for storage-related entities as part of performing a takeover.

In some implementations, a storage system may apply different models to pod-spanning consistency groups. For example, in some cases, a consistent dataset may comprise more than one pod, or might span pods that operate on distinct or overlapping sets of storage systems. In this example, if properly maintaining a data set that spans pods should take location into account when preserving access to storage systems as part of fault handling, such as because a set of application components and services store data to more than one storage system within each location for a set of pods, then some technique may be required to ensure that automated online/offline decisions are location consistent for multiple pods as well as for multiple storage systems for those multiple pods. In such cases, storage systems in one location may coordinate mediation, choices of mediator servers, quorum handling, or any switching from mediation to fault preference.

Continuing with this example, in one case, a first set of storage systems $S_1$, $S_2$, and $S_3$ at a first location $L_1$ might be members of pods $P_1$, $P_2$, and $P_3$, respectively, with a second set of storage systems $S'_1$, $S'_2$, and $S'_3$ at a second location $L_2$ also being members of pods $P_1$, $P_2$, and $P_3$, respectively. In this example, a set of applications and services currently running on hosts in location $L_1$ might expect to be migrated as a group to hosts in $L_2$ if a fault makes that necessary. In such cases, the location of storage systems that remain online for all three pods due to a sequence of faults may need to be consistent between all three pods. For example, in the case of a network fault that disrupts communication between locations $L_1$ and $L_2$, all three pods must switch to either $S_1$, $S_2$, and $S_3$ at location $L_1$, or to $S'_1$, $S'_2$, and $S'_3$ at location $L_2$, and cannot otherwise mix their results. Further, if one storage system at the first location, say $S_1$ at location $L_1$, faults, then all three pods can remain online at location $L_2$, but if there is a second fault involving a storage system at the second location, say $S'_3$, then all three pods may have to go offline at both locations until the situation is repaired because neither location has a complete dataset. Implementations might support $S_2$, and $S_3$ either going offline or remaining online after only $S_1$ faults in the previous example.

Further, in the case of preference models, the preferred storage systems for all three pods can be configured identically, for example with each pod preferring the storage systems in the first location. This solution may work as long as faulting of a first storage system in the second location is not expected to result in the second and third storage systems in the second location to also go offline.

In some implementations, mediation or quorum models may be more complicated. For example, in the case of mediation or quorum models, pods may be unable to make decisions separately from each other if those separate decisions may result in different outcomes. In general, it is not by itself enough for pods to merely share the same mediator service or the same quorum configuration. In the case of a mediator service, it is possible that a key and a first value could be shared between storage systems at the first location, while the same key and a distinct second value could be shared between storage systems at the second location, such that a first storage system mediating successfully on a failure may ensure that only other storage systems at the same location could succeed because they mediate using the same key and value. However, reliably switching mediators is more complicated in such a model, and after one successful use of mediation within one pod, subsequent uses of mediation to handle subsequent faults requires a new key/value combination (depending on the mediation model), which would then have to be exchanged again.

In some implementations, as an alternative to the previous example, storage systems for stretched pods in a first location may agree on a single storage system to engage in mediation or to engage in quorum protocols for those storage systems in that first location, where those storage systems are expected to handle faults consistently for the stretched pods. Further, in this example, storage systems at other locations could likewise agree on a particular one of their storage systems to engage in mediation or to engage in quorum protocols on behalf of those other locations.

In some implementations, storage systems at a location could use any of several techniques for coordinating which storage system will mediate or engage in quorum protocols, where in some cases, a storage system may be assigned to do this. For example, storage systems could vote between themselves. In other examples, storage systems within a location may use mediation between themselves to a mediator service running within the location or through a cloud service or vendor provided service to determine who can mediate on behalf of the location. In general, any model that can arrive at a single, agreed upon storage system to be used at any one time may work. In some cases, a protocol for changing mediators is an example of a model that could be used for adjusting to such changes.

Generally, a computing device other than a storage system may engage in mediation or a quorum protocol on behalf of storage systems at a location that should operate consistently together. In some examples, instead, there could be a service running somewhere at a location that handles consistent multi-location coordination for that location. In this way, in this example, storage systems that rely on coordinated consistency related to a shared location on behalf of a set of pods may be registered to coordinate through that service. In this example, the service may use high availability protocols, or mediation or quorum within the location to manage itself, and the service could also use a reliable distributed agreement model at the time of mediation or quorum exchange, such as through using a PAXOS or RAFT-based model within the location. In some cases, this process could make use of a sufficiently reliable cluster shared file system running within the location.

Figure 9:
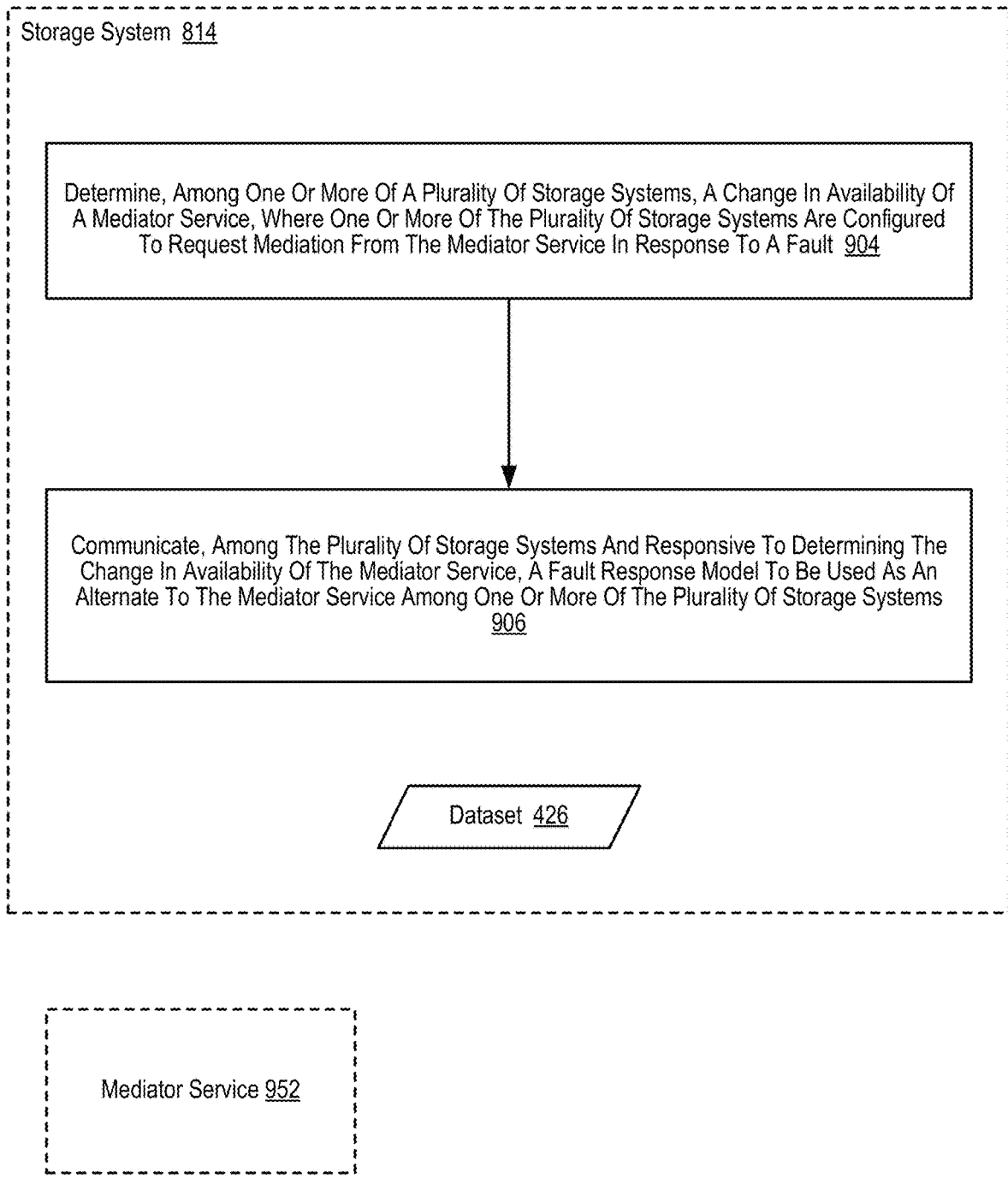
FIG. 9 sets forth a flow chart illustrating an example method of switching between fault response models within a storage system synchronously replicating data according to some embodiments of the present disclosure.

For further explanation, FIG. 9 sets forth a flow chart illustrating steps for a storage system to switch between different fault response models according to some embodiments of the present disclosure. Although depicted in less detail, the storage system (814) depicted in FIG. 9 may be similar to the storage systems described above with reference to FIGS. 1A-1D, FIGS. 2A-2G, FIGS. 3A-3B, and FIGS. 4-8, or any combination thereof. In fact, the storage systems (814) depicted in FIG. 9 may include the same, fewer, or additional components as the storage systems described above.

In the example method depicted in FIG. 9, in an initial state, a storage system (814) may have one or more communication links that are operational between one or more storage systems and between a mediator service (952), where at least some of the storage systems are configured to request mediation from a mediator service (952). In other words, as discussed above, in some examples, some, but not all, of the storage systems that are synchronously replicating a dataset are mediation enabled.

The example method depicted in FIG. 9 includes determining (904), among one or more of a plurality of storage systems, a change in availability of the mediator service (952), where one or more of the plurality of storage systems are configured to request mediation from the mediator service in response to a fault. Determining (904), among the one or more of the plurality of storage systems, the change in availability of the mediator service (952) may be implemented as described above with regard to different techniques for determining when a mediator service is no longer responding, is no longer reachable, or has begun to respond outside of a threshold response time.

The example method depicted in FIG. 9 also includes communicating (906), among the plurality of storage systems and responsive to determining the change in availability of the mediator service (952), a fault response model to be used as an alternate to the mediator service (952) among the one or more of the plurality of storage systems. Communicating (906), among the plurality of storage systems and responsive to determining the change in availability of the mediator service (952), the fault response model to be used as an alternate to the mediator service (952) among the one or more of the plurality of storage systems may be implemented as described above with regard to different techniques for switching from a fault response model that is based on a mediator service to a fault response model that is established among one or more of the storage systems that are synchronously replicating data.

In this way, in the event that a mediator service (952) that is currently an agreed-upon mediator service becomes unreliable to mediate between the storage systems, a storage system may switch to an alternate mediation model before the current mediator service (952) completely fails instead of simply becoming less reliable. In other words, in some examples, if a mediator completely fails or becomes less reliable, and given that the storage systems are in communication with each other, then the storage systems may coordinate either a change of mediator service or a change to a different fault response model—where given that this change is coordinated prior to a failure of a storage system or network interconnect between storage systems, the pod may continue to be available without any interruptions. In short, in some examples, in anticipation of a failure, the storage systems implementing a pod may pre-emptively switch between fault response models before a fault to avoid pod unavailability.

Figure 10:
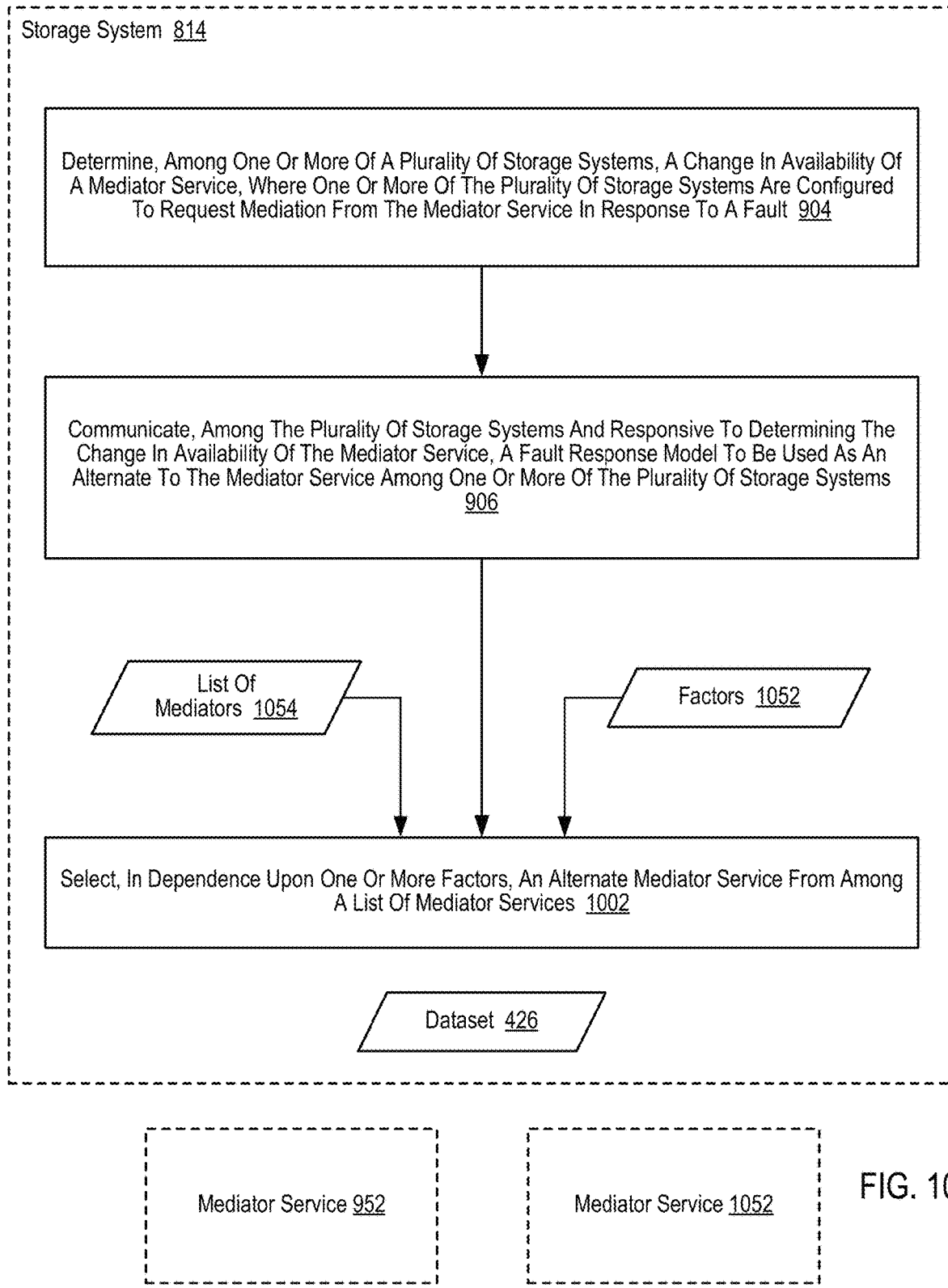
FIG. 10 sets forth a flow chart illustrating an example method of switching between fault response models within a storage system synchronously replicating data according to some embodiments of the present disclosure.

For further explanation, FIG. 10 sets forth a flow chart illustrating steps for a storage system to switch between different fault response models according to some embodiments of the present disclosure. Although depicted in less detail, the storage system (814) depicted in FIG. 10 may be similar to the storage systems described above with reference to FIGS. 1A-1D, FIGS. 2A-2G, FIGS. 3A-3B, and FIGS. 4-8, or any combination thereof. In fact, the storage systems (814) depicted in FIG. 9 may include the same, fewer, additional components as the storage systems described above.

The flow chart depicted in FIG. 10 is similar to the flow chart depicted in FIG. 9 in that the flow chart depicted in FIG. 10 includes: determining (904), among one or more of a plurality of storage systems, a change in availability of the mediator service (952), where one or more of the plurality of storage systems are configured to request mediation from the mediator service in response to a fault; and communicating (906), among the plurality of storage systems and responsive to determining the change in availability of the mediator service (952), a fault response model to be used as an alternate to the mediator service (952) among the one or more of the plurality of storage systems.

However, the flow chart depicted in FIG. 10—which depicts an example where the alternate fault response model is an alternate mediator service—also includes selecting (1002), in dependence upon one or more factors (1052), the alternate mediator service (1052) from among a list of mediator services (1054). Selecting (1002), in dependence upon one or more factors (1052), the alternate mediator service (1052) from among the list of mediator services (1054) may be implemented above as discussed with respect to selecting alternate mediator services from among a list of mediators. Further, as discussed above in greater detail, the one or more factors may include one or more of: geographic proximity, reliability information, network hops to reach a given mediator service, communication response time, availability zone, pre-defined priority information, administrative zone information, data center complex information, data center information, network layout between the storage system and a given mediator service, urban area description of the mediator service implementation, or power grid information powering a given mediator service.

Figure 11:
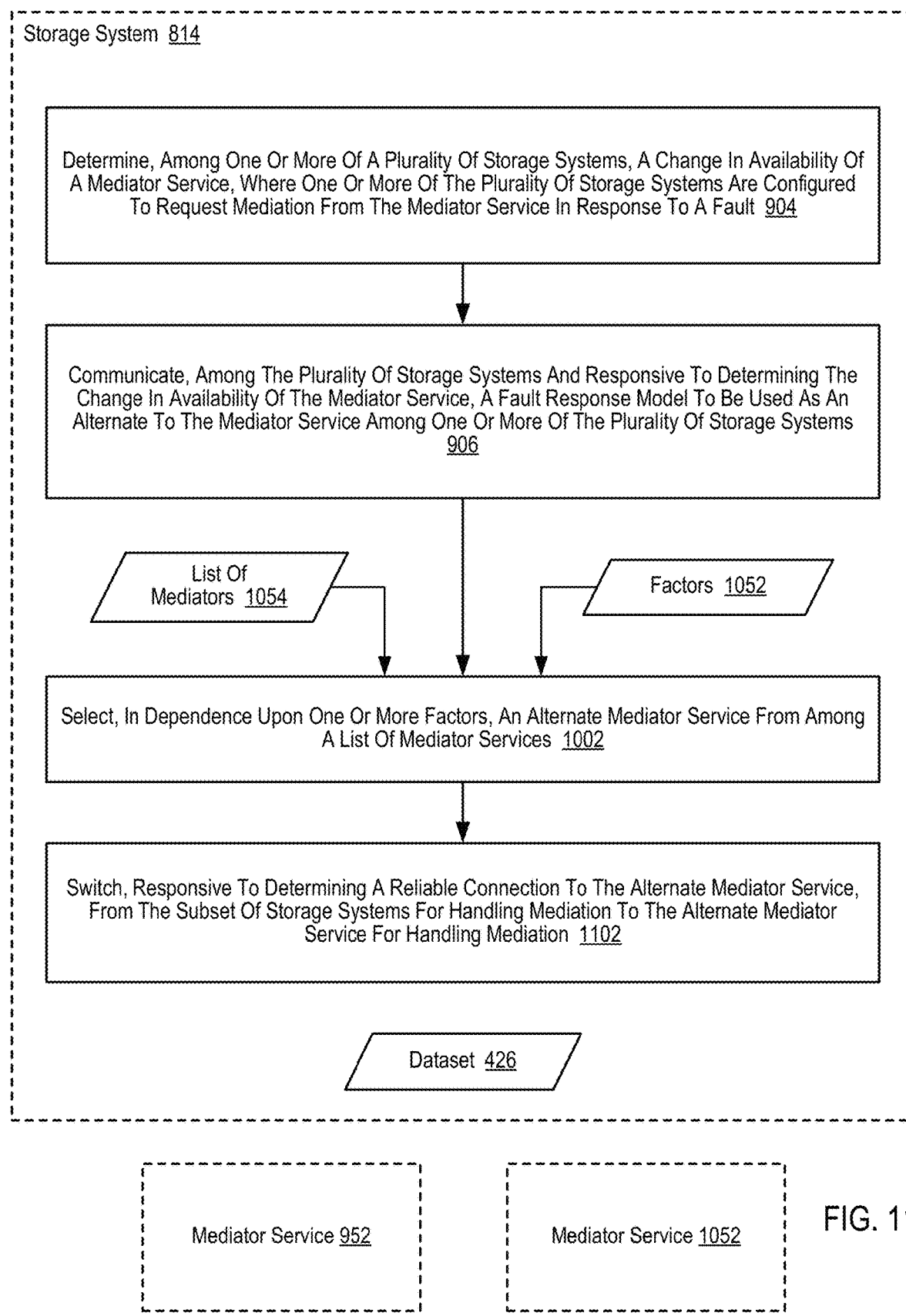
FIG. 11 sets forth a flow chart illustrating an example method of switching between fault response models within a storage system synchronously replicating data according to some embodiments of the present disclosure.

For further explanation, FIG. 11 sets forth a flow chart illustrating steps for a storage system to switch between different mediation models according to some embodiments of the present disclosure. Although depicted in less detail, the storage system (814) depicted in FIG. 10 may be similar to the storage systems described above with reference to FIGS. 1A-1D, FIGS. 2A-2G, FIGS. 3A-3B, and FIGS. 4-8, or any combination thereof. In fact, the storage systems (814) depicted in FIG. 9 may include the same, fewer, additional components as the storage systems described above.

The flow chart depicted in FIG. 11 is similar to the flow chart depicted in FIG. 10 in that the flow chart depicted in FIG. 11 includes: determining (904), among one or more of a plurality of storage systems, a change in availability of the mediator service (952), where one or more of the plurality of storage systems are configured to request mediation from the mediator service in response to a fault; and communicating (906), among the plurality of storage systems and responsive to determining the change in availability of the mediator service (952), a fault response model to be used as an alternate to the mediator service (952) among the one or more of the plurality of storage systems and selecting (1002), in dependence upon one or more factors (1052), an alternate mediator service (1052) from among a list of mediator services (1054).

However, the flow chart depicted in FIG. 11 also includes switching (1102), responsive to determining a reliable connection to the alternate mediator service (1052), from the subset of storage systems for handling mediation to the alternate mediator service (1052) for handling mediation. Switching (1102), responsive to determining a reliable connection to the alternate mediator service (1052), from the subset of storage systems for handling mediation to the alternate mediator service (1052) for handling mediation may be implemented above as discussed above with respect to switching to an alternate mediator service.

Readers will appreciate that the methods described above may be carried out by any combination of storage systems described above. Furthermore, any of the storage systems described above may also pair with storage that is offered by a cloud services provider such as, for example, Amazon™ Web Services ('AWS'), Google™ Cloud Platform, Microsoft™ Azure, or others. In such an example, members of a particular pod may therefore include one of the storage systems described above as well as a logical representation of a storage system that consists of storage that is offered by a cloud services provider. Likewise, the members of a particular pod may consist exclusively of logical representations of storage systems that consist of storage that is offered by a cloud services provider. For example, a first member of a pod may be a logical representation of a storage system that consists of storage in a first AWS availability zone while a second member of the pod may be a logical representation of a storage system that consists of storage in a second AWS availability zone.

To facilitate the ability to synchronously replicate a dataset (or other managed objects such as virtual machines) to storage systems that consist of storage that is offered by a cloud services provider, and perform all other functions described in the present application, software modules that carry out various storage system functions may be executed on processing resources that are provided by a cloud services provider. Such software modules may execute, for example, on one or more virtual machines that are supported by the cloud services provider such as a block device Amazon™ Machine Image (AMP) instance. Alternatively, such software modules may alternatively execute in a bare metal environment that is provided by a cloud services provider such as an Amazon™ EC2 bare metal instance that has direct access to hardware. In such an embodiment, the Amazon™ EC2 bare metal instance may be paired with dense flash drives to effectively form a storage system. In either implementation, the software modules would ideally be collocated on cloud resources with other traditional datacenter services such as, for example, virtualization software and services offered by VMware™ such as vSAN™. Readers will appreciate that many other implementations are possible and are within the scope of the present disclosure.

Readers will appreciate that in situations where a dataset or other managed object in a pod is retained in an on-premises storage system and the pod is stretched to include a storage system whose resources are offered by a cloud services provider, the dataset or other managed object may be transferred to the storage system whose resources are offered by a cloud services provider as encrypted data. Such data may be encrypted by the on-premises storage system, such that the data that is stored on resources offered by a cloud services provider is encrypted, but without the cloud services provider having the encryption key. In such a way, data stored in the cloud may be more secure as the cloud has no access to the encryption key. Similarly, network encryption could be used when data is originally written to the on-premises storage system, and encrypted data could be transferred to the cloud such that the cloud continues to have no access to the encryption key.

Through the use of storage systems that consist of storage that is offered by a cloud services provider, disaster recovery may be offered as a service. In such an example, datasets, workloads, other managed objects, and so on may reside on an on-premises storage system and may be synchronously replicated to a storage system whose resources are offered by a cloud services provider. If a disaster does occur to the on-premises storage system, the storage system whose resources are offered by a cloud services provider may take over processing of requests directed to the dataset, assist in migrating the dataset to another storage system, and so on. Likewise, the storage system whose resources are offered by a cloud services provider may serve as an on-demand, secondary storage system that may be used during periods of heavy utilization or as otherwise needed. Readers will appreciate that user interfaces or similar mechanisms may be designed that initiate many of the functions described herein, such that enabling disaster recovery as a service may be as simple as performing a single mouse click.

Through the use of storage systems that consist of storage that is offered by a cloud services provider, high availability may also be offered as a service. In such an example, datasets, workloads, other managed objects, that may reside on an on-premises storage system may be synchronously replicated to a storage system whose resources are offered by a cloud services provider. In such an example, because of dedicated network connectivity to a cloud such as AWS Direct Connect, sub-millisecond latency to AWS from variety of locations can be achieved. Applications can therefore run in a stretched cluster mode without massive expenditures upfront and high availability may be achieved without the need for multiple, distinctly located on-premises storage systems to be purchased, maintained, and so on. Readers will appreciate that user interfaces or similar mechanisms may be designed that initiate many of the functions described herein, such that enabling applications may be scaled into the cloud by performing a single mouse click.

Through the use of storage systems that consist of storage that is offered by a cloud services provider, system restores may also be offered as a service. In such an example, point-in-time copies of datasets, managed objects, and other entities that may reside on an on-premises storage system may be synchronously replicated to a storage system whose resources are offered by a cloud services provider. In such an example, if the need arises to restore a storage system back to a particular point-in-time, the point-in-time copies of datasets and other managed objects that are contained on the storage system whose resources are offered by a cloud services provider may be used to restore a storage system.

Through the use of storage systems that consist of resources that are offered by a cloud services provider, data that is stored on an on-premises storage system may be natively piped into the cloud for use by various cloud services. In such an example, the data that is in its native format as it was stored in the on-premises storage system, may be cloned and converted into a format that is usable for various cloud services. For example, data that is in its native format as it was stored in the on-premises storage system may be cloned and converted into a format that is used by Amazon™ Redshift such that data analysis queries may be performed against the data. Likewise, data that is in its native format as it was stored in the on-premises storage system may be cloned and converted into a format that is used by Amazon™ DynamoDB, Amazon™ Aurora, or some other cloud database service. Because such conversions occurs outside of the on-premises storage system, resources within the on-premises storage system may be preserved and retained for use in servicing I/O operations while cloud resources that can be spun-up as needed will be used to perform the data conversion, which may be particularly valuable in embodiments where the on-premises storage system operates as the primary servicer of I/O operations and the storage systems that consist of resources that are offered by a cloud services provider operates as more of a backup storage system. In fact, because managed objects may be synchronized across storage systems, in embodiments where an on-premises storage system was initially responsible for carrying out the steps required in an extract, transform, load ('ETL') pipeline, the components of such a pipeline may be exported to a cloud and run in a cloud environment. Through the use of such techniques, analytics as a service may also be offered, including using point-in-time copies of the dataset (i.e., snapshots) as inputs to analytics services.

Readers will appreciate that applications can run on any of the storage systems described above, and in some embodiments, such applications can run on a primary controller, a secondary controller, or even on both controllers at the same time. Examples of such applications can include applications doing background batched database scans, applications that are doing statistical analysis of run-time data, and so on.

Example embodiments are described largely in the context of a fully functional computer system. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

Embodiments can include be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to some embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
   determining, among one or more of a plurality of storage systems that are configured for synchronous replication of a dataset and use a first fault response model that is based on use of a mediation service that is external to the plurality of storage systems, a change in availability of the mediation service from which the one or more of the plurality of storage systems request mediation in response to a fault; and
   responsive to determining the change in availability of the mediation service, communicating, among the plurality of storage systems, a second fault response model that is different from the first fault response model and is not based on use of the mediation service.

2. The method of claim 1, wherein an alternative to the mediation service specifies that a subset of the plurality of storage systems is designated to remain online and in communication with each other for the synchronously replicated dataset to remain online, wherein if a given storage system not within the subset of storage systems is in communication with the subset of storage systems after a fault, then the given storage system continues to synchronously replicate the dataset.

3. The method of claim 2, wherein the subset of storage systems is selected based on pre-defined preferences.

4. The method of claim 2, further comprising:
selecting, in dependence upon one or more factors, an alternate mediation service from among a list of mediation services.

5. The method of claim 4, further comprising:
switching, responsive to determining a reliable connection to the alternate mediation service, from the subset of storage systems for handling mediation to the alternate mediation service for handling mediation.

6. The method of claim 4, wherein the subset of storage systems are determined based upon tracking information for applications or services operating on a host computing device.

7. The method of claim 1, wherein an alternative to the mediation service is selected based on one or more of: host connectivity, host location, current workload, network paths or network latency between hosts and individual storage systems, storage system hardware characteristics.

8. A storage system comprising a computer processor and a computer memory operatively coupled to the computer processor, the computer memory storing computer program instructions that, when executed by the computer processor, cause the storage system to carry out the steps of:
determining, among one or more of a plurality of storage systems that are configured for synchronous replication of a dataset and use a first fault response model that is based on use of a mediation service that is external to the plurality of storage systems, a change in availability of the mediation service from which the one or more of the plurality of storage systems request mediation in response to a fault; and
responsive to determining the change in availability of the mediation service, communicating, among the plurality of storage systems, a second fault response model that is different from the first fault response model and is not based on use of the mediation service.

9. The storage system of claim 8, wherein an alternative to the mediation service specifies that a subset of the plurality of storage systems is designated to remain online and in communication with each other for the synchronously replicated dataset to remain online, wherein if a given storage system not within the subset of storage systems is in communication with the subset of storage systems after a fault, then the given storage system continues to synchronously replicate the dataset.

10. The storage system of claim 9, wherein the subset of storage systems is selected based on pre-defined preferences.

11. The storage system of claim 9, wherein the computer instructions, when executed by the computer processor, further cause the storage system to carry out the steps of:
selecting, in dependence upon one or more factors, an alternate mediation service from among a list of mediation services.

12. The storage system of claim 11, wherein the computer instructions, when executed by the computer processor, further cause the storage system to carry out the steps of:
switching, responsive to determining a reliable connection to the alternate mediation service, from the subset of storage systems for handling mediation to the alternate mediation service for handling mediation.

13. The storage system of claim 11, wherein an alternative to the mediation service is selected based on one or more of: host connectivity, host location, current workload, network paths or network latency between hosts and individual storage systems, storage system hardware characteristics.

14. The storage system of claim 11, wherein the subset of storage systems are determined based upon tracking information for applications or services operating on a host computing device.

15. An apparatus comprising a computer processor and a computer memory operatively coupled to the computer processor, the computer memory storing computer program instructions that, when executed by the computer processor, cause the apparatus to carry out the steps of:
determining, among one or more of a plurality of storage systems that are configured for synchronous replication of a dataset and use a first fault response model that is based on use of a mediation service that is external to the plurality of storage systems, a change in availability of the mediation service from which the one or more of the plurality of storage systems request mediation in response to a fault; and
responsive to determining the change in availability of the mediation service, communicating, among the plurality of storage systems, a second fault response model that is different from the first fault response model and is not based on use of the mediation service.

16. The apparatus of claim 15, wherein an alternative to the mediation service specifies that a subset of the plurality of storage systems is designated to remain online and in communication with each other for the synchronously replicated dataset to remain online, wherein if a given storage system not within the subset of storage systems is in communication with the subset of storage systems after a fault, then the given storage system continues to synchronously replicate the dataset.

17. The apparatus of claim 16, wherein the subset of storage systems is selected based on pre-defined preferences.

18. The apparatus of claim 16, wherein the computer program instructions, when executed by the computer processor, further cause the apparatus to carry out the steps of:
selecting, in dependence upon one or more factors, an alternate mediation service from among a list of mediation services.

19. The apparatus of claim 18, wherein the computer program instructions, when executed by the computer processor, further cause the apparatus to carry out the steps of:
switching, responsive to determining a reliable connection to the alternate mediation service, from the subset of storage systems for handling mediation to the alternate mediation service for handling mediation.

20. The apparatus of claim 15, wherein an alternative to the mediation service is selected based on one or more of: host connectivity, host location, current workload, network paths or network latency between hosts and individual storage systems, storage system hardware characteristics.

* * * * *